(12) United States Patent
Alsup

(10) Patent No.: US 10,761,806 B2
(45) Date of Patent: Sep. 1, 2020

(54) TRANSCENDENTAL CALCULATION UNIT APPARATUS AND METHOD

(71) Applicant: Mitchell K. Alsup, Austin, TX (US)

(72) Inventor: Mitchell K. Alsup, Austin, TX (US)

( * ) Notice: Subject to any disclaimer, the term of this patent is extended or adjusted under 35 U.S.C. 154(b) by 183 days.

(21) Appl. No.: 16/003,722

(22) Filed: Jun. 8, 2018

(65) Prior Publication Data

US 2018/0357043 A1 Dec. 13, 2018

Related U.S. Application Data

(60) Provisional application No. 62/517,701, filed on Jun. 9, 2017.

(51) Int. Cl.
*G06F 7/544* (2006.01)
*G06F 7/499* (2006.01)

(52) U.S. Cl.
CPC ........ *G06F 7/5443* (2013.01); *G06F 7/49936* (2013.01)

(58) Field of Classification Search
None
See application file for complete search history.

(56) References Cited

U.S. PATENT DOCUMENTS

| 6,978,289 | B1 | 12/2005 | Matula | |
|---|---|---|---|---|
| 7,346,642 | B1 | 3/2008 | Briggs et al. | |
| 2018/0357043 | A1* | 12/2018 | Alsup | G06F 7/5443 |
| 2019/0369962 | A1* | 12/2019 | Viswanathan Pillai | G06F 7/548 |

* cited by examiner

*Primary Examiner* — Michael D. Yaary
(74) *Attorney, Agent, or Firm* — Hunt Pennington Kumar & Dula PLLC; Artie Pennington; Jeffrey Van Myers

(57) ABSTRACT

A Transcendental Calculation Unit includes a Configuration Table storing a set of constants and provide a selected one of the constants, a Power Series Multiplier that iteratively develops a power series, a Coefficient Series Multiplier and Accumulator that develops an accumulated product of the power series and the constant, and a Round and Normalize Stage that rounds the accumulated product and normalizes rounded product.

11 Claims, 17 Drawing Sheets

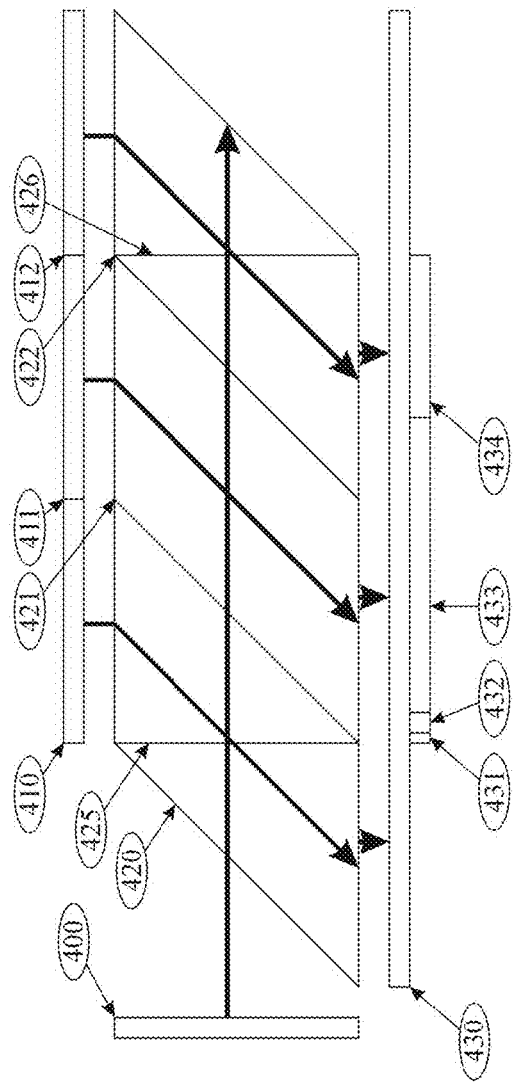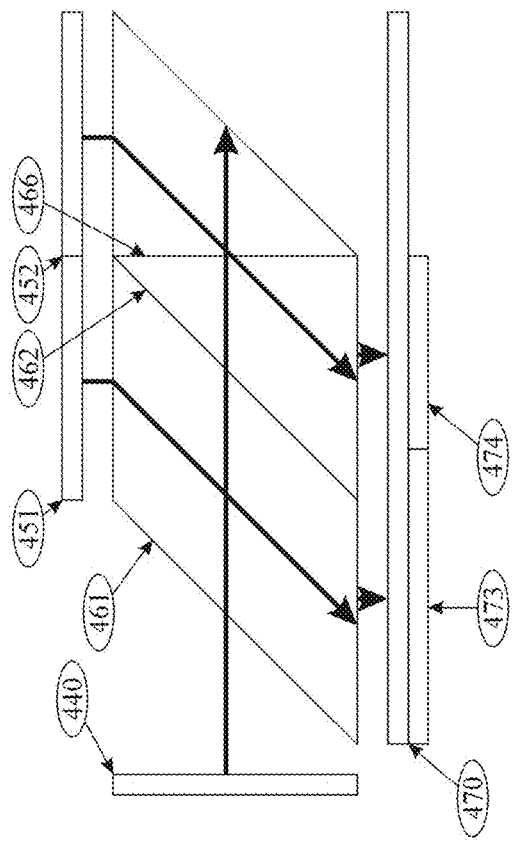

Precision Salvaging Argument Reduction

High Precision Multiplication

TRANSCENDENTAL CALCULATION UNIT APPARATUS AND METHOD

BACKGROUND

1. Field of the Invention

The present invention relates to transcendental calculation unit for use in a computing system.

2. Description of the Related Art

In general, in the descriptions that follow, the first occurrence of each special term of art that should be familiar to those skilled in the art of integrated circuits ("ICs") and systems will be italicized. In addition, when a term may be new, or may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false mode, respectively, and the term toggle to indicate the logical inversion of a signal from one logical mode to the other. Alternatively, the mutually exclusive boolean modes may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic modes.

Hereinafter, reference to a facility shall mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC, or distributed across multiple ICs. Depending on cost and other known considerations, the electronic components, including the facility-instantiating IC(s), may be embodied in one or more single- or multi-chip packages. However, unless expressly moded to the contrary, the form of instantiation of any facility shall be considered as being purely a matter of design choice.

Further, when I use the term develop I mean any process or method, whether arithmetic or logical or a combination thereof, for creating, calculating, determining, effecting, producing, instantiating or otherwise bringing into existence a particular result. In particular, I intend this process or method to be instantiated, embodied or practiced by a facility or a particular component thereof or a selected set of components thereof, without regard to whether the embodiment is in the form of hardware, firmware, software or any combination thereof.

Hereinafter, the following symbols are defined to have the following meanings:

e is the exponent of a floating-point number;
ε is the base of the natural logarithm (2.718281828);
∈ means within the range of; as in: $x \in [0,1]$;
$\Re$ is the set of all real numbers;
$+\Re$ is the set of all positive numbers (0 not included);
$-\Re$ is the set of all negative numbers (0 not included);
+ is an arithmetic addition;
− is an arithmetic subtraction;
x is an arithmetic multiplication;
/ is an arithmetic division;
⊕ is an IEEE 754-2008 addition;
⊗ is an IEEE 754-2008 multiplication; and
◇ is an IEEE 754-2008 rounding in any of the 5 specified modes.

Transcendental calculations have been performed in software since the very first scientific computers, in hardware with CORDIC implementations, in hardware with microcode, and in implementations utilizing a mixture of software and hardware.

The older CORDIC units (Intel 8087®, Motorola 68881®) could calculate transcendental functions in approximately 300 cycles. These CORDIC units fell from favor in the mid 1980s with the rise of 64-bit pipelined calculations within the CPU of that era. Implementation of transcendental function via software was rather slow, but was a straight forward implementation of already existing algorithms with a few tweaks to the floating-point coefficients and boundary conditions.

These software algorithms went through precision salvaging argument reduction processes, and then evaluated the reduced argument over a range typical of that time. Typically a SIN operation or a COS operation was performed over the range, i.e., $-\pi/2$ to $+\pi/2$, in a single long polynomial. In order to meet IEEE 754-1983 accuracy, a 15 to 17 term polynomial was typically required. A 16-term polynomial on a machine with a 4-cycle floating point multiplier accumulator ("MAC") unit would take 16×4+4=68 cycles, after argument reduction. Including argument reduction and special boundary condition checks, these functions expanded to approximately 150 cycles.

In the late 1990s and early 2000s, software began to slice the reduced argument range into a number of intervals. As the number of intervals gets larger, the number of terms in the polynomial gets smaller to achieve similar accuracy in a given interval. These implementations are capable of delivering a transcendental evaluation in approximately 130 clock cycles. Some implementation, with short vector support in the instruction sets, i.e., the Streaming SIMD Extensions ("SSE") of the x86 architecture, could perform 2 or 4 such function evaluations in 130 cycles.

Graphics processors ("GPU") developed by companies such as nVidia Corporation ("nVidia®") and Advanced Micro Devices, Inc. ("AMD®") have dramatically advanced the state of the art with respect to single precision transcendental calculation performance buy building fully pipelined calculation units suitable to 16-bit and 32-bit floating point and closing in on IEEE 754-2008 accuracy.

Both nVidia® and AMD® developed transcendental processing units based on a squaring circuit and slicing the argument range into one or lots of intervals. In both nVidia® and AMD® cases for 32-bit floating point calculations, the transcendental is calculated in the form:

$$p(x) = C_0 + C_1 \times x + C_2 \times x^2$$

in a single pipelined cycle. This requires a high-performance squaring circuit, which is not difficult to build in deep submicron VLSI. There is plenty of available academic and industrial literature covering the design, development of both the hardware implementations, and software to calculate the coefficients and achieve the desired accuracy. This accuracy is not known to be IEEE 754-1983 accurate, but does get close.

The inventor of the present application is also the inventor of U.S. Pat. No. 9,471,305 (the "'305 patent"). The '305 patent discloses using a cubic polynomial evaluated in GPU microcode via a Horner style polynomial:

$$p(x)=C_0+x\times(C_1+x\times(C_2+C_3\times x))$$

This embodiment used significantly smaller tables that the nVidia® and AMD® schemes. Whereas the nVidia® and AMD® schemes typically used 64 or 128-interval tables for each transcendental, the above scheme typically uses 16-entry tables, at the cost of an additional multiplication and addition cycle.

These 32-bit embodiments are not suitable for direct translation into 64-bit floating point embodiments. The sizes of the tables would be prohibitive with Quadratic or Cubic Interpolation schemes. In order to make Transcendental Functions cheap enough to be placed into hardware, the table of coefficients must not be larger than a floating point unit of a typical CPU or GPU.

To this day, software argument reduction, especially high precision argument reduction, like the Cody and Waite algorithm, or Payne and Hanek algorithm, can take a very significant portion of the total time of transcendental function evaluation. What is needed is a more efficient algorithm and apparatus that evaluates Transcendental Functions faster and smaller than the current state of the art in integrated circuits, specifically reducing the time used in performing argument reductions and high precision multiplication, utilizing the same components as are used in various embodiments of the transcendental evaluation unit.

BRIEF SUMMARY OF THE INVENTION

According to one embodiment, a processor comprising a Floating Point Transcendental Calculation Unit, the Floating Point Transcendental Calculation Unit including a Configuration Table, a Power Series Multiplier, a Coefficient Series Multiplier and Accumulator, a Round and Normalize Stage, and a Control Circuit. The Configuration Table is configured to store a plurality of predetermined Constants, C, each at a unique m-bit Index, and in response to receiving a Coefficient Selection Index, k, to provide $C_k$. The Power Series Multiplier is configured to receive an n-bit floating point Argument, r, and iteratively to develop a power series, $r^k$. The Coefficient Series Multiplier and Accumulator is configured to develop a Product, $C_k \times r^k$, and to accumulate said Product into a $SUM_k$. The Round and Normalize Stage is configured to round said accumulated $SUM_k$, and to normalize said rounded accumulated $SUM_k$. The Control Circuit is configured, selectively, to apply to said Configuration Table a Coefficient Selection Index k comprising a selected m-bit portion of a floating point Number, F, to apply to said Power Series Multiplier a sequence of reduced Arguments, $r_k$, to apply to said Coefficient Series Multiplier and Accumulator a sequence of $C_k$ and $r^k$, and to apply to said Round and Normalize Stage the accumulated $SUM_k$.

According to a different embodiment, a processor comprising a Floating Point Transcendental Calculation Unit, the Floating Point Transcendental Calculation Unit including a Configuration Table, a multiplier, a Round and Normalize Stage, and a Control Circuit. The Configuration Table is configured to store a plurality of predetermined Constants, C, each at a unique m-bit Index, and in response to receiving a Coefficient Selection Index, k, to provide $C_k$. The multiplier is configured to operate as a selective one of a Power Series Multiplier that is configured to receive an n-bit floating point Argument, r, and iteratively to develop a power series, $r^k$, and a Coefficient Series Multiplier and Accumulator that is configured to develop a Product, $C_k \times r^k$, and to accumulate said Product into a $SUM_k$. The Round and Normalize Stage is configured to round said accumulated $SUM_k$, and to normalize said rounded accumulated $SUM_k$. The Control Circuit is configured, selectively, to apply to said Configuration Table a Coefficient Selection Index k comprising a selected m-bit portion of a floating point Number, F, to apply to said Power Series Multiplier a sequence of reduced Arguments, $r_k$, to apply to said Coefficient Series Multiplier and Accumulator a sequence of $C_k$ and $r^k$, and to apply to said Round and Normalize Stage the accumulated $SUM_k$.

BRIEF DESCRIPTION OF THE FIGURES

The several embodiments may be more fully understood by a description of certain preferred embodiments in conjunction with the attached drawings in which:

FIG. 4A-FIG. 4B illustrate, in block diagram form, Precision Salvaging Argument Reduction and High Precision Multiplication;

FIG. 5A-FIG. 5D illustrate, in tabular form, the Coefficient Table;

Figure 1:
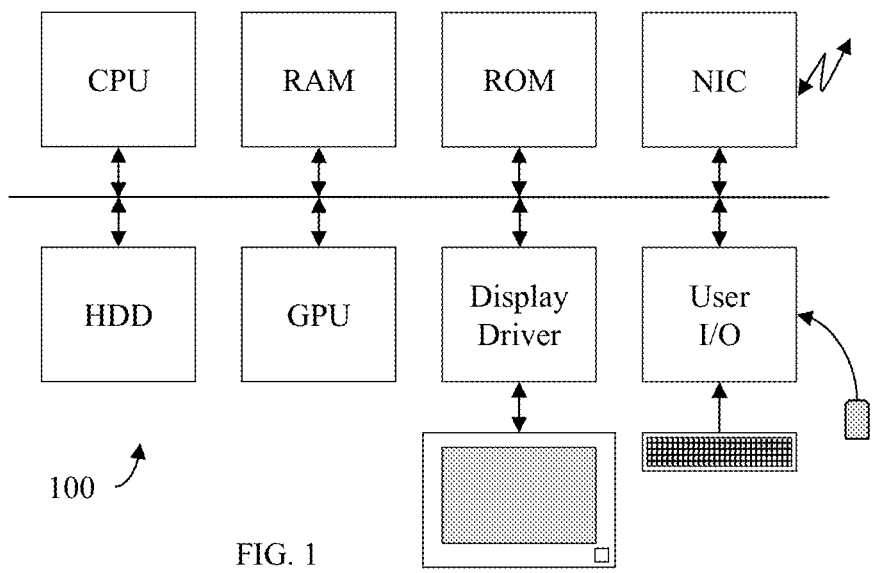
FIG. 1 illustrates, in block diagram form, a typical computer system.

In the drawings, similar elements will be similarly numbered whenever possible. However, this practice is simply for convenience of reference and to avoid unnecessary proliferation of numbers, and is not intended to imply or suggest that identity is required in either function or structure in the several embodiments.

DETAILED DESCRIPTION

Shown in FIG. 1 is a typical general purpose computer system 100. In particular, in recently-developed batterypowered mobile systems, such as smart-phones, tablets, and the like, many of the discrete components typical of desktop or laptop devices illustrated in FIG. 1 are integrated into a single integrated circuit chip.

Figure 2:
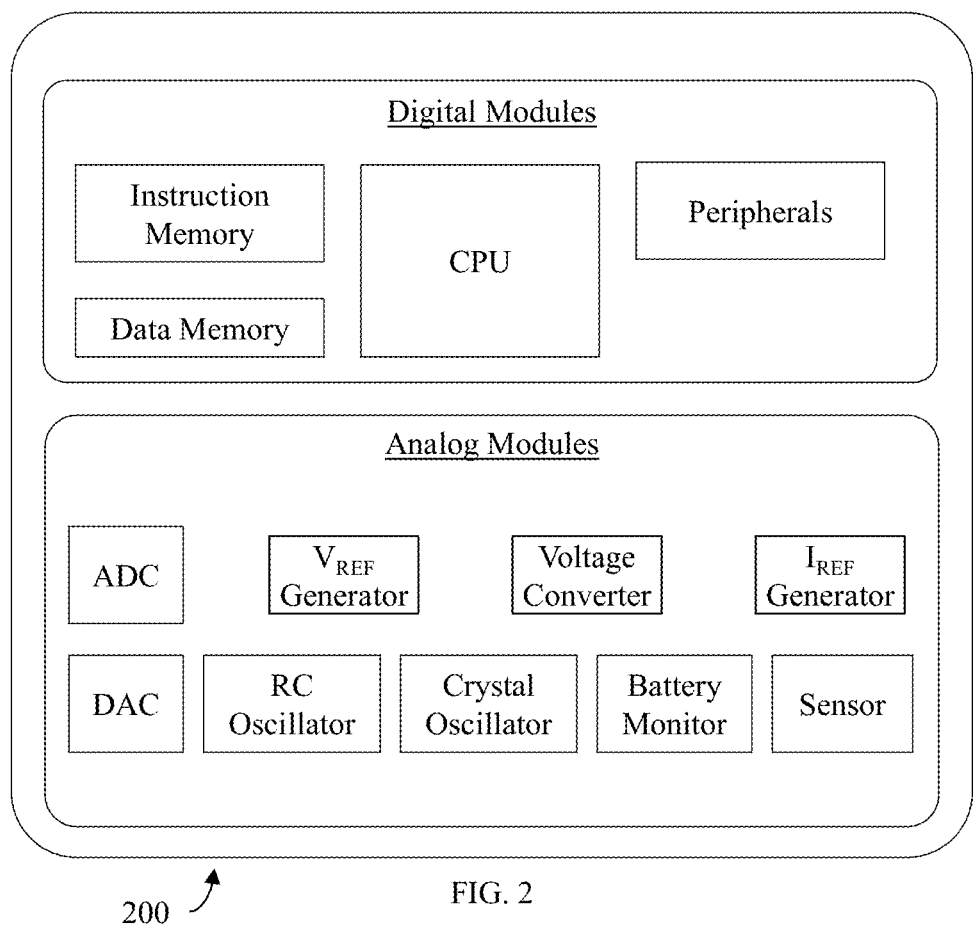
FIG. 2 illustrates, in block diagram form, a typical CPU in a typical computer system.

Shown by way of example in FIG. 2 is one embodiment of a single-chip System on a Chip ("SoC") 200 comprising: a plurality of digital modules; and a plurality of analog modules. In this embodiment, SoC 200 includes a CPU facility adapted make use of any of the several embodiments of the Transcendental Calculation Unit disclosed herein. I may expand on the functionality of certain of these facilities as I now explain the method of operation of my invention and embodiments thereof.

Figure 3:
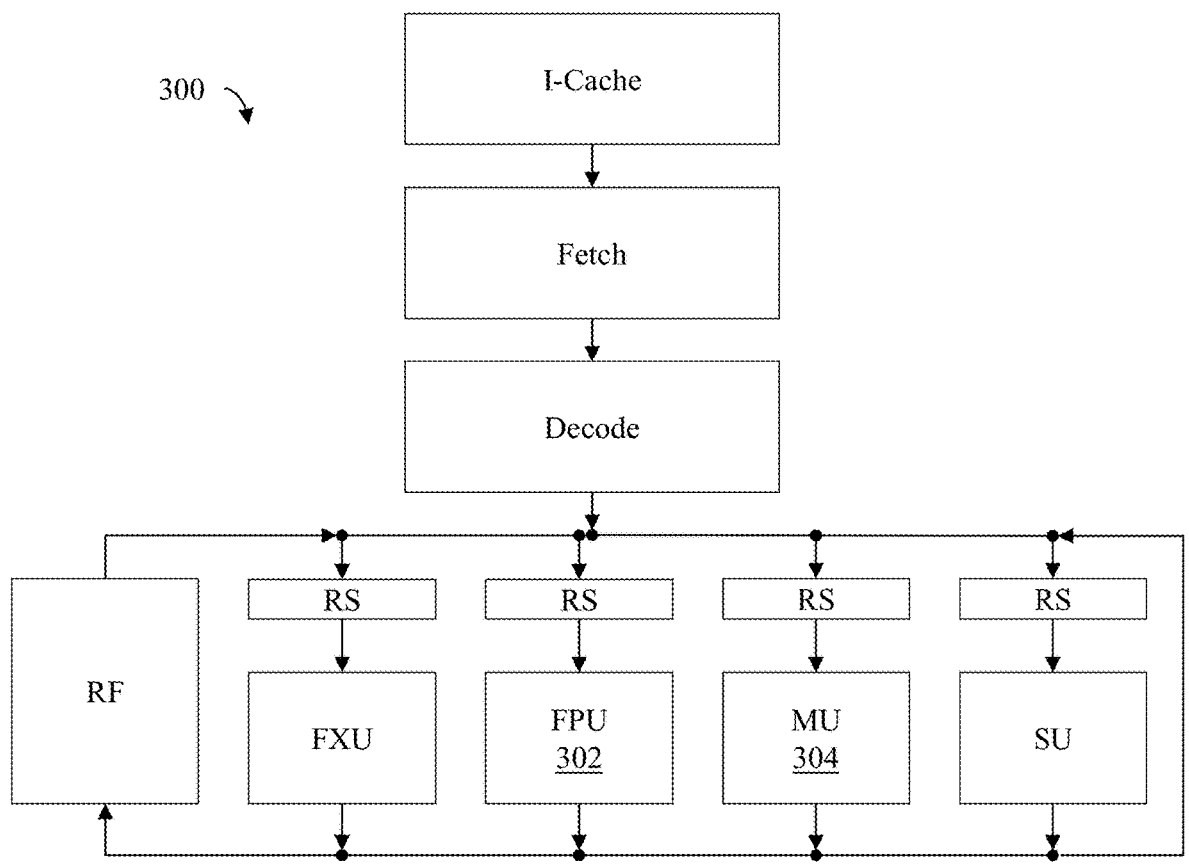
FIG. 3 illustrates, in block diagram form, an execution section of a typical CPU in a typical computer system.

FIG. 3 illustrates an exemplary CPU execution pipeline 300 that is adapted to make use of any of the several embodiments of the Transcendental Calculation Unit disclosed herein. CPU execution pipeline includes Floating Point Unit ("FPU") 302, and Media Unit ("MU") 304, each may be adapted to make use of the several embodiments of the Transcendental Calculation Unit disclosed herein.

IEEE 754-2003 Floating Point Standard

The Operand Ø arrives as an IEEE 754-2008 binary floating point number with the form:

$$\emptyset = -1^s \times 1.f \times 2^{(e+1023)}$$

where s is the sign bit and controls whether a representable floating point number is positive (s=0) or negative (s=1).

1.f is the fraction, the leading 1 is the non-stored hidden bit, the dot (•) is used to denote the binary point prior to the application of the exponent $2^{(e+1023)}$. The normalized 1.f fraction is in the range [1,2). When it is important to denote a particular fraction bit or a field of fraction bits, the individual fraction bits are numbered from $f_0$ being most significant to $f_{52}$ being least significant. In the 1.f notation, f can be either binary digit {0, 1}. In the denormal 0.f notation, leading 1s or 0s in the notation are specific, trailing fs can be either binary digit {0, 1}.

e is the exponent. The exponent can be written in two forms, one denoting the signed exponent seen by the human, the other representing the unsigned exponent as seen by the machine. When written in the form $2^{(e+1023)}$, e is the biased, unsigned machine exponent. When written in the form $2^e$, e is the unbiased signed exponent. When written in the form $2^n$, the exponent is in human form. When written in the form $2^{(2046)}$, the exponent is in its machine form.

There are two (2) special exponents. The numerically lowest exponent (00000000000 or $-1^s \times 0.f \times 2^{(0)}$) denotes the denormalized range where there is no hidden bit associated with the fraction. This range naturally includes zero.

The way the iteration algorithm has been constructed, the only work different for denormalized numbers is to avoid creating the hidden bit as one (1). The Normalizing stage will avoid normalizing a denormal number by stopping the most-significant-bit scan at the denormalized binary point. This prevents the exponent e from becoming less than −1024.

The numerically highest exponent (11111111111 or $-1^s \times 1.f \times 2^{(2047)}$) denotes both Infinity (∞ or $-1^s \times 1.00 \times 2^{(2047)}$) and encodings that do not represent numeric values; called NaNs ($-1^s \times 1.\overline{00}f \times 2^{(2047)}$). There are two (2) kinds of NaNs; a) signaling ($-1^s \times 1.01f \times 2^{(2047)}$); and b) quiet ($-1^s \times 1.10f \times 2^{(2047)}$). Signaling NaNs will signal an Operation exception, while Quiet NaNs will not. Should the Operation exception be disabled, the signaling NaN operand will be converted into a Quiet NaN result. The sign bit cannot be used to distinguish Signaling NaNs from Quiet NaNs.

±∞($-1^s \times 1.00 \times 2^{(2047)}$) is a perfectly acceptable numeric value; that is: it is an ℜ number in the IEEE 754-2008 sense of things.

A NaN Operand will end up delivering a Quiet NaN result for all transcendental functions. A Signaling NaN will deliver a Quiet NaN result and raise the Operation exception. A Quiet NaN will deliver a Quiet NaN and raise no exception.

The final result R will leave in exactly the same an IEEE 754-2008 binary format:

$$R = -1^s \times 1.f \times 2^{(e+1023)}$$

Before we proceed to the detailed description of the methods and variations of apparatus of the present embodiments, it is necessary to review in detail the transcendental functions from both an abstract point of view with consideration to IEEE 754-2008 requirements.

The IEEE 754-2008 floating point standard requires the ability to perform a floating point multiply and an addition and deliver a result from a single rounding. All major CPUs and GPUs provide this functionality in fully pipelined function units with a pipeline delay of about 4 cycles. These units are referred to as floating point multiply and accumulate (FMAC) units henceforth.

Polynomial Approximation

In 1885 Weierstrass proved that for any given or specified error bounds ξ there exists a polynomial p such that the magnitude of the difference between the actual function $f$ and the polynomial approximation to the function never exceeds ξ. This is often written:

$$\|p - f\|_\infty \le \xi$$

The only trick is finding the polynomial and the degree of that polynomial which approximates the function $f$ within the error bounds ξ. We disclose the methods used in finding these polynomial approximations.

The degree of a polynomial is number of non-constant terms in it evaluation. The following polynomial is in standard form and of degree 4:

$$p(y) = C_0 + C_1 \times y + C_2 \times y^2 + C_3 \times y^3 + C_4 \times y^4$$

where x is the argument to and $C_k$s are the coefficients of the approximating polynomial p.

Given that there are polynomials that are good approximants to a chosen continuous function, we disclose methods and apparatus for evaluating elementary transcendental functions using polynomials both rapidly and at high accuracy.

Some time ago, i.e., 1955-1980, transcendental functions were calculated using high degree polynomial to achieve desired accuracy. The evaluation of SIN or COS over the range [0 ... π/2] in IEEE 754-2008 double precision requires a polynomial of degree 13. Slicing this original range from [0,π/2] into 16 equal sized intervals reduces the degree to 7 without loss in accuracy.

Now, let us take a brief but significant look at the Transcendental functions we intend to approximate with polynomials.

Transcendental Functions

Reciprocal Algorithm

The reciprocal (RCP) is one of the easier transcendental functions. Its evaluation proceeds as follows:

$$RCP(x) = RCP(-1^s \times 1.f \times 2^e)$$
$$= -1^s \times RCP(1.f) \times RCP(2^e)$$
$$= -1^s \times RCP(1.f) \times 2^{-e}$$

Here, the fraction 1.f is run through the reciprocal polynomial evaluation calculation and the negative of the exponent −e is inserted into the exponent of the result.

The normalized fraction 1.f is in the range [1:2], its reciprocal is in the range (½:1]. The round and normalize section will convert the result range back into the range [1:2] by shifting the result up by 1 bit position. The largest normalized number $-1^s \times 1.f \times 2^{(2046)}$ reciprocates into the largest denormalized number $-1^s \times 0.1f \times 2^{(0)}$ (and vice versa).

The denormalized fraction 0.fff has a fraction in the range [0:1) with a very large negative unbiased exponent. The largest denormalized numbers $-1^s \times 0.1f \times 2^{(0)}$ reciprocate into the still finite range just below $\pm\infty(-1^s \times 1.f \times 2^{(2046)})$. The largest denormalized numbers are delivered as very large normalized floating point numbers $-1^s \times 1.f \times 2^{(2046)}$. Denormalized numbers smaller than $-1^s \times 0.100 \times 2^{(0)}$ reciprocate to ±∞.

RCP(±∞)=±0

RCP(NaN)=Quiet NaN

Reciprocal Square Root Algorithm

Reciprocal Square Root (RSQRT) is one of the easier transcendental functions. RSQRT is only performed on positive operands (s=0), with the explicit exception where RSQRT(−0.0)=−∞. Its evaluation proceeds as follows:

$$RSQRT(x) = RSQRT(1.f \times 2^e)$$
$$= RSQRT(1.f) \times RSQRT(2^e)$$
$$= RSQRT(1.f) \times 2^{(-e/2)}$$

In practice, the low order bit of the exponent $e_{10}$ is used as another index term into the Coefficient Table, and the exponent of the result is then the debiased exponent of the operand shifted down by 1 bit and then rebiased.

The second set of coefficients has effectively been multiplied by SQRT(2).

Because the lower order significant bit of the exponent is used to index the polynomial table, the normalized fraction 1.f is in the range [1:4), its reciprocal square root is in the range [0.5:1]. The round and normalize section will convert the result range back into the range [1:2) by shifting the result up by 1 bit position.

The denormalized fraction 0.fff has a fraction in the range [0:1) with a very large negative unbiased exponent. The denormalized numbers $-1^s \times 0.f \times 2^{(0)}$ reciprocal square root into the range $[(1^s \times 1.f \times 2^{(1049)}):(1^s \times 1.f \times 2^{(1023)})]$, and are delivered as normalized floating point numbers.

RSQRT(±0)=±∞

RSQRT(+∞)=+0

RSQRT(−ℜ)=Quiet NaN, and signals the Divide by Zero exception.

RSQRT(NaN)=Quiet NaN

Square Root Algorithm

The Square Root (SQRT) follows the same calculation process as RSQRT but uses its own unique set of coefficients. SQRT is one of the easier transcendental functions. SQRT is only performed on positive operands (s=0), with the explicit exception where RSQRT(−0.0)=−0. Its evaluation proceeds as follows:

$$SQRT(x) = SQRT(1.f \times 2^e)$$
$$= SQRT(1.f) \times SQRT(2^e)$$
$$= SQRT(1.f) \times 2^{(e/2)}$$

In practice, the low order bit of the exponent $e_{10}$ is used as another index term into the Coefficient Table, and the exponent of the result is then the exponent of the operand shifted down by 1 bit. The second set of coefficients has effectively been multiplied by SQRT(2).

Excepting for −0, the SQRT(−ℜ)=Quiet NaN, and signals the Operation exception.

Here, the normalized fraction 1.f is run through the polynomial evaluation calculation and ½ the exponent $2^{(e/2)}$ is inserted into the exponent of the result. No overflow or underflow is possible.

The denormalized fraction 0.fff has a fraction in the range [0:1) with a very large negative unbiased exponent. The denormalized numbers $-1^s \times 0.f \times 2^{(0)}$ square root into the range $[(1^s \times 1.f \times 2^{(-1049)}):(1^s \times 1.f \times 2^{(-1023)})]$, and are delivered as normalized floating point numbers. No overflow or underflow is possible.

SQRT(±0)=±0

SQRT(+∞)=+∞

SQRT(−ℜ)=Quiet NaN, and signals the Operation exception.

SQRT(NaN)=Quiet NaN

Logarithm Algorithms

The base functions in the logarithmic set of functions are chosen to avoid the tricky region where the argument is 1.0+x (where |x|≪1.0) and the result should be approximately x (written: ~x). When the argument to a logarithm is very close to 1.0, the result is very close to 0.0 and great significance can be lost. Consider:: numerically:

$$Ln(1 + 10^{-32}) = Ln(\sim 1.0)$$
$$= 0.0$$

when algebraically:

$$Ln(1+10^{-32})=10^{-32}$$

The base functions LN 2P1, LN P1, and LOG P1 base functions have sister functions in Ln 2, Ln, and LOG. The base functions exist to enable the programmer (or software environment) to extract significance in this perilous argument range.

Ln 2P1(x)=Ln 2(1+x) or Ln 2P1(y−1)=Ln 2(y)

Ln 1P(x)=Ln(1+x) or Ln P1(y−1)=Ln(y)

LOG P1(x)=LOG(1+x) or LOG P1(y−1)=LOG(y)

With these as our base functions, when: $|x|\ll 1/32$:

Ln $2P1(x)\sim=x/\text{Ln}(2)$

Ln $P1(x)\sim=x$

LOG $P1(x)\sim=x/\text{Ln}(10)$

The argument range check is Ø<−1.0. In hardware, this remains an easy calculation that does not require a carry chain to resolve.

As used by software, the instruction sequence will subtract 1.0 from the argument to the logarithmic function giving Ø, then evaluate the base function (LN 21P, LN 1P, and LOG 1P) and have the high quality result desired. Given the LN 21P, LN 1P, and LOG 1P base functions one can easily calculate the sister functions Ln 2, Ln, and LOG.

The Ln 2 evaluation proceeds as follows:

$$\ln 2(x) = \ln 2(1.f \times 2^e)$$
$$= \ln 2(1.f) + \ln 2(2^e)$$
$$= \ln 2(1.f) + e$$

So, one computes the Ln 2 polynomial on the 1.f fraction, an then adds the debiased exponent to the result of the polynomial. An exponent equivalent to $2^0$ is inserted into the exponent field of the result prior to the addition of e and subsequent normalization.

Ln 2(+denormal)<−1024

Ln 2(±∞)=−∞

Ln 2(−$\mathfrak{R}$)=Quiet NaN, and signals the Operation exception.

The fraction 1.f is in the range [1:2), its polynomial evaluation is in the range [0:1). After adding the exponent to the polynomial output the result is in the range [−1023:+1023] The round and normalize section has to normalize up to 10-bits downward.

The Ln is evaluation proceeds as follows:

$$\ln(x) = \ln 2(x)/\ln 2(\varepsilon)$$
$$= (\ln 2(1.f \times 2^e))/\ln 2(\varepsilon)$$
$$= (\ln 2(1.f) + \ln 2(2^e))/\ln 2(\varepsilon)$$
$$= (\ln 2(1.f) + e)/\ln 2(\varepsilon)$$

One has two choices, here. One can multiply all of the coefficients by 1/ln 2(ε), at the cost of more table area, and add the debiased exponent multiplied by 1/ln 2(ε) to the result of the polynomial. Alternately; one can compute the Ln 2 polynomial on the fraction 1.f, then adds the debiased exponent to the result of the polynomial, and finally one multiplies this entire result by the reciprocal of the base 2 logarithm of ε; saving Coefficient Table area at the cost of an additional multiply with its power and latency adders. All of this is performed in wider precision than IEEE 64-bit floating point. And a single rounding is performed.

Ln(±0)=−∞

Ln(−$\mathfrak{R}$)=Quiet NaN, and signals the Operation exception.

The LOG is evaluation proceeds as follows:

$$\log(x) = \ln 2(x)/\ln 2(10)$$
$$= (\ln 2(1.f \times 2^e))/\ln 2(10)$$
$$= (\ln 2(1.f) + \ln 2(2^e))/\ln 2(10)$$
$$= (\ln 2(1.f) + e)/\ln 2(10)$$

As with Ln, LOG has two choices, here. One can multiply al of the coefficients by 1/ln 2(10), at the cost of more table area, and add the debiased exponent to the result of the polynomial. Alternately; one can compute the Ln 2 polynomial on the fraction 1.f, then adds the debiased exponent to the result of the polynomial, and finally one multiplies this entire result by the reciprocal of the base 2 logarithm of 10; saving Coefficient Table area at the cost of an additional multiply with its power and latency adders. All of this is performed in wider precision than IEEE 64-bit floating point.

LOG(±0)=−∞

LOG(−$\mathfrak{R}$)=Quiet NaN, and signals the Operation exception.

Exponential Algorithms

When the argument to an exponential function is close to 0.0, the result of the exponential is asymptotically close to 1.0. So close in fact that the 1.0 part can drown out the significance from the argument 0. Therefore the base functions in this set are of the form:

EXP2M1(x)=EXP2(x)−1 or EXP2M1(x)+1=EXP2(x)

EXPM1(x)=EXP(x)−1 or EXPM1(x)+1=EXP(x)

EXP10M1(x)=EXP10(x)−1 or EXP10M1(x)+1=EXP10(x)

with the advantage that there is no loss of significance when $|x|\ll 1$, until the 1.0 gets added by software later. That is the Transcendental function is evaluated with high precision and software can choose to throw that precision away.

The Taylor expansion of EXP(x) is::

EXP(x)=1.0+x+x²/2+ . . .

The Taylor expansion of EXPM1(x) is::

EXPM1(x)=0.0+x+x²/2+ . . .

Software will produce an instruction sequence to evaluate the base function and then add 1.0 from the result of the base function.

The Exp2 is evaluation proceeds as follows:

$$\text{Exp2}(x) = \text{Exp2}(int + fract)$$
$$= \text{Exp2}(int) \times \text{Exp2}(fract)$$
$$= \text{Exp2}(fract) \times 2^e$$

So, one separates the fraction 1.f into integral and fractional parts using the exponent e to select the binary point in the fraction 1.f. Then the polynomial generator computes the Exp2 polynomial on the remaining fraction, an then adds the integer part to the exponent of the result.

Exp2(>+1024)=+∞

Exp2(<−1074)=+0

Exp is evaluation proceeds as follows:

$Exp(x)=Exp2(x \times 1/\ln(2))$

One has two choices, here. One can develop a Coefficient Table directly for EXP and simply run the EXP polynomial on the original fraction 1.f. Or one can first multiply the fraction 1.f by the reciprocal of the natural logarithm of 2, then the algorithm proceeds identically to Exp2. The reduced argument after multiplication and the extraction of Coefficient Table index retains 54-bits of significance (up from the normal 47-bits) preserving accuracy.

$Exp(>+709.78)=+\infty$ $Exp(<-744.44)=+0$

Exp10 is evaluation proceeds as follows:

$Exp10(x)=Exp2(x \times 1/\log(2))$

One has two choices, here. One can develop a Coefficient Table directly for EXP10 and simply run the EXP10 polynomial. Or one can first multiply the fraction 1.f by the reciprocal of the base 10 logarithm of 2, then the algorithm proceeds identically to Exp2. The reduced argument after multiplication and the extraction of Coefficient Table index retains 54-bits of significance (up from the normal 47-bits) preserving accuracy.

$Exp10(>+308.25)=+\infty$ $Exp10(<-324.21)=+0$

Cyclic Argument Reduction

The SIN, COS, and TAN transcendental functions require preprocessing of the operand in order to obtain a reduced argument suitable for polynomial evaluation. Since these are cyclic functions {SIN(x)=SIN(x+2kπ): for any integer k} we need a mechanism makes it easy to get rid of the multiples of 2π from the operand. Secondarily we would also like this preprocessing to make it easy to determine which quadrant of evaluation is in process. Both of these are satisfied by multiplying the input operand by a high precision version of 2/π. We call this method Precision Salvaging Argument Reduction.

IEEE 754-2008 has the special requirement that when the SIN (or COS) function returns 0.0 that the sign of that zero be the same as the sign of k (above). The standard is quiet on the sign of SIN(π), COS(π/2), and COS(3π/2); probably because these will not deliver an exact 0.0 due to x not being exactly representable in IEEE 754-2008 floating point numbers.

Once the operand has been thusly multiplied, any bits higher in significance than bit[2] above the binary point can be discarded, as these represent the multiples in 2π (k of them in fact) that are unnecessary in the calculation to follow. The sign of the discarded bits is retained and used to correctly sign results exactly equal to 0.0.

With the reduced argument projected into the integral ($r \in [0,1]$) quadrant ($q \in \{0,1,2,3\}$) ranges, the only difference between SIN and COS is the addition of 2'b01 to the quadrant q.

$COS(x)=SIN(x+\pi/2)$ $COS\ 2PI(x \times 2/\pi)=SIN\ 2PI((x+\pi/2) \times 2/\pi)$ $D_{fn}: \chi = x \times 2/\pi$ $COS\ 2PI(\chi)=SIN\ 2PI(\chi+1)$ So, the hard transcendental addition of π/2 has become the precise easy addition of exactly 1.0 and it is not even a floating point addition! and works in only a 2-bit adder!

SIN and COS

Once argument reduction has taken place both SIN and COS are the same function and have the same reduced argument r. Henceforth, only SIN is evaluated. There are 4 quadrants of evaluation:

$x \in [0,\pi/2)::SIN(x)=SIN\ 2PI(r)$ $x \in [\pi/2,\pi)::SIN(x)=SIN\ 2PI(2-r)$ $x \in [\pi,3\pi/2)::SIN(x)=-SIN\ 2PI(r-2)$ $x \in [3\pi/2,2\pi)::SIN(x)=-SIN\ 2PI(4-r)$ or:

$r \in [0,1)::SIN(x)=SIN\ 2PI(r)$ $r \in [1,2)::SIN(x)=SIN\ 2PI(2-r)$ $r \in [2,3)::SIN(x)=-SIN\ 2PI(r-2)$ $r \in [3,4)::SIN(x)=-SIN\ 2PI(4-r)$

TAN

Tangent is one of the medium difficult transcendental functions. Once precision salvaging argument reduction has taken place, polynomial evaluation is straightforward. However, there is a complication in argument reduction.

As x approaches π/2 or as r approaches 1, TAN(x) and TAN 2PI(r) approaches ∞. But:

$D_{fn}:TAN(x)=SIN(x)/COS(x)$ $TAN(\pi/2-x)=SIN(\pi/2-x)/COS(\pi/2-x)$ $SIN(\pi/2-x)=COS(x)$ $COS(\pi/2-x)=SIN(x)$ $TAN(\pi/2-x)=COS(x)/SIN(x)$ $TAN(\pi/2-x)=1/TAN(x)$

This gives us a numerically stable means to preserve accuracy in the difficult regions where TAN goes through ∞. After calculating TAN we then RCP the result of TAN and deliver it as the final result. Both TAN and RCP are performed back to back without additional instructions being issued.

The quadrants are calculated into the domain |[0 . . . 1.0]|, then one half of the quadrants become reciprocated after the TAN polynomial has been evaluated. The zeros of these quadrants become the infinities of the result. The following illustrates the calculation of the Tangent function over its reduced argument range:

$x \in [0,\pi/4)::TAN(x)=TAN\ 2PI(r)$ $x \in [\pi/4,\pi/2)::TAN(x)=1/TAN\ 2PI(1-r)$ $x \in [\pi/2, 3\pi/4)::\text{TAN}(x) = -1/\text{TAN } 2PI(r-1)$ $x \in [3\pi/4, \pi)::\text{TAN}(x) = \text{TAN } 2PI(2-r)$ or:

$r \in [0, \frac{1}{2})::\text{TAN}(x) = \text{TAN } 2PI(r)$ $r \in [\frac{1}{2}, 1)::\text{TAN}(x) = 1/\text{TAN } 2PI(1-r)$ $r \in [1, 3/2)::\text{TAN}(x) = -1/\text{TAN } 2PI(r-1)$ $r \in [3/2, 2)::\text{TAN}(x) = \text{TAN } 2PI(2-r)$ When the TAN polynomial evaluation is to be reciprocated, the Transcendental Function Unit uses the 58-bit result as the 58-bit fraction to the reciprocate function. This takes another function evaluation latency (RCP), but using the high precision intermediate preserves accuracy to the final reciprocated result.

Due to the way the polynomial evaluation proceeds due to special casing the small arguments:

$\text{SIN}(\pm denormal) = \pm denormal$  // including $\text{SIN}(\pm 0)$ $\text{COS}(\pm denormal) = +1.0$ $\text{TAN}(\pm denormal) = \pm denormal$  // including $\text{TAN}(\pm 0)$ Otherwise, due to the way the precision salvaging argument reduction works, the present invention produces:

$\text{SIN}(\pm) = \pm 0.0$ $\text{COS}(\pm) = \pm 1.0$ $\text{TAN}(\pm) = \pm 0.0$ On which IEEE 754-2008 is quiet; other than the requirement to maintain the relation:

$\text{SIN}(x)^2 + \text{COS}(x)^2 = 1.0$  // for any $x \notin NaN$

Inverse Cyclic Algorithms

Arcsine is one of the easy transcendental functions. A few checks to verify the argument is in range [−1.0 . . . +1.0], and a simple polynomial evaluation leads to the result. The reduced argument range greatly simplifies this transcendental. Care must be taken in the realm where x is small to avoid loss of accuracy.

$A \text{ SIN}(>+1.0) = $ Quiet NaN, and raise the Operation exception $A \text{ SIN}(<-1.0) = $ Quiet NaN, and raise the Operation exception Arccosine is one of the easy transcendental functions. A few checks to verify the argument is in range[−1.0 . . . +1.0], and a simple polynomial evaluation leads to the result. The reduced argument range greatly simplifies this transcendental.

$A \text{ COS}(>+1.0) = $ Quiet NaN, and raise the Operation exception $A \text{ COS}(<-1.0) = $ Quiet NaN, and raise the Operation exception Since: A $\text{COS}(x) = \pi/2 - A \text{ SIN}(x)$, a change of leading coefficient and a change of sign during evaluation is sufficient to convert A COS into A SIN with a single coefficient stored in the Coefficient Table. A COS(0) is required to be $\pi/2$, so A SIN(0) is required to be 0.0, and thus, A SIN utilizes the concept of small during evaluation.

A TAN (like TAN) is one of the medium difficult transcendental functions. The magnitude of the argument is compared to 1.0. If the argument is greater than 1.0, the argument is reciprocated—this projects infinities back to 0.0. Then the A TAN polynomial is calculated as:

$x \in [-\infty, -1]::\quad \text{ATAN}(x) = -\pi/2 + \text{ATAN}(1/x);$ $x \in [-1, 0]::\quad \text{ATAN}(x) = -\text{ATAN}(x);$ $x \in [0, 1]::\quad \text{ATAN}(x) = +\text{ATAN}(x);$ $x \in [1, \infty]::\quad \text{ATAN}(x) = +\pi/2 - \text{ATAN}(1/x);$ The largest magnitude of A TAN in the range [−1:1] is $\pi/4$ and calculated to 57-bits of precision, $\pi/2$ and known to 58-bits of precision, so the subtraction (above) retains at least 57-bits of precision.

A TAN utilizes the small concept so that:

$\text{ATAN}(\pm denormal) = \pm denormal$  // including $\text{ATAN}(\pm 0)$

Transcendental Arithmetic

Precision Salvaging Argument Reduction

The cyclic functions need their multiples of $2\pi$ removed from their Operand Ø {SIN(x)=SIN(x+2k$\pi$):for integer k}. The mechanism to do this should make it easy to get rid of the multiples of $2\pi$ from the operand. And importantly, we need the reduced argument to retain as much inherent precision as possible. All of these are satisfied by multiplying the input operand by a high precision version of $2/\pi$. This is analogous a hardware embodiment of Payne and Hanek argument reduction using $2/\pi$ and three (3) floating point values for high precision $2/\pi$. But instead of performing the argument reduction and then converting the reduced argument range r back into |[0, $\pi/2$]|, we project the Operand Ø into the form f(r×$\pi/2$) in the coefficient generation process in place of f(r). We then have a polynomial in the range |[0,1]| and easy selection of the coefficient set.

Referring to FIG. 4A top illustration: In order to perform precision salvaging argument reduction, we take the fraction 400 of the given argument and multiply it by three carefully chosen portions of $2/\pi$ 410, 411, 412, based on the exponent e of the argument.

FIG. 4A shows 3 multipliers 420, 421, 422 nested so that they perform as if one n×3n multiply was performed and a 4n-bit result is produced 430, the fraction 400 of the argument is inserted from the left, and three (3) successive copies of some bits extracted from $2/\pi$ are inserted from the top. The fraction of Operand Ø 400 is 53-bits long. Those arguments deemed to be small do not pass though this argument reduction strategy, so this process does not have to deal with non-normalized data.

Bits to the left of line 425 are bits that will be discarded, as they represent 2k$\pi$. Bits to the right of the line 426 can be discarded as they only contribute to the sticky part of rounding. The remaining parts of multiplier represent those bits which can contribute to the more significant portion of the product. In a typical multiplier 902 both the left and right hand bits are produced at the same time The middle multiplier 421 represents the multiplication of the argument 400 by the middle bits from $2/\pi$ 411. All of these bits are used in the final result. The more significant half are directly represented, the lesser significant half become part of the extended result and contribute to the proper rounding of the result. Multiplier 421 contributes 106-bits to the product.

The right multiplier 422 represents the multiplication of the argument 400 by the low bits from $2/\pi$ 412. Bits to the left of line 426 represent bits that can contribute to the extended result and to the rounding selection. Bits to the right of line 426 can contribute nothing but sticky to the rounding. The bits to the left of line 426 contributes 58-bits to the product from a 58-bit set of bits from $2/\pi$ and 53-bits from the unreduced argument.

The result 430 of these three (3) multiplications, after adding up all the bits, is 217-bits of product.

The top 53-bits to the left of 425 are totally unnecessary! In a more standard argument reduction, the container holding these top bits would have its fractional significance removed, and then it would be subtracted from the product. Simply discarding the high-order bits serves the same purpose, better still don't bother to calculate them in the first place. Thus the bits we desire start at bit 54 from the top.

After casting the top 53-bits away, instead of producing a reduced argument with 53-bits of significance, the present embodiment produces a result with 64 bits of significance! The top two (2) bits are taken as our Quadrant (Q) 431, the next 4-bits as our table index (T) 432, then we take the remaining 105-bits and naturalize this into a 58-bit reduced argument r 433. This effectively gives us 64-bits of operational significance, 2 quadrant bits. 4 table index bits, and 58 reduced argument bits. With this significance, we can achieve faithfully rounded results.

The container 434 could be used to round the 64-bit result, instead we have chosen to simply truncate them from the reduced argument. As we shall see in a subsequent section, the hardware has been configured to that these bits are produced.

Because the product contains so many bits of precision, polynomial evaluation is operating near 1/1024 unit of least precision ("ULP"). This preserves the accuracy of the Operand Ø in reduced form.

All known prior art has performed these 3 multiplications in 3 successive cycles (hardware) or in three successive instructions (software). The present embodiment performs these three (3) multiplications in 1 cycle using only two (2) multipliers as described below in the section on Vertically Split Multiplier.

The exponent e of the Operand Ø is used as an index into a high precision bit stream containing bits from $2/\pi$.

When the original operand Ø is less than $2^{-5}$, precision salvaging argument reduction is not performed as the argument will be processed in a special small range with special coefficients designed to extract the highest possible precision from the unmolested operand fraction and thereby the small interval has an exact Operand Ø!

The non-small Operand Ø range has precision salvaging argument reduction preformed by using the now positive debiased exponent to index into the following bit string which is $2/\pi$ to 1023+164=1187-bits of precision:

$2/\pi$ = 0.1010001011111001100000110110111001001110010001000001
0101001010011111110000100111010101111010001111101010
0110100110111011100000011011011011000101001010110 0110
0100111100010000111001000001000001111111001010001011
0001110101011110111101011101111000101010000110110111
0010010001101110001110100100000100100111011101001011100
0000000011001001001001011101110101000001001101000110
0100100001110011111100001101111010110001110010110 00
1001010011010011100111110111010001000001000110101111
0101001011101011101101000100100000100111010011001111000
1110000001001101011010000101111011111001000001001110
0110010001110101100011100110000011010100110011001111
1010010011100100010001011111100010111011110111111001
001010000011101100011111111100010010111111111111011
1100000010110011000000011111110111100101111000100 0110
0010110101101000001010011011010001111101011101001011011
0011111101100111001001111100101100001001101101110100
111101000110001111110110011010011110010111111101010 0
01011010110100100111011101011100011111101011111001
0111110001011101100111010000011100111001111011110100
0101010010100010010011101010011010111111110110101111
1011000100011111100011010101110100000100000101011000000
0011000100011111100011010101110100000100000101011000000
0110011000010001101111110011110101101011101 01111
1100001100111101111000010000010011010111101000011011
00001101101010011110001110010001010000101011101110
0110

From this exponent indexing, three (3) successive fields of width {53-bits, 53-bits, 58-bits} are extracted and successively assigned to $\{2/\pi_{high}, 2/\pi_{mid}, 2/\pi_{low}\}$.

$e' = \max(e, 0)$ $\{2/\pi_{high}, 2/\pi_{mid}, 2/\pi_{low}\} = 2/\pi_{string} <e':e'-163>$ Once the 3 successive fields of $2/\pi$ are extracted, the following three (3) products are formed:

$H<53:105> = 2/\pi_{high}<0:52> \times \varnothing[1,f]<0:52>$ $M<0:105> = 2/\pi_{mid}<0:52> \times \varnothing[1,f]<0:52>$ $L<0:57> = 2/\pi_{low}<0:57> \times \varnothing[1,f]<0:52>$ These products are then aligned and added as:

$R<0:110> = H<53:105> \times 2^{+53} + M<0:105> + L<0:57> \times 2^{-53}$

And the reduced arguments $\{Q, T, r\}$ are formed by assignment:

$\{Q<0:1>, T<0:3>, r<0:57>\} = R<0:110>$

Should this rounding overflow {Q, T, r}, the overflowing bit has just become part of the bits that were to be discarded anyway! And importantly, the reduced argument r has become exactly 0!

High Precision Multiplication

Referring to the bottom of FIG. 4B: The same hardware that performs Precision Salvaging Argument Reduction can be utilized to perform High Precision Multiplication. The Logarithm and Exponential functions, not based in a power of 2, utilize the High Precision Multiplier configuration. The logarithm functions use High Precision Multiplication after polynomial evaluation, while the exponential functions High Precision Multiplication before polynomial evaluation in the forms:

$$\ln P1(x) = \ln 2P1(x)/\ln 2(\varepsilon)$$

$$\log P1(x) = \ln 2P1(x)/\ln 2(10)$$

$$\text{Exp}M1(x) = \text{Exp}2M1(x \times 1/\ln(2))$$

$$\text{Exp}10M1(x) = \text{Exp}2M1(x \times 1/\log(2))$$

In decimal these constants are:

1/log(2)
 =3.321928094887362348770319429489390175864831393024

1/ln(2)
 =1.442695040888963407359924681001892137426645954153

1/ln 2(e)
 =0.693147180559945309417232121458176568075500134360

1/ln 2(10)
 =0.301029995663981195213738894724493026768189881462

In binary, these constants are:

1/log(2) = 11.01010010011010011110000100101111001101000110111
 00010101111111001001001001010111111011011111111
 01001101101011111101

1/ln(2) = 1.011100010101010001101100101001010110000010111
 111100001011101110111101000011111111101101000
 00110100100011101001

1/ln2(e) = 0.10110001011100100001011111101111110100011100111
 10111100110101011110010011110001110110011100110
 00000000111111001011

1/ln2(10) = 0.0100110100010000010011010100000100111111011110011
 1111101111001100010001111100010010101100110101
 10000001011011111001

Similar to Precision Salvaging Argument Reduction there are four (4) double width constants (above) available to the hardware in the coefficient table area of the function unit. Here, the high precision constants 451, 452 are not indexed by the exponent of the operand Ø, simplifying access, and reducing the bit-count of the constant. Additionally, there is no significance in the high portion of the multiplication as there was in Precision Salvaging Argument Reduction. Thus instead of accessing 164-bits, accessing 111-bits suffices and all of the bits in the high section are set to zero (0).

Once the particular constant is identified by the OpCode, the following three (3) products are formed:

$$H{<}53{:}105{>} = 0$$

$$M{<}0{:}105{>} = \text{Const}{<}0{:}52{>} \times \emptyset[1,f]{<}0{:}52{>}$$

$$L{<}0{:}57{>} = \text{Const}{<}53{:}110{>} \times \emptyset[1,f]{<}0{:}52{>}$$

These products are then added 470 as:

$$R{<}0{:}110{>} = H{<}53{:}105{>} \times 2^{+53} + M{<}0{:}105{>} + L{<}0{:}57{>} \times 2^{-53}$$

And the final product 473 is formed by assignment:

$$P{<}0{:}57{>} = R{<}0{:}110{>}$$

Bits to the right of line 466 do not contribute to the result. As we shall see in the section on Split Multipliers, the present embodiment has the ability to not bother calculating these bits. Bits in container 474 are simply discarded.

High Precision Multiplication is an extremely close relative of Precision Salvaging Argument Reduction requiring minimal hardware additions to embody this functionality.

Naturalize

For Precision Salvaging Argument reduction and for High Precision Multiplication on the Operand Ø, we use a term called naturalize instead of normalize.

Cyclic Transcendentals have their Operand Ø multiplied by $2/\pi$ in high precision. Exponential functions have their Operand Ø multiplied by $1/\ln(2)$ or $1/\log(2)$ in high precision. The result is then aligned with the binary point where the hidden bit would normally be. We call this number naturalized. We are not attempting to properly round the number nor does this number use a hidden bit representation, nor does this 58-bit fraction fit in an IEEE 754-2008 container.

Bits more significant than the binary point (the quadrant bits Q 431) are used to modify the sign generation, and determine if the result must be reciprocated (TAN). The bits 432 immediately to the right of the binary point are used to index the Coefficient Table 830. The remaining 58-bits 433 are used by the Power Series Multiplier 810 and 820 during polynomial evaluation.

Once naturalized, the reduced argument r is in the range $[-1/32 : +1/32]$ aligned to its binary point.

Polynomial Evaluation

Transcendental functions are interpolated in intervals extracted from the high order bits of the floating point fraction. In IEEE 754-2008 normalized floating point numbers do not store the highest bit of significance: we will write:

$$F = 1.f_0 f_1 f_2 f_3 f_4 f_5 f_6 f_7 \ldots f_{52}$$
$$\text{------------53-bits------------}$$

to denote the fraction of a normalized floating point number. Bits $f_0 f_1 f_2 f_3$ are used to index the Coefficient Table, the hidden bit is discarded because the $C_0$ coefficient embodies its place in the final result. Thus, for operands that do not use Precision Salvaging Argument reduction or High Precision Multiplication, polynomial evaluation begins with:

$$r = 0.00000 f_5 f_6 f_7 \ldots f_{52} 0\ 0\ 0\ 0\ 0\ 0\ 0\ 0\ 0$$
$$\text{--------------------58-bits------------------}$$

For Transcendental functions where the Operand Ø is preprocessed by Precision Salvaging Argument Reduction or High Precision Multiplication, polynomial evaluation begins with:

$$r = 0.00000 f_5 f_6 f_7 \ldots f_{52} f_{53} f_{54} f_{55} f_{56} f_{57} f_{58} f_{59} f_{60} f_{61} f_{62}$$
$$\text{--------------------58-bits----------------------}$$

The 58-bit reduced argument r<5:62> is repeatedly multiplied by itself generating a series of successively higher powers: $r^k$. The first few steps in this Power Series are:

$$\text{--------------------58-bits--------------------------}$$
$$r = 0.00000 s_5 f_6 f_7 f_8 f_9 f_{10} f_{11} f_{12} f_{13} f_{14} f_{15} f_{18} f_{19} f_{20} f_{21} \ldots f_{62}$$
$$r^2 = 0.000000\ 0\ 0\ 0\ 0\ s_{10} f_{11} f_{12} f_{13} f_{14} f_{15} f_{18} f_{19} f_{20} f_{21} \ldots f_{62}$$
$$r^3 = 0.000000\ 0\ 0\ 0\ 0\ 0\ 0\ 0\ 0\ s_{15} f_{18} f_{19} f_{20} f_{21} \ldots f_{62}$$
$$r^4 = 0.000000\ 0\ 0\ 0\ 0\ 0\ 0\ 0\ 0\ 0\ 0\ 0\ s_{20} f_{21} \ldots f_{62}$$

Each higher Power Series product has more and more leading zeros, while the binary point (•) remains fixed. Thus, the coefficient multiplication and accumulation can proceed without encumbrances of typical floating point arithmetic, e.g., like large alignment shifters.

Each coefficient $C_k$ is multiplied by its corresponding Power Series product $r^k$ forming the product $C_k \times r^k$. The Coefficients are calculated and stored with cognizance of where the binary point will be so as to preserve the fixed point nature of the transcendental evaluation.

Since the product $r^k$ has decreasing precision at a fixed and quantified rate (at least 5-bits per iteration), those transcendental functions which have rapidly decreasing coefficient values need fewer iterations to deliver results of high accuracy.

The summation is initialized to $C_0$, and all of the $C_k r^k$ terms are iteratively added to the current 110-bit sum. The result contains high precision approximation to the actual function. The approximation is normalized and rounded according to the IEEE 754-2008 specifications and achieves faithful rounding in the round to nearest modes.

Coefficient Table

The Coefficient Table is the repository of all coefficient data. Conceptually, it is also the repository of various transcendental constants known to very high degrees of precision; such as:

$$\{2/\pi, \varepsilon, 1/\ln(2), 1/\log(2), 1/\ln 2(\varepsilon), 1/\ln 2(10)\}$$

Of these $2/\pi$ is most critical. It is known to 1187-bits of precision and utilized in Precision Salvaging Argument Reduction. The rest are known and utilized to 111-bits of fractional precision and used High Precision Multiplications.

Verilog Tables

While the Coefficient Table could be constructed from RAM or ROM technologies, it is much more area effective to construct such a table in Verilog table technology. In Verilog, one can supply a set of inputs and a set of corresponding outputs, and the Verilog compiler will figure out some combination of digital logic gates that will provide said output anytime said input is presented to the table. Thus, we present the organization of our Coefficient Table in Verilog table style.

In describing tables to Verilog, one can supply any field with binary data, digital data, octal data, hexadecimal data, or symbolic data. This disclosure presents supplying Verilog compiler with binary data, without loss in generality.

The Verilog table inputs can be the typical binary 0s and 1s or the special designator x. When used as an input, an x means that the input bit is not used to discriminate the entry of the table. When used as an output, an x gives the Verilog compiler the freedom to deliver either a 0 or a 1 should this input be selected. The combination gives the Verilog compiler great freedom to compact the table and remove redundant logic gates. We will use xs in describing the structure of the Coefficient Table input Coefficient selection.

Figure 5A:
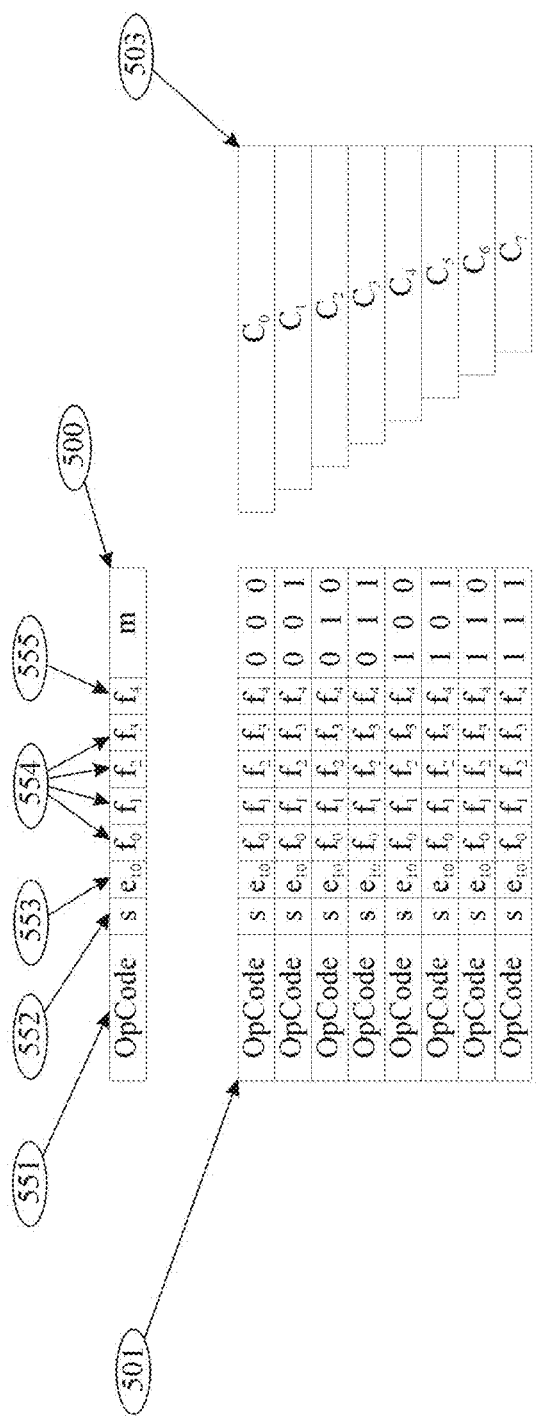

Referring to FIG. 5A: The Coefficient Table is indexed by the OpCode 551, the smallness indicator s 552, the lowest order bit of the exponent $e_{10}$ 553, the higher order 5-bits of the fraction $f_0 f_1 f_2 f_3 f_4$ 554, and the order index m 555. These fields have been bundled together in container 500. In many situations not all of the bit are used in decoding a particular coefficient. This is where x's will be placed. When an input pattern does not match a particular value stored in the table, the Coefficient Table will return a string of all 0s.

Without loss of generality; the 3-bit order index m 555 is used in the iteration process to successively read-out successive Coefficients 503 $C_0$ through $C_7$.

The order index m 555 is only used iterate the readout process from the Coefficient Table.

Exponent Determination

Several of the Transcendental functions use a simple arithmetic variant of the exponent e of the original Operand Ø. RCP, RSQRT, SQRT, Ln 21M, Ln 1M, LOG 1M, EXP2P1, EXPP1, EXP10P1, EXP2, EXP, and EXP10 all fall into this category. The prototype exponent of the result is computed directly from the exponent of the operand.

The cyclic transcendental functions {SIN, COS, TAN} can use an additional small field (not shown) associated with the $C_0$ coefficient as the prototype exponent. After polynomial evaluation, this seeded exponent is used by the Round and Normalize section in order to produce the exponent of the final result R. The non-cyclic functions discussed above encode this field to the Verilog compiler as xs.

Iteration Termination

There are four (4) ways to determine when to stop iterating: fixed count, tabularized count, tabularized stop-bit, examination of the Coefficient Multiplier product.

The fixed count means is the easiest, all transcendental evaluating polynomials must have the same length or the higher coefficients in the table are encoded as 0s. A fully pipelined version may utilize this means.

The Coefficient Table can contain the degree of the polynomial to be evaluated (MAX) on a per Coefficient set basis. This is most easily accomplished by associating a small count field with the $C_0$ Coefficient. Other coefficients indexed by m will encode this field with x's.

The Coefficient Table can contain a stop bit with a particular coefficient (END). After this coefficient is consumed in the iteration, the iteration is allowed to exit and the function unit deliver its result.

Finally, the product of the Coefficient Series multiplier can be examined, if this particular product does not contain any bits that remain in the accumulator, then the iteration can be simply be considered complete. With a reduced argument near the center of the interval of evaluation, the number of leading 0s of the Power Series multiplier grown more rapidly than a reduced argument near the end of the interval.

Without loss of generality, the rest of the disclosure describes the polynomial evaluation as if it were fixed length.

Coefficient Table Structure

Referring to FIG. 5A: we will assume, without loss of generality, that any set of coefficients 501 contains all 8 coefficients 503. In practice, Coefficients that are all 0s are not stored in the Coefficient Table, so the Coefficient Table decoder will not recognize a given input pattern and in response the table will produce a coefficient containing all zeroes (0s). There may be transcendental intervals in which fewer Coefficients are required to achieve the desired accuracy. In these cases, no more coefficients are installed after the last needed coefficient.

Figure 5B:
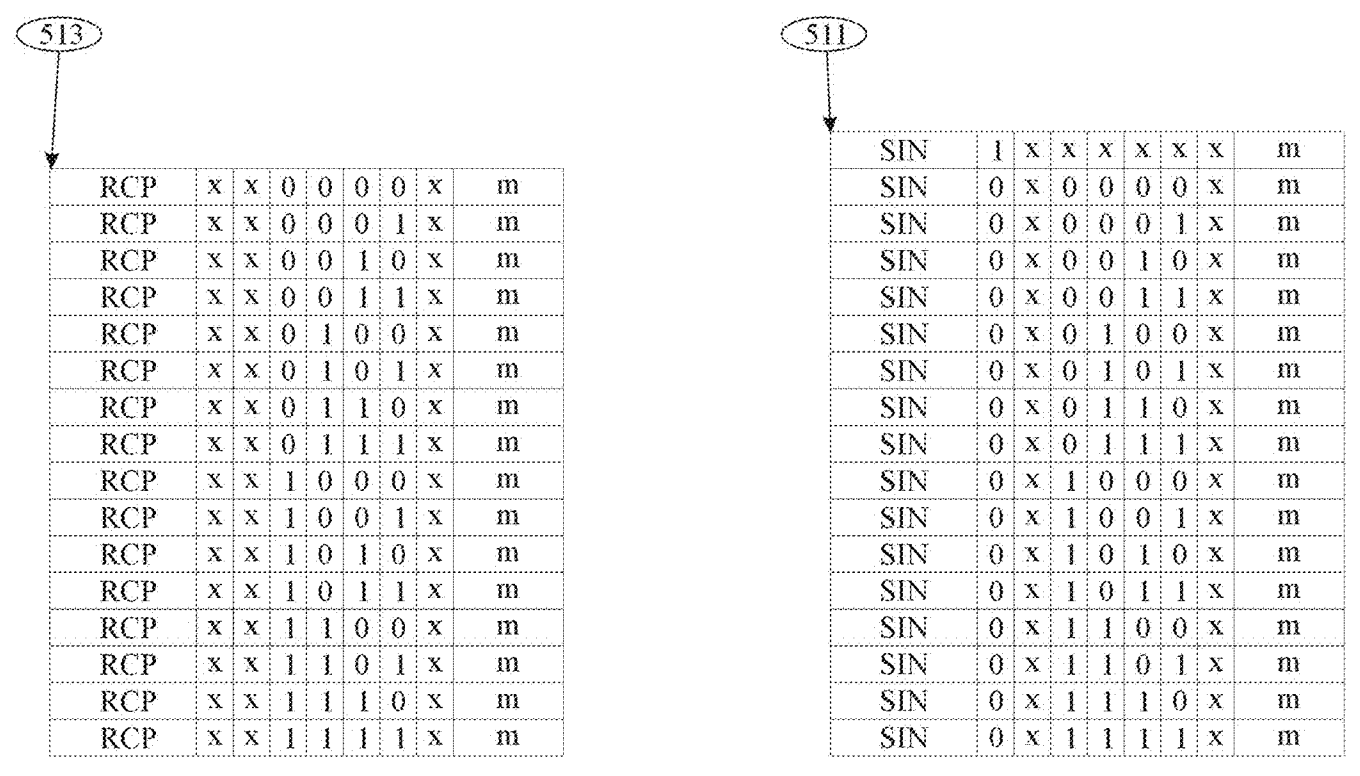

Referring to FIG. 5B: The Reciprocal function Coefficient Set 513 does not include the small concept and fits into the Coefficient Table.

The Reciprocal Table Coefficient Set 513 contains 16-sets of coefficients; each set contains 8 coefficients, without loss of generality.

The Reciprocal Table Coefficient Set 513 does not utilize the concept of small, thus the s field 552 in the Coefficient input table is marked with x's. Nor does the Reciprocal Table use the lowest order bit of the exponent 551 also marked with x's, nor does it use the $f_4$ bit from the fraction also marked with x's.

Here, the high order 4-bits of the fraction index the table and m cycles through the coefficients successively.

The SIN function does include the small concept and fits into the Coefficient Table identified by 511.

Here we see the SIN function uses the concept of small. There is only 1 entry n the small set of coefficients, and there are 16 non-small sets of Coefficients in this table. When an entry is small, there are no other bits used in decoding the small set of Coefficients from the table.

Some future transcendental function added to this function unit might need 2 or more small sets of coefficients to achieve required accuracy with a fixed or otherwise limited set of coefficients. in which case one or more of those x's would be given a value of 0 or 1.

There is no COS table as COS gets merged with SIN during precision salvaging argument reduction. The table for TAN 512 is structurally identical to the SIN 511 table, but with its own unique coefficients.

The Ln 2P1, TAN, A SIN, A TAN, EXP2M1, Ln 2P1 function Coefficient Set tables are structurally identical to the SIN Coefficient Set 511, but each contains its own unique sets of coefficients.

Figure 5C:
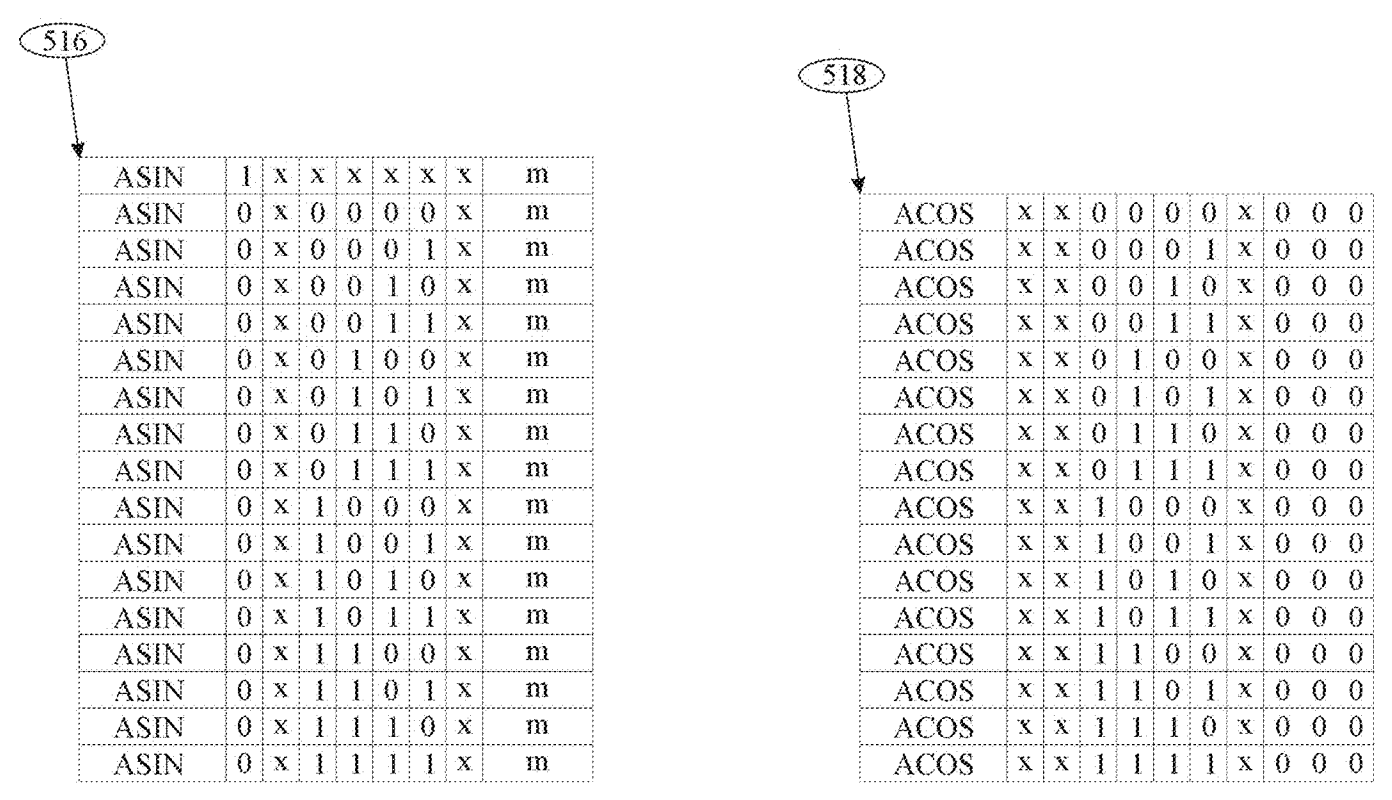

Referring to FIG. 5C: The OpCodes for A SIN and A COS have been chosen so that only the lower order bit is different between the two (2) OpCodes. The OpCode field of the A SIN and A COS tables will have the lower order bit of the OpCode input to the Verilog table compiler as an x so that both A SIN and A COS share the remaining table entries. This simply requires the A SIN and A COS OpCodes to differ only in the lower order bit. So while argument reduction converted COS into SIN, A COS remains one coefficient different than A SIN.

Thus A SIN Coefficient $C_0$ is identified by all of the OpCode Bits, while coefficients $C_1$ though $C_7$ are identified by using an x in the lower order OpCode position (not shown).

The A COS Coefficient Set could be structurally identical to the A SIN Coefficient Set. But after the $C_0$ coefficient is read out of the A COS table, the rest of the coefficients come from the A SIN table. This is illustrated in FIG. 5C by denoting the three (3) m bits being 000.

Figure 5D:
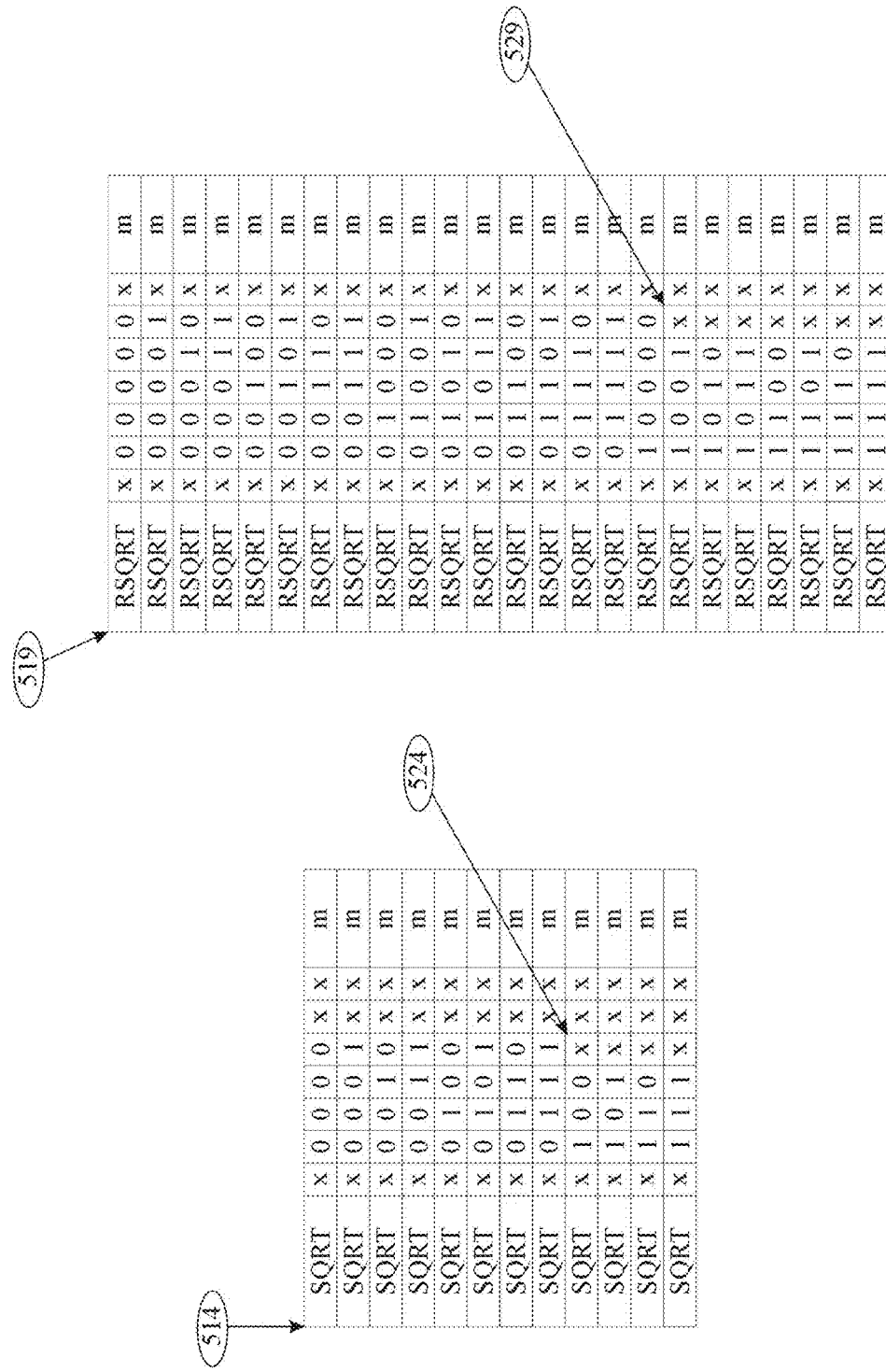

Referring to FIG. 5D: The SQRT function uses the lowest significant bit of the exponent $e_{10}$ and fits into the Coefficient Table as identified by 514.

Here, we see the lowest bit of the exponent $e_{10}$ 533 indexing the table; we also see that this table has 12 entries rather than the usual 16. The first 8 entries cover the argument range [1,2) while the second 4 entries cover the range [2,4). Entries are paired by placing an x in the lower order bit of the fraction indexing the Coefficient Table 524. The polynomial has sufficient precision with these interval sizes.

The SQRT Table does not utilize the concept of small, either.

The RSQRT function uses the lowest significant bit of the exponent $e_{10}$ and fits into the Coefficient Table as identified by 519.

Here, we see the lowest bit of the exponent $e_{10}$ indexing the table; we also see that this table has 24 entries rather than the usual 16. The first 16 entries cover the argument range [1,2) while the second 8 entries cover the range [2,4). Entries are paired by placing an x in the lower order bit of the fraction indexing the Coefficient Table 529. The polynomial has sufficient precision with these interval sizes.

The RSQRT Table does not utilize the concept of small, either.

Use of $F_5$

Referring back to FIG. 5A: There has not been a use disclosed for the $f_5$ 555 bit of the fraction 1.f. This bit is present to resolve situations where one fixed number of intervals is not adequate to deliver the desired precision. TAN is a candidate to use this as it has been showing precision problems near its inflection point TAN 2PI(½) ~=1.0. the TAN function may end up with 18 intervals: the small interval, the 16 normal intervals, with the $16^{th}$ interval broken up into interval 16 ($f_5$=0) and 17 ($f_5$=1). Verilog table methodology makes this kind of table utilization straightforward for hardware implementations.

Iterative Algorithm

Figure 8:
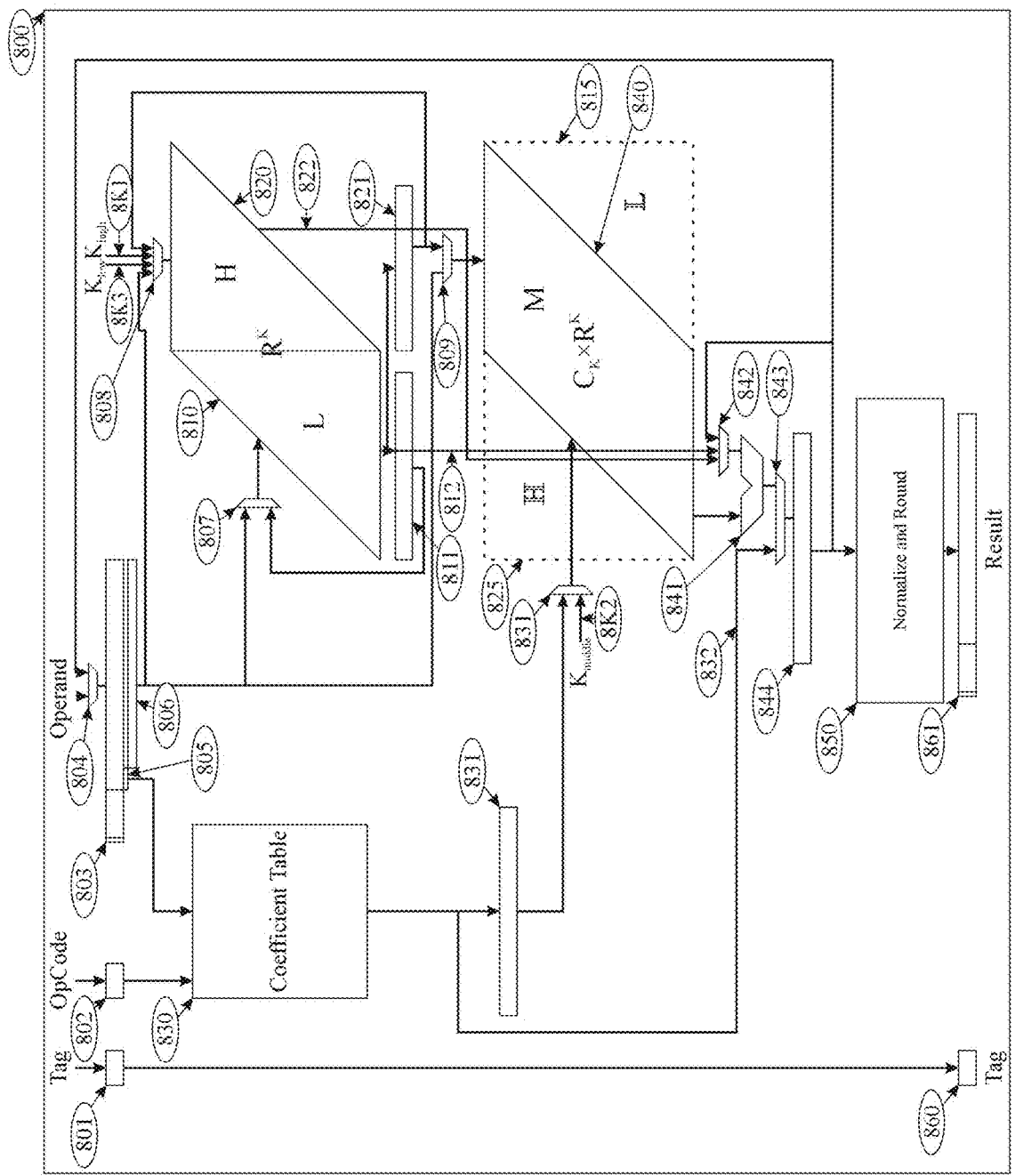
FIG. 8 illustrates, in block diagram form, an embodiment of the polynomial configuration.

Referring to FIG. 8: The iterative algorithm of FIG. 6 coordinates 3 activities on FIG. 8: Coefficient Table access 830, Power Series Multiplication 810 and 820, and Coefficient Series multiplication 840 and accumulation 844; as the following illustrates:

$C_{k+1}$=CoefficientTable[OpCode,$s$,$e_{10}$,$f_{0.5}$,$k$+1]

$x^{k+1}$=$x_{k-1}$×$x^2$

SUM$_{k+1}$=SUM$_k$+$C_k$×$X^k$

In order to get to the point where iteration can begin, several steps are performed to position all of the necessary data in the correct positions. These lead in steps necessarily use the Coefficient Table 830, and the Power Series Multiplier 810 and 820. In order not to waste power, the last two (2) cycles of the iteration do not need a new Coefficient Table access, nor perform an unnecessary Power Series Multiplication.

The Power Series iterator $x^{k-1} \times x^2$ uses the $x^2$ multiplier and the $x^{k-1}$ multiplicand in order to better pipeline the Power Series products to the Coefficient Multiplier.

The iterative algorithm will be described in greater detail later on in the disclosure.

EXEMPLARY EMBODIMENTS

In one exemplary embodiment 800, there are two (2) multiplier arrays; the first array configured to produce a Power Series 810 and 820 of the reduced argument r 806, the second array is configured to produce polynomial evaluation terms consuming the output of the Power Series Multiplier 809 and the output of the Coefficient Table 831.

The first multiplier produces the series $\{r^2, r^3, r^4, \ldots, r^{max-1}, r^{max}\}$. It is called the Power Series Multiplier and delivers this sequence to the Coefficient Multiplier.

The second multiplier produces the series $\{C_1 \times r, C_2 \times r^2, C_3 \times r^3, \ldots C_{max} \times r^{max}\}$. It is called the Coefficient Multiplier and delivers this product sequence to the Accumulator.

The Accumulator 844 is initialized to $C_0$ 832 and then accumulates the products from the Coefficient Multiplier 840 into:

$$p(r) = C_0 + C_1 \times r + C_2 \times r^2 + C_3 \times r^3 + C_4 \times r^4 + C_5 \times r^5 + C_6 \times r^6 + C_7 \times r^7$$

which can also be written:

$$p(r) = \sum_{k=0}^{7} C_k \times r^k \quad \text{// note change in spacing of 7 and of } k = 0$$

Without loss of generality, the Transcendental approximation is evaluated using an iterative scheme, adding one new product each cycle. Thus a 7 term polynomial takes 7 cycles plus pipeline delay and evaluation setup time. The end result is transcendental functions which can be evaluated in as few as 11-cycles and achieve a faithful rounding as an IEEE-754-2008 64-bit number.

The entire degree 7 polynomial evaluation is:

| Power Series ; | Coefficient Series |
|---|---|
| $r^2 = r \times r$ ; | $S_0 = C_0 + C_1 \times r$ |
| $r^3 = r \times r^2$ ; | $S_1 = S_0 + C_2 \times r^2$ |
| $r^4 = r^2 \times r^2$ ; | $S_2 = S_1 + C_3 \times r^3$ |
| $r^5 = r^3 \times r^2$ ; | $S_3 = S_2 + C_4 \times r^4$ |
| $r^6 = r^4 \times r^2$ ; | $S_4 = S_3 + C_5 \times r^5$ |
| $r^7 = r^5 \times r^2$ ; | $S_5 = S_4 + C_6 \times r^6$ |
| ; | $p(x) = S_5 + C_7 \times r^7$ |

Figure 12A:
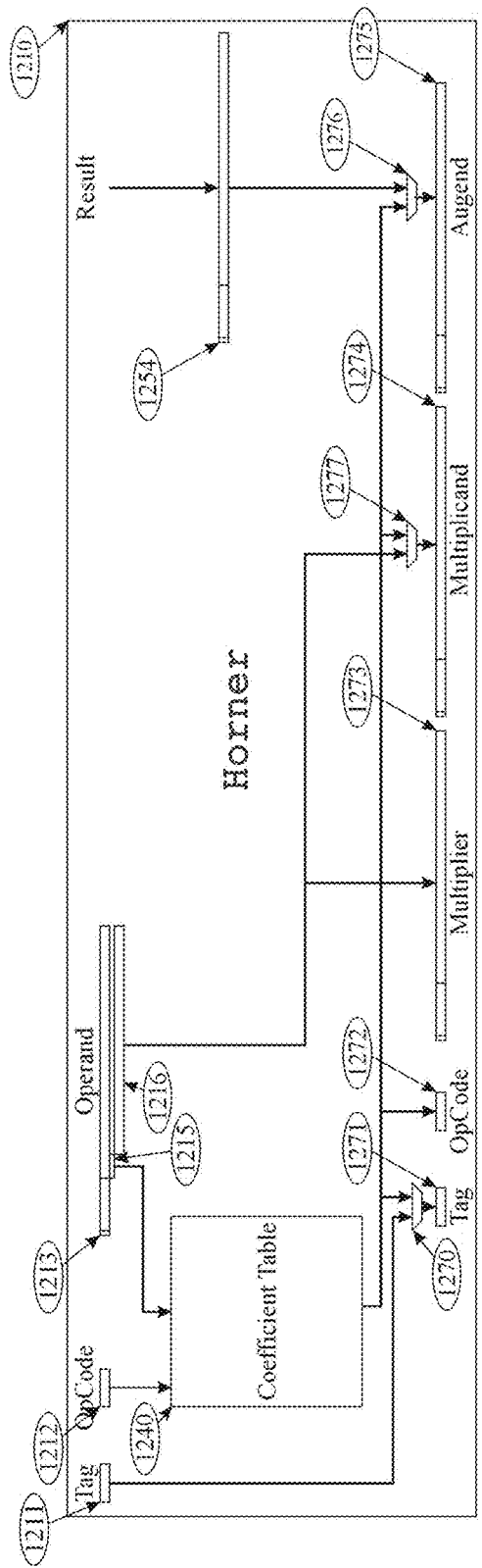
FIG. 12A-FIG. 12B illustrate, in block diagram form, minimal Horner and Estrin embodiments.
Figure 12B:
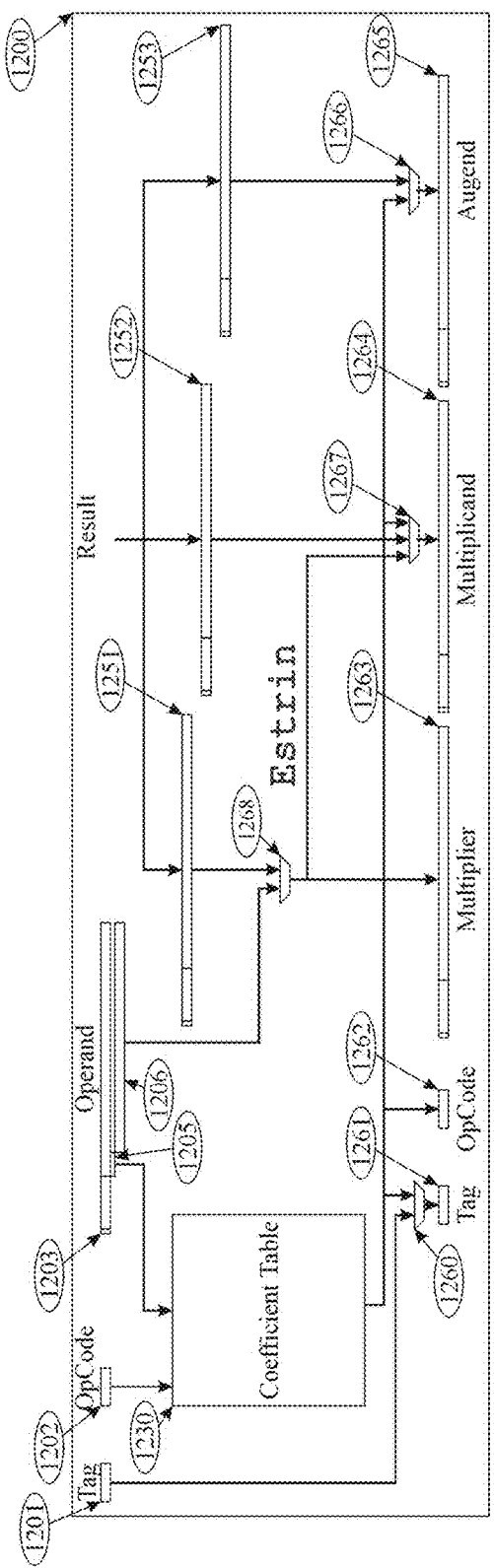

Referring to FIG. 12B: In accordance with a different embodiment, a function unit 1200 1210 that does not actually perform floating point calculations may be used. Here, there is a sequencer that accepts an OpCode and an Operand, and then feeds a normal FMAC function units floating point calculations including an OpCode, necessary Operands, and receives back results. This embodiment consists of a Coefficient Table 1230 1240 including high accuracy version of 2/pi 12K1, 12K2, 12K3, and a Sequencer (not shown).

The Function Unit 1200 1210 delivers fully formed instructions including the requisite operands to a FMAC function unit. The instructions that the Transcendental function units needs of the FMAC unit is limited to FMUL and FMAC instructions. That function unit is configured to deliver results back to this function unit, or to deliver the final result back into the normal result delivery means.

In accordance with this embodiment, the function can be configured to perform Horner evaluation FIG. 12A of the standard polynomial or configured to perform Estrin evaluation FIG. 12B of the standard polynomial.

Horner describes a polynomial evaluation method that is computationally simple:

$$d_k = C_k + r \times d_{k+1} \text{ k decreasing}$$

The reader may feel more comfortable in the form it is normally presented:

$$p(r) = C_0 + r \times (C_1 + r \times (C_2 + r \times (C_3 + r \times C_4)))$$

One starts with coefficient associated with the highest power of the argument x, and evaluates the polynomial from highest towards lowest Coefficient. All of the power $r^k$ multiplications are wrapped up by successive multiplies by r. All (but one) of the Coefficient $C_k \times r^k$ multiplications are wrapped up by the same successive multiplies by r. The calculation sequence for the degree 7 polynomial from beginning to end is:

$$S_6 = C_6 + r \times C_7$$

$$S_5 = C_5 + r \times S_6$$

$$S_4 = C_4 + r \times S_5$$

$$S_3 = C_3 + r \times S_4$$

$$S_2 = C_2 + r \times S_3$$

$$S_1 = C_1 + r \times S_2$$

$$p(r) = C_0 + r \times S_1$$

And for the purpose of visualizing the FMAC unit, with a typical latency of 4-cycles, we order the instructions and dead cycles as:

$$S_6 = C_6 + r \times C_7$$

// waiting for $S_6$

// waiting for $S_6$

// waiting for $S_6$ $$S_5 = C_5 + r \times S_6$$

// waiting for $S_5$

// waiting for $S_5$

// waiting for $S_5$ $$S_4 = C_4 + r \times S_5$$

// waiting for $S_4$

// waiting for $S_4$

// waiting for $S_4$ $$S_3 = C_3 + r \times S_4$$

// waiting for $S_3$

// waiting for $S_3$

// waiting for $S_3$

-continued $$S_2 = C_2 + r \times S_3$$

// waiting for $S_2$

// waiting for $S_2$

// waiting for $S_2$ $$S_1 = C_1 + r \times S_2$$

// waiting for $S_1$

// waiting for $S_1$

// waiting for $S_1$ $$p(r) = C_0 + r \times S_1$$

Horner's Method is numerically stable when higher powers of r have reduced significance and especially when the higher Coefficients have smaller magnitudes. Both of which are manifest, herein.

Given a standard floating point Multiplier and Accumulator (FMAC) function unit that processes only instructions from the standard instruction set, this embodiment feeds this FMAC unit successive instructions and successive:

$$\text{result}_{k-1} = \text{FMAC}(\text{result}_k, r, C_k)$$

to drive the polynomial forward. Successive Horner evaluation of standard polynomial coefficients. Every FMAC delay an iteration is completed. Our prototypical degree 7 standard polynomial is taking 28 cycles.

This function unit simply sequences instructions and coefficients to the nearby FMAC unit and waits for results. This function unit does perform all of the boundary condition checks and some minor reformatting of the reduced argument.

Referring to FIG. 12B: Estrin describes a polynomial evaluation method with stable numeric properties like Horner's whereby the pipelined FMAC unit can be utilized more fully and evaluate the polynomial in fewer total cycles. Consider the degree 7 polynomial:

<tab>$p(r) = C_0 + C_1 \times r + C_2 \times r^2 + C_3 \times r^3 + C_4 \times r^4 + C_5 \times r^5 + C_6 \times r^6 + C_7 \times r^7$ There are multiple calculations that can start in parallel, if we but add some parenthesis to order the evaluation:

<tab>$p(r) = (C_0 + C_1 \times r) + (C_2 + C_3 \times r) \times r^2 + ((C_4 + C_5 \times r) + (C_6 + C_7 \times r) \times r^2) \times r^4$ We evaluate this function as, all the multiplications by r:

$$r^2 = r \times r \quad \text{// Square the reduced argument}$$
$$K_6 = C_6 + C7 \times r \quad \text{// Calculate terms in } r$$
$$K_4 = C_4 + C5 \times r$$
$$K_2 = C_2 + C3 \times r$$
$$K_0 = C_0 + C1 \times r$$

Followed by, all the multiplications by $r^2$:

$$r^4 = r^2 \times r^2 \quad \text{// Square the squared reduced argument}$$
$$K'_4 = K_4 + K_6 \times r^2 \quad \text{// Calculate terms in } r^2$$
$$K'_0 = K_0 + K_2 \times r^2$$

Followed by, the final multiplication by $r^4$:

$$p(r) = K'_0 + K'_4 \times r^4 \quad \text{// Calculate terms in } r^4$$

And for the purpose of optimizing the FMAC unit, with a typical latency of 4-cycles, we order the instructions and dead cycles as:

$$r^2 = r \times r$$
$$K_6 = C_6 + C7 \times r$$
$$K_4 = C_4 + C5 \times r$$
$$K_2 = C_2 + C3 \times r$$
$$K_0 = C_0 + C1 \times r$$
$$r^4 = r^2 \times r^2$$
$$K'_4 = K_4 + K_6 \times r^2$$

// waiting for $K_0$ $$K'_0 = K_0 + K_2 \times r^2$$

// waiting for $K'_0$ and $K'_4$

// waiting for $K'_0$

// waiting for $K'_0$ $$p(r) = K'_0 + K'_4 \times r^4$$

to fully utilize the 4-cycle FMAC pipeline. Here, after argument reduction we achieve our result after 9 instructions and 17-cycles.

Figure 13:
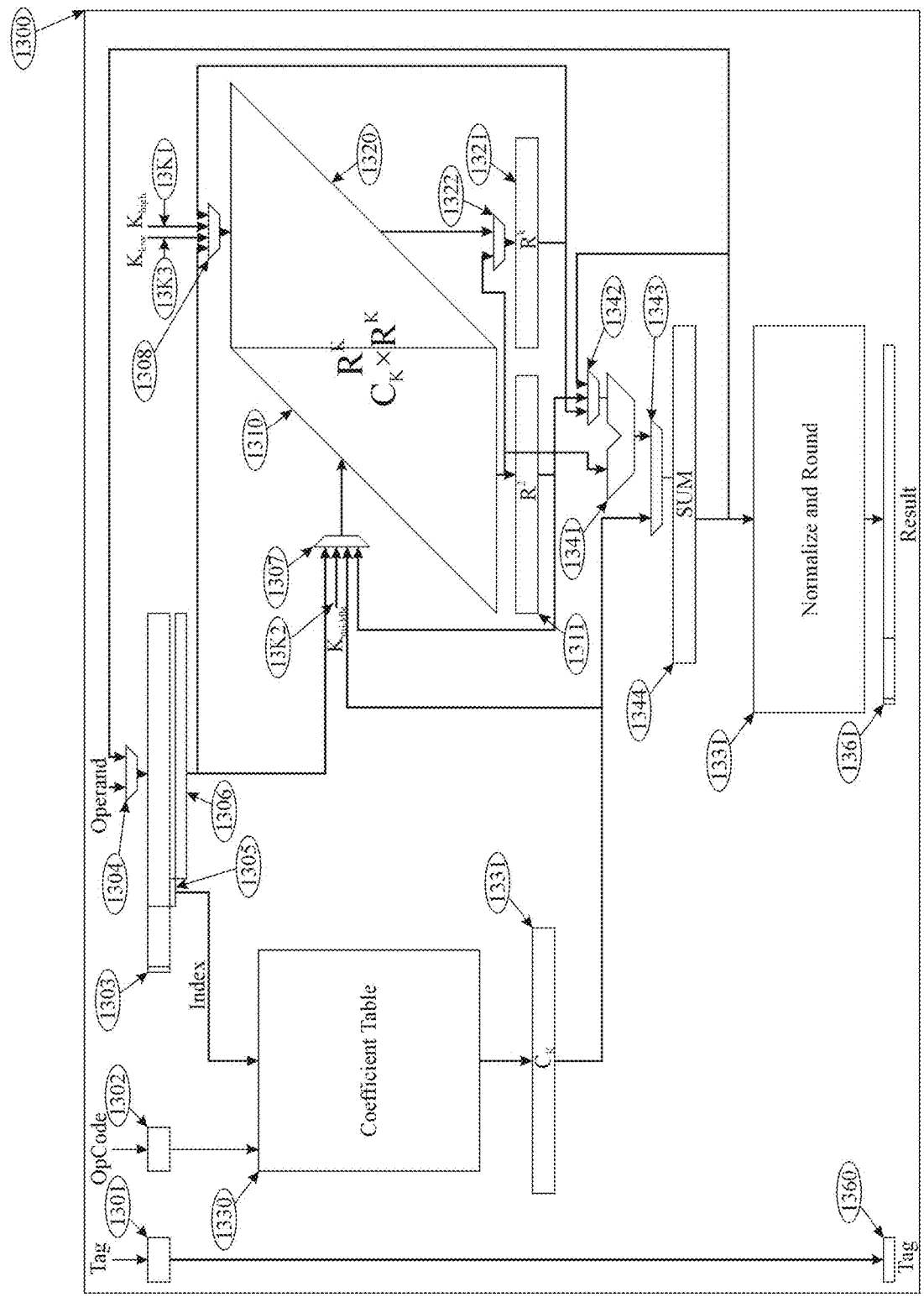
FIG. 13 illustrates, in block diagram form, a reduced embodiment.
Figure 14:
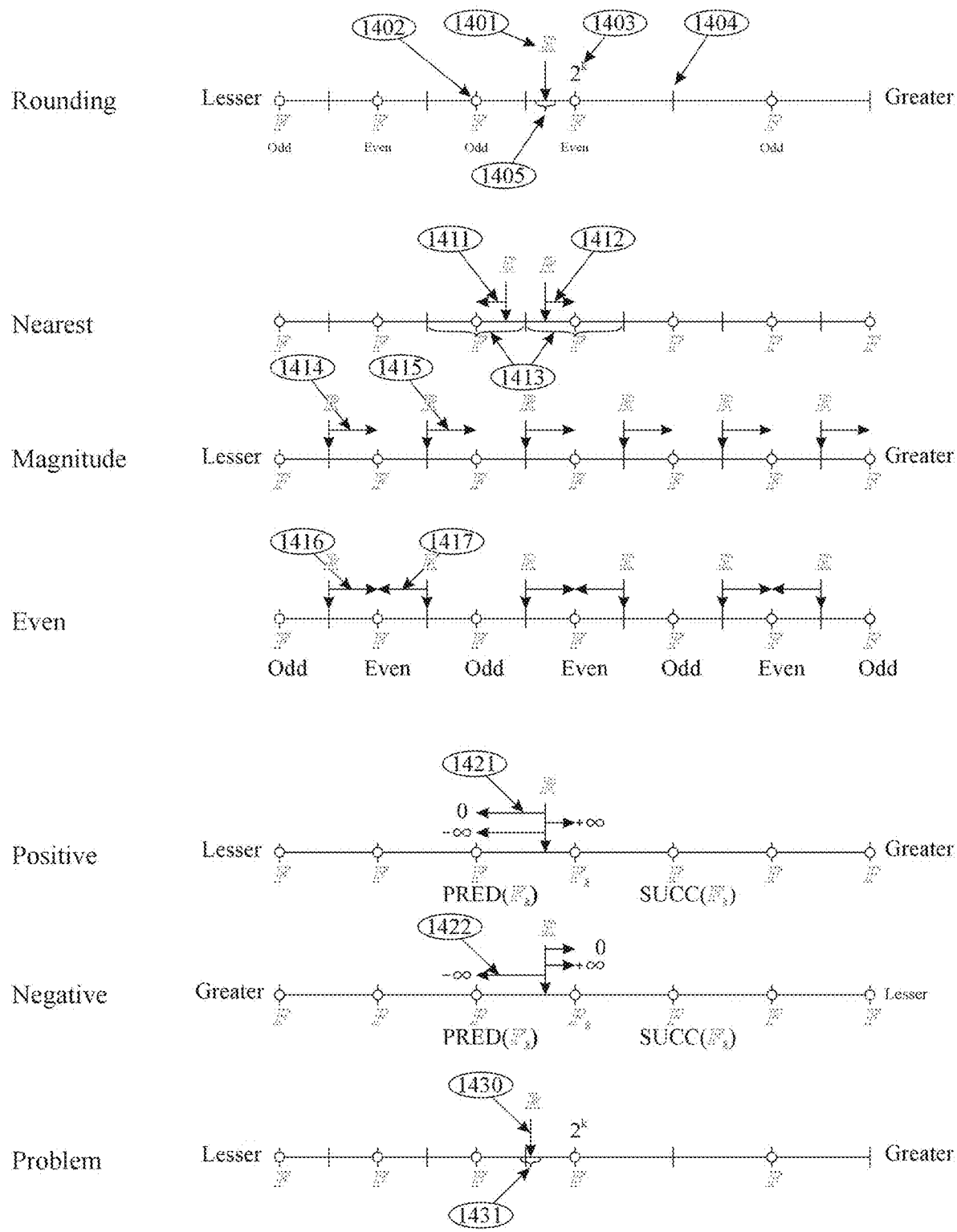
FIG. 14 illustrates, in line diagram form, an embodiment capable of performing 2 transcendental calculations simultaneously.

Referring to FIG. 13: In accordance with a different embodiment, it is possible to significantly reduce the hardware expenditure of the preferred embodiment by sharing the Power Series Multiplier 810 and 820 with the Coefficient Multiplier 840; saving area at the cost of somewhat lower performance. While this doubles the number of iteration cycles, it does not double the total number of cycles end-to-end. Since the multiplier 1310 and 1320 width is identical with a prior embodiment, as is the accumulator 1344, this embodiment suffers no precision loss over the preferred embodiment.

This embodiment consists of a Coefficient Table 1330 including high accuracy version of 2/π, and a sequencer embedded in a fairly typical FMAC unit with 2 additional flip-flops 1311, 1321 inside. There are three (3) configurations of interest: a) FMAC, b) Clenshaw, c) Horner.

The appropriate FMAC unit for this embodiment is one that has been configured to perform Goldschmidt or Newton-Raphson, Divides and Square Root calculations. These FMAC units contain a 57-bits×57-bits multiplier 1310 and 1320, and high bit-count accumulator 1344, that allow the Transcendental calculations to achieve faithful rounding.

The multiplier has been configured to be a vertically sliced multiplier; triangle 1310 is the left hand side, while triangle 1320 is the right hand side.

FMAC Configuration

A typical fully pipelined IEEE 754-2008 FMAC without the transcendental features unit performs a 64-bit FMAC instruction in 4 cycles. When augmented to perform transcendental calculations, the Round and Normalize stage is not utilized in the iteration due to the fixed point nature of the transcendental calculation. Assuming the fall through time of the multiplier 1310 and 1320 is one cycle and the fall through time of the adder 1344 is another cycle, an iteration can be started and completed every 2 cycles.

This configuration is competitive with the Clenshaw and Horner sequencing arrangements in delay at a higher cost in power. The Power Series multiplication uses one of the pipelined cycles and the Coefficient multiply uses the other.

The entire degree 7 polynomial evaluation is:

| Power Series; | Coefficient Series |
|---|---|
| $r^2 = r \times r$ | $S_0 = C_0 + C_1 \times r$ |
| $r^3 = r \times r^2$ | $S_1 = S_0 + C_2 \times r^2$ |
| $r^4 = r^2 \times r^2$ | $S_2 = S_1 + C_3 \times r^3$ |
| $r^5 = r^3 \times r^2$ | $S_3 = S_2 + C_4 \times r^4$ |
| $r^6 = r^4 \times r^2$ | $S_4 = S_3 + C_5 \times r^5$ |
| $r^7 = r^5 \times r^2$ | $S_5 = S_4 + C_6 \times r^6$ |
|  | $p(x) = S_5 + C_7 \times r^7$ |

RCP, RSQRT, SQRT, LN 2P1, EXP2M1, A SIN, and A COS are performed in this standard length 16-cycle calculation.

LnP1, and LOG P1 are performed in the extended length 18-cycle calculation; extended by High precision Multiplication after polynomial evaluation.

EXP, and EXP10 are performed in the extended length 18-cycle calculation; extended by High Precision Multiplication before polynomial evaluation.

SIN, COS are performed in the extended length 18-cycle calculation; extended by Precision Salvaging Argument Reduction.

TAN can be calculated in either the extended length 18-cycle calculation or the super extended length 30-cycles depending on whether a reciprocation is required. TAN always uses Precision Salvaging Argument Reduction.

A TAN can be calculated in either standard length 16-cycles or an extended length 28-cycles depending on whether a reciprocation is required.

Clenshaw Configuration

Clenshaw describes a method that directly evaluates polynomials directly from Chebyshev coefficients that is numerically stable. The Clenshaw iteration is:

$$d_k = 2 \times r \times d_{k+1} - d_{k+2} + A_k \text{ k decreasing}$$

which can also be written:

$$d_k = 2 \times r \times d_{k+1} + (A_k - d_{k+2}) \text{ k decreasing}$$

Given a standard floating point Multiplier and Accumulator function unit that processes not only instructions from the standard instruction set but one additional FMAC instruction, this embodiment feeds slightly modified FMAC unit successive instructions and successive.

The factor of 2 in the Clenshaw iteration is performed by shifting the Augend $(A_k - d_{k+2})$ one bit to the right.

The subtraction of $d_{k+2}$ from $A_k$ can be performed while the multiply of $2 \times r \times d_{k+1}$ is performed. The $d_{k+2}$ value resolved the previous cycle so the subtraction is completely reasonable. Alternately, the accumulator can be configured such that it performs the add of $A_k$ at the same time it performs the subtract of $d_{k+2}$.

The standard way of initializing the iteration is to assign $d_{k+2} = 0$ and $d_{k+1} = 0$. Instead, we hand optimize the first two (2) iterations by simple algebra, saving pipeline cycles. The iteration now proceeds as:

$$d_k = A_k$$

$$d_{k-1} = 2 \times r \times A_k + A_{k-1}$$

$$d_{k-2} = 2 \times r \times d_{k-1} + (A_{k-2} - d_k)$$

And the first two (2) calculations account for the initialization: and can be performed in parallel. The third represents the iteration itself.

This embodiment saves coefficient storage area as Chebyshev coefficients have fewer bits in them than when blended back into standard polynomial coefficients. The binary points for $A_k$ and $result_{K+2}$ are known well in advance enabling the subtraction to be performed without access to floating point calculation unit.

Horner Configuration

Alternatively, Horner describes a method that is computationally simple and has the property of numeric stability. This is the same method as disclosed in the Minimal embodiment. Here Horner's method is sequenced directly in the Transcendental/FMAC function unit rather than driving a different shared FMAC function unit.

Horner's configuration can evaluate RCP, RSQRT, SQRT, LN 2PI, EXP2M1, A SIN, and A COS in 21-cycles.

LnP1, and LOG P1 are performed in the extended length 23-cycle calculation; extended by High Precision Multiplication after polynomial evaluation.

EXP, and EXP10 are performed in the extended length 23-cycle calculation; extended by High Precision Multiplication before polynomial evaluation.

SIN, COS are performed in the extended length 23-cycle calculation; extended by Precision Salvaging Argument Reduction.

TAN can be calculated in either the extended length 23-cycle calculation or the super extended length 40-cycles depending on whether a reciprocation is required. TAN always uses Precision Salvaging Argument Reduction.

A TAN can be calculated in either standard length 21-cycles or an extended length 38-cycles depending on whether a reciprocation is required.

Because there is no limitation of IEEE 754-2008 container sizes from the Transcendental unit to the calculating unit, the full width of the 57-bits×57-bits multiplier 1310 and 1320 and the full width of the accumulator 1344 can be exploited to gain enough accuracy for faithfully rounded results.

The Iterative Algorithm

The calculation of transcendental functions revolves around polynomial evaluation, which in turn, revolves around generating a Power Series of the reduced argument, generating a polynomial term, and accumulating the products as a running sum.

Polynomial Evaluation

Figure 6A:
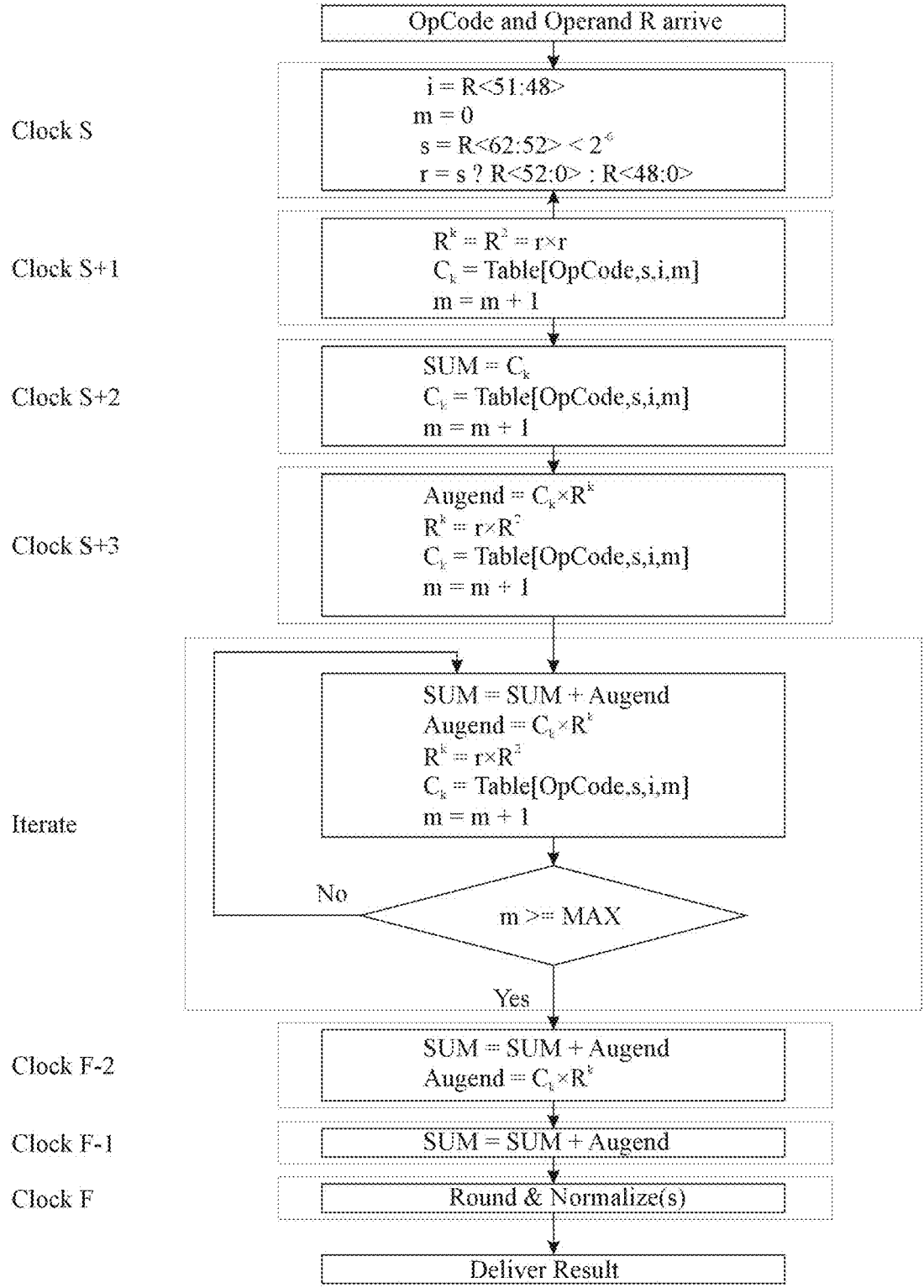
FIG. 6A-FIG. 6C illustrate, in flow diagram form, the Iterative Algorithm, Precision Salvaging Argument Reduction algorithm, and High Precision Multiplication Algorithm.
Figure 6B:
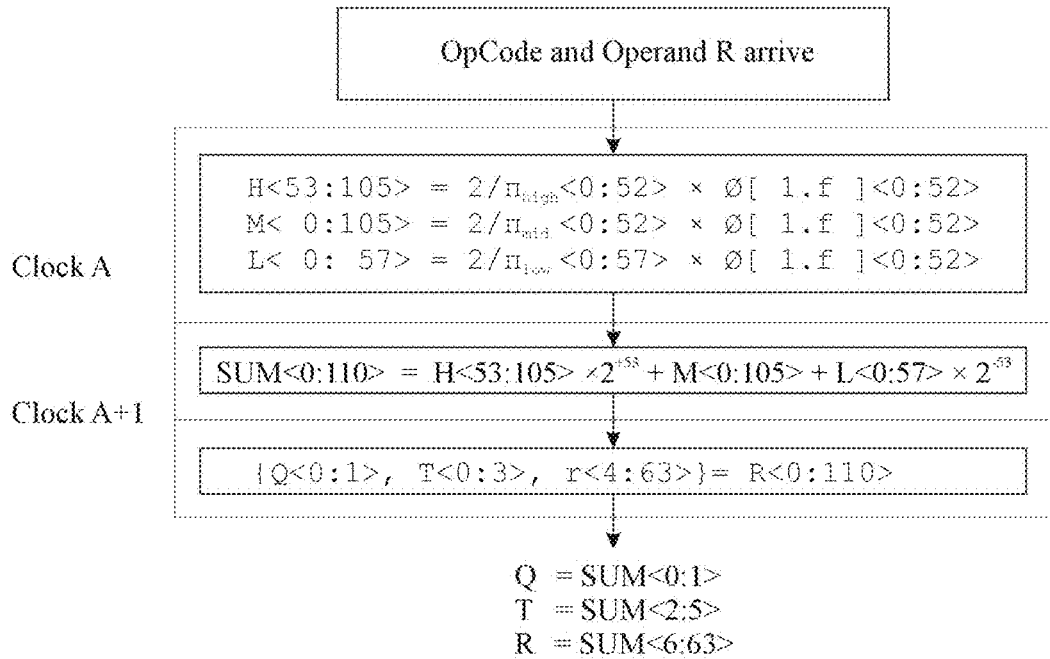
Figure 6C:
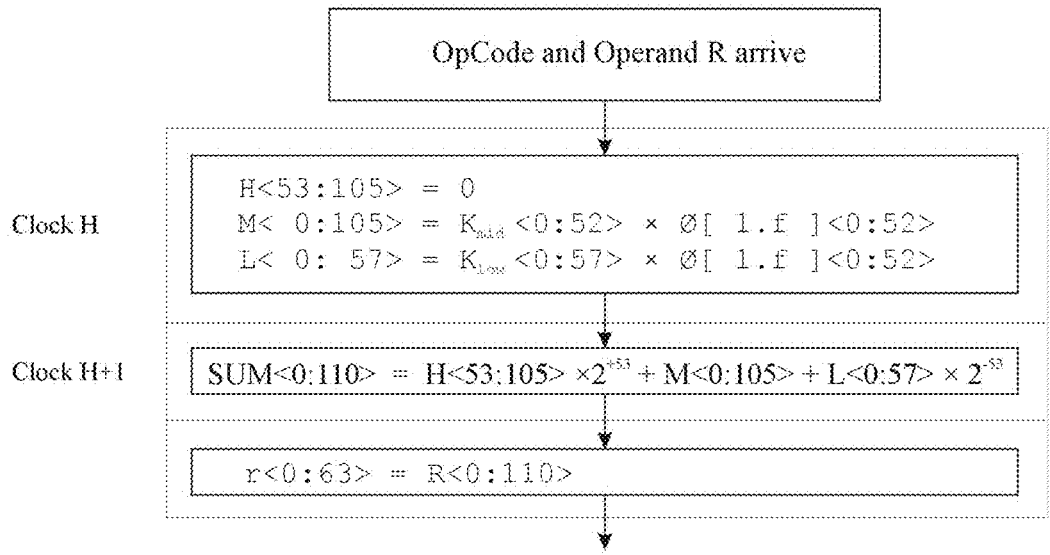

Referring to FIG. 6: Iterative calculations require a short start up sequence (S, S+1, S+2, S+3), and a short finish up sequence {F−2, F−1,F}, with an iterative stage in the middle.

This section refers to FIG. 6 to walk the reader through the iterative algorithm. Many of the references to points in figures refer to FIG. 8, the preferred embodiment. This section provides the glue between the embodiment FIG. 8 and the iterative algorithm FIG. 6A and FIG. 6B.

Clock S

In the first clock S, the top 4-bits of the fraction are isolated 805 and become the primary index into the Coefficient Table 830; m is initialized to zero (0), the exponent e is examined to determine if the small set of coefficients is to be used, or the normal set of coefficients; based on this determination, the reduced argument r 806 is selected from the fraction bits. If the small path is chosen, r 806 retains all of the fraction bits (including the hidden bit), otherwise, r 806 becomes the lower 48-bits of the fraction and zero extended.

Clock S+1

The first Power Series Multiplication 810 and 820 begins evaluation in the non-sliced configuration. The product will be assigned into both the $R^2$ 811 register and the $R^k$ 821 register.

The $C_0$ 832 coefficient is read out of the Coefficient Table 830.

The control variable m is incremented.

It is possible for Clock S and Clock S+1 to be combined in many of the slower implementations, since the check for smallness is used to mask the higher order bits from the Power Series multiplication started this cycle and to modify which entries in the Coefficient Table are accessed.

Clock S+2

The $C_0$ 832 coefficient initializes the SUM 844 through multiplexer 843.

The $C_1$ coefficient is read out of the Coefficient Table 830 and captured in a register 831.

The control variable m is incremented.

Clock S+3

The $C_k$ 83 coefficient is multiplied by the $R^k$ 821 register from the Power Series Multiplier 810 and 820 and the result will be captured in the Augend register 844.

The $R^2$ register 811 is multiplied by the reduced argument r 806 and the result will land in the $R^k$ register 821.

The $C_2$ coefficient is read out of the Coefficient Table and captured in $C_k$ register 831.

The control variable m is incremented.

This is the last cycle of the setup phase of transcendental evaluation.

Iterate

The $C_k \times r^k$ product is added 841 to the current SUM register 844 and the result delivered back to the current SUM register 844.

The new $C_k$ coefficient 831 is multiplied by the new $R^k$ register 821 from the Power Series Multiplier 810 and 820 and the result be added immediately 841 and delivered to the SUM register 844.

The $R^k$ register 821 is multiplied by the reduced argument r 806 and the result will land in the $R^k$ register 821.

The $C_k$ coefficient is read out of the Coefficient Table 830 and captured in $C_k$ register 831.

The control variable m is incremented. The control variable m can be checked to see if the iterations are complete or the Coefficient Table can supply an END field to terminate the iteration. The number of cycles in the iteration is dependent on the OpCode of the transcendental function.

Clock F−2

The $C_k \times r^k$ product is added 841 to the current SUM register 844 and the result delivered back to the current SUM register 844.

The $C_k$ coefficient 831 is multiplied by the $R^k$ register 821 from the Power Series Multiplier 810 and 820 and the result will be the $C_k \times r^k$ product.

Clock F−1

The $C_k \times r^k$ product is added 841 to the current SUM register 844 and the result delivered back to the current SUM register 844.

Clock F

The current SUM register 844 holds the pre-rounded, pre-normalized result at this point.

The higher order bits of SUM 844 are observed to find the bit of most significance. Due to the way the non-small polynomials have been setup, there are only 4-5 bits of scan necessary. Small polynomial evaluations only need scan 1-2 bits to normalize the fraction.

The SUM 844 is rounded 850 according to the current rounding mode and the lower order bits from SUM.

The exponent and sign are inserted to form the final IEEE 754-2003 result.

Area Versus Performance

The number of cycles needed to insure IEEE 754-2003 accuracy is dependent on the transcendental function being evaluated and the number of term in the evaluated polynomial and the number of entries in the Coefficient Table.

Increasing the number of terms in the polynomial improves the accuracy with slowly increasing cost in time (1 cycle per term in the preferred embodiment) and slowly increasing cost in the area used to hold the Coefficient Table.

Increasing the number of entries in the table improves accuracy and decreases the number of iteration cycles needed, at the cost of doubling the table size each time one more bit is used to index the table. This is where the Verilog style table indexing becomes so valuable. The SQRT function 514 only needs 12 entries, while the RSQRT function 519 needs 24.

Given that the accuracy requirement is fixed (faithful rounding), the two remaining variables are iteration count, and table size. Implementations may choose amongst them differently. One implementation may decide table size is paramount and choose more iterations for seldom used transcendental functions, another may choose performance over table size. The disclosed embodiment allows each implementation to make suitable choices for themselves.

Power Series Multiplication

In accordance with at least one embodiment, the Power Series Multiplier utilizes a Booth recoder that recodes from carry-save format. This saves a cycle in the startup of the Power Series Multiplier. This is the $R^k$ input of that multiplier.

Coefficient Series Multiplier

In accordance with at least one embodiment, the coefficient series multiplier utilizes a Booth recoder that recodes from carry-save format. This saves a cycle in the startup of the Coefficient Series Multiplier. This is the $R^k$ input to that multiplier.

Accumulation

In accordance with at least one embodiment, the accumulation 841, 842, 843, and 844 is performed in carry-save format in order to avoid a carry chain delay. Each bit (other than the least significant) is represented by 2 signals one representing the current sum of this significance level, the other representing any carry in from the next lesser significance level.

Accumulation in carry-save format takes but 2-gates of delay rather than a whole carry chain of delay. It also enables the accumulator to be positioned in the multiplier tree as first demonstrated in the floating point multiplier of the IBM SYSTEM 360/91 (Tomasulo circa 1967).

Precision Salvaging Argument Reduction

Referring to FIG. 6B top: When precision salvaging argument reduction is required, the iteration sequence is modified by adding a 2-clock precision salvaging argument reduction calculation prior to polynomial evaluation.

Precision Salvaging Argument Reduction is applied if the Transcendental Function is {SIN, COS, TAN}.

Clock A

In the first cycle three independent multiplies are calculated using a high precision version of one of the special transcendental numbers. The multiplication 810 delivering a value to Left L utilizes the higher order bits of the high precision transcendental number. The multiplication 820 delivering a value to Right R  R utilizes the lower order bits of the high precision transcendental number. The multiplication 840 delivering a value  M to adder 841 utilizes the middle order bits of the high precision transcendental number. The following products are formed:

$$H<53:105>=2/\pi_{high}<0:52>\times\varnothing[1,f]<0:52>$$

$$M<0:105>=2/\pi_{mid}<0:52>\times\varnothing[1,f]<0:52>$$

$$L<0:57>=2/\pi_{low}<0:57>\times\varnothing[1,f]<0:52>$$

Clock A+1

The second cycle accumulates the individual multiplications 810, 820, and 840 into one very long product, from which the reduced argument is selected.

$$SUM<0:110>=H<53:105>\times 2^{+53}+M<0:105>+L<0:57>\times 2^{-53}$$

$$\{Q<0:1>,T<0:3>,r<4:62>\}=SUM<0:110>$$

This reduced argument SUM<2:62>, then replaces the original Operand θ 803 and is used as the operand in polynomial evaluation, while Q is used to control the quadrant of evaluation.

High Precision Multiplication

Referring to FIG. 6B bottom: When High Precision Multiplication is required, the iteration sequence is modified by adding a 2 clock High Precision Multiplication calculation the transcendental calculation.

High Precision Multiplication is applied on {EXP, EXP10, LN, and LOG} when the designer chooses to minimize table area.

High Precision Multiplication is not applied if the Transcendental Function is: {RCP, RSQRT, SQRT, LN 2, EXP2, A TAN}.

High Precision Multiplication is performed both prior to polynomial evaluation {LnP1 and Log P1} and subsequent to polynomial evaluation (EXPM1, and EXPOM)}. The former feeds the multiplied result 844 back to the operand 803, while the later takes the polynomial result 844, feeds it back through the Operand register 803, through both multipliers to generate a high precision product 844 which proceeds through Round and Normalize 850.

Clock H

In the first cycle three independent multiplies 810, 820, 840 are calculated using a high precision version of one of the special transcendental numbers 8K1, 8K2, 8K3. The multiplication 810 delivering a value to Left L utilizes the higher order bits of the high precision transcendental number 8K1. The multiplication 820 delivering a value to Right R is set to zero (0). The multiplication 840 delivering a value to Augend utilizes the middle order bits  M of the high precision transcendental number 8K2.

$$H<53:105>=0$$

$$M<0:105>=Const<0:52>\times\varnothing[1,f]<0:52>$$

$$L<0:57>=Const<53:110>\times\varnothing[1,f]<0:52>$$

Clock H+1

The second cycle accumulates the individual multiplications into one very long product, from which the reduced argument is selected.

$$SUM<0:110>=H<53:105>\times 2^{+53}+M<0:105>+L<0:57>\times 2^{-53}$$

$$R<0:57>=SUM<0:110>$$

This selected argument R<0:57>=SUM<0:57>, then replaces the original Operand Ø 803 or proceeds through Round and Normalize, depending on the OpCode 802.

Coefficient Methodology

Function Interpolation

Functions (transcendental or not) can be approximated in a variety of ways. Many of the ways interpolate between a set of points of evaluation and the actual function result at that point of evaluation:: given $\langle x_k, f(x_k) \rangle$. There are standard polynomial expansions of the form:

$$p(x) = C_0 + C_1 * x + C_2 * x^2 + C_3 * x^3 + \ldots$$

which can also be written:

$$p_m(x) = \sum_{k=0}^{m} C_k \times x^k$$

to as many terms as it might require to obtain the required or desired accuracy. There are rational order polynomials of the form:

$$p(x) = (C_0 + C_1 * x + C_2 * x^2 + \ldots) / (D_0 + D_1 * x + \ldots)$$

Generally speaking, these rational polynomials can achieve slightly higher accuracy on several kinds of function interpolation with fewer total terms, of the numerator plus denominator, at the cost of a division. Given that the entire Transcendental evaluation takes fewer cycles than a divide instruction, rational polynomials are not a preferred embodiment.

Given that this transcendental function unit is interpolating over intervals with small ranges, the standard polynomial expansion is preferred. In addition, more terms can be calculated should more accuracy be needed. Both eliminate the need for the division operation.

There are several straightforward means to calculate a set of coefficients $\{C_0, C_1, C_2, \ldots\}$ from a set of evaluation points and their corresponding evaluated function values:

$$\{\langle x_0, f(x_0) \rangle, \langle x_1, f(x_1) \rangle, \langle x_2, f(x_2) \rangle, \ldots\}.$$

Newtonian Interpolation, LaGrange Interpolation, Chebyshev Interpolation, Legendre Interpolation, Spline Interpolation, and a few more. Without loss of generality, this embodiment mainly utilizes an interpolation scheme based on Chebyshev and generates coefficients $A_k$ that are then converted back into evaluation in standard polynomial form.

Intervals

A long time ago, transcendental functions were calculated using a very long polynomial to achieve desired accuracy. The evaluation of SIN or COS over the range [0 . . . π/2] in IEEE 754-2008 double precision requires a polynomial of degree 13.

Slicing this range [0 . . . π/2] into 16 equal sized intervals reduces the polynomial degree to 7.

Without loss of generality, a number of higher order bits from the floating point fraction indexes a table of $2^{bits}$ entries, each entry contains a set of coefficients. A 4-bit index accesses 16 entry table of 8 coefficients each. Now, instead of 17 multiplications and 18 additions (without intervals), we are faced with only 7 multiplications and 8 additions.

Intervals save cycles at the cost of coefficient storage. An appropriate set of coefficients where no intervals are in use will typically have 13 coefficients stored to 53-bits of floating point fractional precision; 13×53-bits=689-bits plus a few bits for the exponents. Given intervals of evaluation, the number of bits of significance drops by the number of bits used to index the table and also drops by the denominator of the coefficient in the standard polynomial evaluation. The former describes the loss of higher significance due to the calculation of the Power Series. An appropriate set of coefficients for one interval will have about 56+51+45+39+33+26-bits=217-bits; but since there are 16 such sets, to a first order: one has 3472-bits in total for that one transcendental function a 5× expansion.

Figure 11:
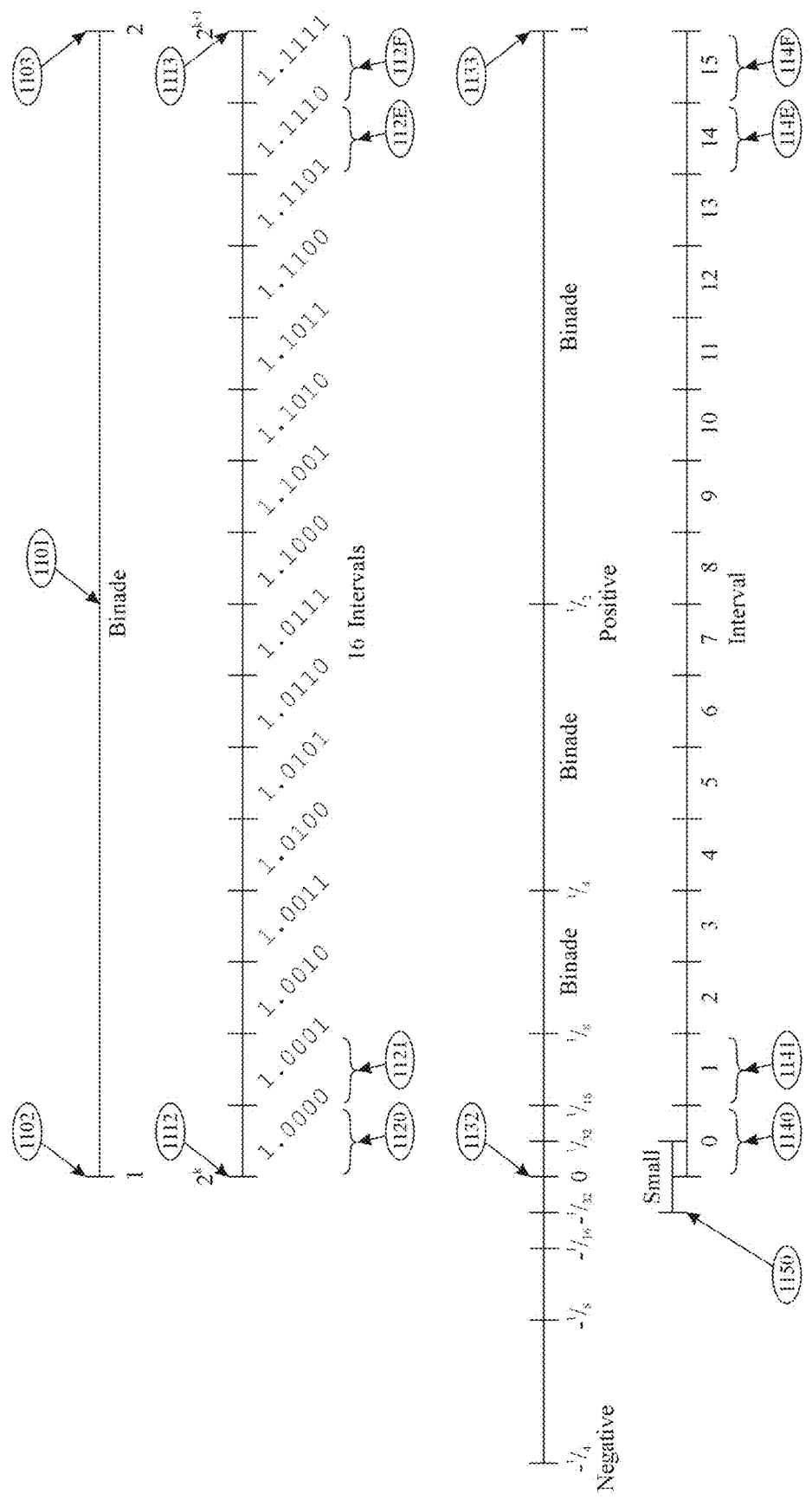
FIG. 11 illustrates, in line diagram form, the transcendental intervals.

Referring to FIG. 11: All of these transcendental functions have several useful properties when it comes to accurate approximations of them using floating point arithmetic in polynomial form; they are:
  Smooth
  Continuously Differentiable
  Small Argument Range
  Small Result Domain.

In floating point arithmetic each exponent value governs a binade 1111. At the beginning 1112 of a Binade we have the hidden bit and a fraction of zeroes (0s) 1.0000 (1120), while at the end 1103 of the Binade we have a hidden bit and a fraction of ones (1s) 1.1111 (112F). Much of the time we ignore the actual value of the exponent and just consider a Binade to be the fractional values [1.0,2.0) (1101). When we care about the exponent we understand that the Binade runs $[2^k, 2^{k+1})$ (1112 and 1113) for an integer k in the range of an IEEE 754-2008 exponent.

RCP, RSQRT, SQRT are all processed without consideration of the exponent. Ln, Ln 2, Log, exp2, Exp, and Exp10 could have been processed without consideration of the exponent. Here, we chose to implement Ln 2P1 and EXPM1 flavors instead of Ln 2 and EXP2 to gain accuracy in several critical regions.

The remaining transcendental functions all pass through 0.0 and incorporate the small interval 1150. A slight variation of the evaluation strategy is incorporated here. Instead of defining intervals based on the Binade, we base the interval selection on the range [0.0,1.0) (1132, 1133). This range incorporates all of the Binades $[2^k, 2^{k+1})$ where k<0.

The small interval 1150 is performed in purely floating point arithmetic to satisfy the aforementioned numerical properties.

In hardware there is no particular need to create exactly $2^n$ table entries as it often is in software 514 519, indeed, it is often useful to create $2^n+1$ entries or $2^n+2$. For example, when calculating certain transcendental functions, certain arithmetic identities must be preserved, such as:

$$\text{SIN}(x) = x \quad \text{// when } |x| \ll 1$$
$$\text{LN}(1 + x) = x \quad \text{// when } |x| \ll 1$$
$$\text{EXP}(x) - 1 \quad \text{// when } |x| \ll 1$$

In order to preserve these identities, the argument exponent is observed, and if x is sufficiently small, an entirely different set of coefficients is utilized on an entirely different interval that provides higher accuracy for the case of very small x. In particular, these intervals span the range [−a,a] with zero at their exact center. The coefficients in the tables for these special cases correspond to an interval centered at 0.0 so that the $C_0$ coefficient is exactly 0.0, $C_1$ is exactly 1.0, and remaining coefficients are calculated as described shortly. In addition, these coefficients are tuned for highest accuracy.

The test for smallness was expected to be about: $|x| < 2^{-8}$. Thus $x^2 < 2^{-16}$ and $|x^3| < 2^{-24}$. A cursory investigation shows that the test for smallness need only be about $|x| < 2^{-5}$, or about ½ of the range of the interval. The evaluation still uses the same number of iteration steps, but with coefficients optimized for this particular zero-centric interval.

Intervals 1148 through 114F are performed as above, but the reduced argument r 806 is shifted down by 1-bit prior to Power Series generation.

Intervals 1144 through intervals 1147 are performed as above, but the reduced argument r 806 is shifted down by 2-bits prior to Power Series generation.

Intervals 1142 through intervals 1143 are performed as above, but the reduced argument r 806 is shifted down by 3-bits prior to Power Series generation.

Intervals 1141 is performed as above, but the reduced argument r 806 is shifted down by 3-bits prior to Power Series generation.

Intervals 1140 is performed as above, but the reduced argument r 806 is shifted down by 4-bits prior to Power Series generation.

In these cases, the transcendental calculations converge more rapidly due to the more rapidly decreasing $r^k$ product.

We also found that the first interval 1140 is better suited to span the range $[0, 1/16]$ because the $C_0$ coefficient can be chosen to guarantee monotonicity in the transition from the small interval 1150 to the first interval 1140.

Once the higher order bits of the floating point fraction are used as an index to a table of coefficients. These bits are then no longer needed in the function evaluation and are removed from the floating point reduced argument r 806. The top bit of what remains is inverted to give us our reduced argument centered on the range of evaluation. That is: given an interval [a,b] we arrange it so that a reduced argument r containing all zeros evaluates at (a+b)/2, while a positive fraction evaluate in the subinterval [(a+b)/2,b] and a negative fraction evaluate in the subinterval [a,(a+b)/2]. This center point evaluation strategy removes another bit from the reduced argument's size (bit count), and also removes bits from the coefficients needed to evaluate the function. Finally, by centering the reduced argument in the interval, one can more easily convert a Chebyshev polynomial back into standard polynomial form.

When this reduced argument is exactly 0.0, we are evaluating at the center of the interval, and the $C_0$ coefficient determines the result.

Overall, intervals of evaluation reduce the number of terms in the polynomial evaluation at the expense of determining a lot more values to very high precision. Thus, we need an automated means to produce said coefficients.

Chebyshev Points

It is well known that selecting a random set of points within an interval can result in a poor polynomial evaluation due to Runge's Phenomenon. In order to avoid falling victim to this, the points where the function is evaluated are chosen to be the Chebyshev Node Points in the range [−1,+1] expressed upon the interval [a,b].

The Chebyshev Points are the points selected from:

$x_k = \cos((2k-1)/2n \times \pi)$

Where n is the number of points, n−1 is the degree of the polynomial, and k goes from 1 to n.

The set of Chebyshev nodes spans the range [−1 ... +1]. Our polynomials are to be evaluated on smaller intervals, so scaling is applied: given an interval [a,b] we can scale $y_k$ to our evaluation points by:

$y_k = (b+a)/2 + x_k(b-a)/2$

The function being approximated will be evaluated at point $y_k$ in the interval [a,b].

The selection of evaluation points leads to higher sampling of the function near its extremities, and this minimizes Runge's phenomenon. This selection of points also results in the evaluated function having near minimal error for the degree polynomial being utilized.

Function Evaluation

Given a set of $y_k$, we calculate $f(y_k)$ to as high a precision as practicable. Any error in calculating $f(x_k)$ results in higher error in the soon to be calculated coefficients. Once these functions are calculated, there are bundled into the evaluation point and the evaluated function pair and combined into the set:

$\{<y_0, f(y_0)>, <y_1, f(y_1)>, <y_2, f(y_2)>, \ldots\}$

Chebyshev Interpolation

Chebyshev Interpolation utilizes Chebyshev polynomials of the first kind:

$T_0(x) = 1$ $T_1(x) = x$ $T_k(x) = 2 \times T_{k-1}(x) - T_{k-2}(x)$

Given a set of evaluation points in $x_k$ and evaluated function values in $y_k$:

$\{<x_0, f(y_0)>, <x_1, f(y_1)>, <x_2, f(y_2)>, \ldots\}$

The Chebyshev Interpolation method calculates its Chebyshev coefficients through the equation:

$$A_k = \sum_{j=0}^{n-1} f(y_j) \times T_j(x_j)$$

These Coefficients can be evaluated directly in Chebyshev form as:

$$p(x) = \sum_{j=0}^{n-1} A_j \times T_j(x)$$

It should be noted at this point: that there is a direct and reasonably efficient, numerically stable, means to evaluate the Chebyshev polynomial. Clenshaw's algorithm is the general purpose version of Horner's algorithm in standard polynomial evaluation. We will come back to this in time.

Alternately, the Chebyshev coefficients can be converted into standard polynomial form by expansion of the Chebyshev $T_k(x)$ term into standard polynomial form. An illustrative example of degree 4 shows the general method:

$$\begin{aligned} p_3(x) &= A_0 T_0(x) + A_1 T_1(x) + A_2 T_2(x) + A_3 T_3(x) \\ &= A_0 + A_1 x + A_2(2x^2 - 1) + A_3(4x^3 - 3x) \\ &= (A_0 - A_2) + (A_1 - 3A_3)x + 2A_2 x^2 + 4A_3 x^3 \end{aligned}$$

The Chebyshev terms are expressed in standard polynomial format, then some algebra applied; grouping terms of common multiplication by $x^k$.

Here we see that the $A_0$ coefficient is blended with the $A_2$ coefficient, that the $A_1$ coefficient is blended with the $A_3$ coefficient. Had we looked at a higher degree example, even terms are blended with even terms of higher degree, while odd terms are blended with odd terms of higher degree.

At this point the x represents the function as sampled in the range [−1:+1]. Remembering our scaling function which projected $y_k$ in range [a:b] into $x_k$ with range [−1:+1], and also remembering that we centered the reduced argument range in [a,b]; we see that the scale factor applied to y is s=2/(b−a). If the intervals are of fixed size: s=2×intervals. This factor is applied to convert the Chebyshev approximation into standard polynomial form:

$$y = s \times x$$

$$p_3(Y) = (A_0 - A_2) + s \times (A_1 - 3A_3) y + 2s^2 \times A_2 y^2 + 4s^3 \times A_3 y^3 \ldots$$

We convert the Chebyshev coefficients $A_k$ back into standard polynomial $C_k$ coefficients:

$$C_0 = (A_0 - A_2)$$

$$C_1 = s \times (A_1 - 3A_3)$$

$$C_2 = S^2 \times 2A_2$$

$$C_3 = s^3 \times 4A_3$$

Given 8 points of evaluation; the Chebyshev approximation polynomial; given without derivation:

$$p_7(x) = (A_0 - A_2 + A_4 - A_6) + (A_1 - 3A_3 + 5A_5 - 7A_7)x + (2A_2 - 8A_4 + 18A_6)x^2 + (4A_3 - 20A_5 + 56A_7)x^3 + (8A_4 - 48A_6)x^4 + (16A_5 - 112A_7)x^5 + 32A_6 x^6 + 64A_7 x^7$$

x in the range [−1:+1]

We can convert the Chebyshev coefficients $A_k$ back into standard polynomial form $C_k$:

$$C_0 = (A_0 - A_2 + A_4 - A_6)$$

$$C_1 = s \times (A_1 - 3A_3 + 5A_5 - 7A_7)$$

$$C_2 = s^2 \times (2A_2 - 8A_4 + 18A_6)$$

$$C_3 = s^3 \times (4A_3 - 20A_5 + 56A_7)$$

$$C_4 = s^4 \times (8A_4 - 48A_6)$$

$$C_5 = s^5 \times (16A_5 - 112A_7)$$

$$C_6 = s^6 \times (32A_6)$$

$$C_7 = s^7 \times (64A_7)$$

Giving:

$$p(y) = C_0 + C_1 * y + C_2 * y^2 + C_3 * y^3 + C_4 *^2 + C + * y^5 + C_6 * y^6 + C_7 * y^7$$

y in the range [a:b]

Attaining Sufficient Coefficient Accuracy

Mathematica is an application that has the underlying toolset needed to calculate the desired polynomial coefficients and to perform numerical verification. Mathematica can be configured to perform calculations to arbitrary precision or to selected precision. Mathematica also has built-in functions to compute Chebyshev interpolations.

Once these Chebyshev Points $x_k$ and function evaluations $f(x_k)$ have been determined to sufficient precision, another Mathematica program pushes this data through an Chebyshev Interpolation method which derives the Chebyshev Coefficients. Another Mathematica program then converts these Chebyshev coefficients through standard polynomial conversion function into standard polynomial coefficients. By this means the coefficients are computed to high accuracy A final Mathematica program analyses the results of these coefficients used as polynomials and compares the results to its own unlimited precision functions and calculated the accuracy and the error floor.

Typical Processor FMAC Unit

Figure 7:
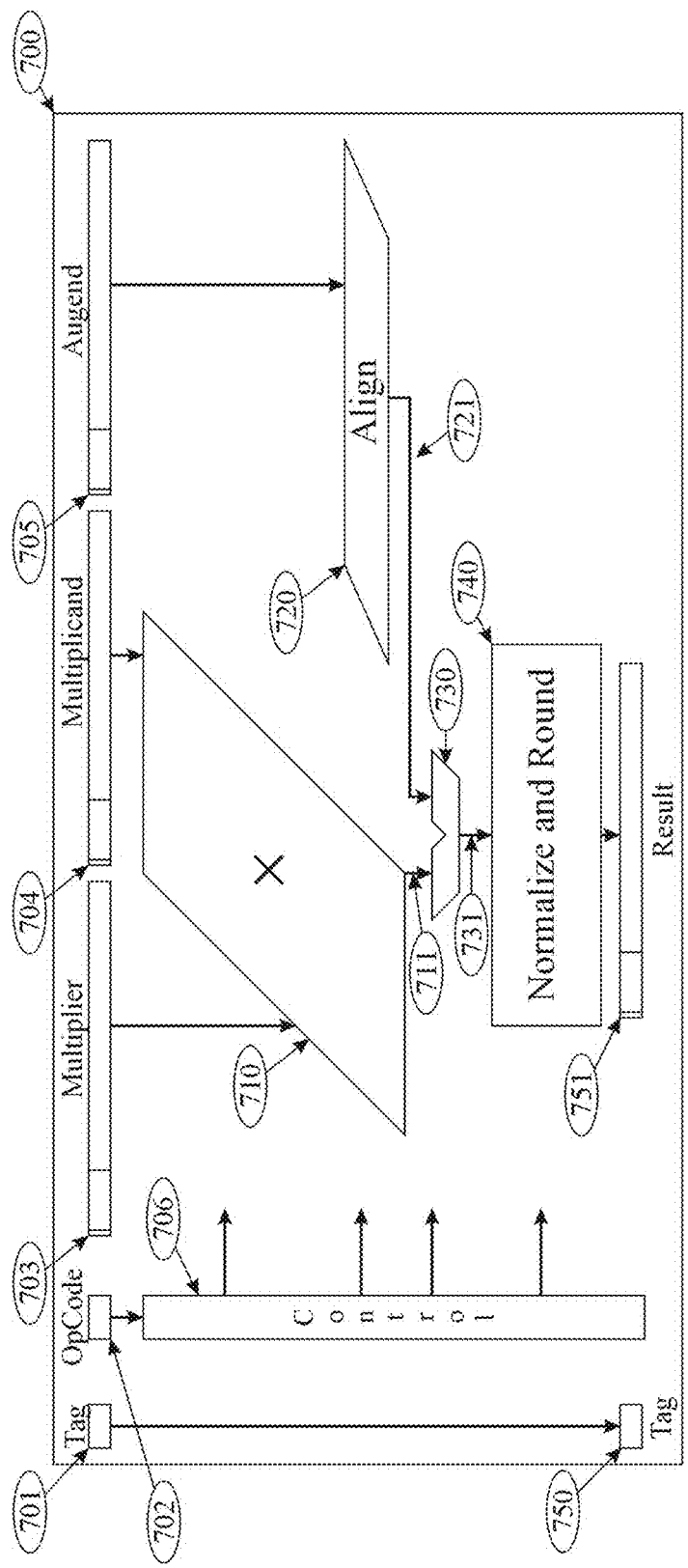
FIG. 7 illustrates, in block diagram form, a typical Floating Point FMAC unit.

The typical (Prior Art) processor (CPU, GPU, DSP, VSP, NSP) contains a floating point unit capable of performing the three (3) operand FMAC instruction:

$$d = \Diamond (Mc \times Mp + Ag)$$

Where Mc is the multiplicand, Mp is the multiplier, and Ag is the augend. $\Diamond$ is an IEEE 754-2008 rounding in any of the 5 defined rounding modes. The calculated result is delivered to the destination d. A typical FMAC function unit 700 is illustrated in FIG. 7.

A request to perform a calculation arrives with an OpCode 702, a Tag 701, and up to three (3) Operands; a Multiplier 703, a Multiplicand 704, and an Augend 705.

The calculation request OpCode 702 will identify such calculations as: Floating Point Addition (FADD), Floating Point Subtraction (FSUB), Floating Point Multiplication (FMUL), Floating Point Multiplication with Accumulation (FMAC), and may include other Floating Point calculations or comparisons.

The Tag 701 is a small field given to the function unit. A cycle before (or the cycle of) result delivery, the Tag 750 is delivered to the data path of the processor (CPU, GPU, DSP, VSP, NSP) so the data path can route the result 751 to its desired final location. Many of these processors also use the Tag 750 to route the result 751 to other interested consumers of its value (i.e., instructions waiting for this value.)

The FMAC unit 700 contains a Multiplier x 710, an Alignment Shifter 720, an Accumulator 730, and a Round and Normalize section 740.

The multiplier 710 multiplies the Multiplier (Mp) 703 with the Multiplicand (Mc) 704 producing a double wide product 711. While the multiplier 710 is performing, the exponent section (not shown) adds the exponents of the multiplier (Mp) 703 the multiplicand (Mc) 704 and compares this new exponent to the exponent of the Augend 705. The difference is used to align the Augend 705 to the product so that the Accumulator 730 can produce a pre-rounded result 730. There are 3 cases: the Augend 705 is significantly larger than the product, the Augend is roughly equal to the product, and the Augend is significantly smaller than the Augend.

When the Augend is significantly larger than the double width product 711, the Alignment Shifter positions the Augend to higher significance. At this point, the product is converted from carry-save form into binary form and any overflow out of this addition increments the Augend 705.

When the Augend 705 is roughly equal to the product, the Accumulator adds the product 711 in carry-save form to the Augend 705 in binary form to form the binary result 731.

When the Augend 705 is significantly smaller than the product 711, the Alignment shifter 720 positions it at lesser significance, and much of the Augend bits get compressed into a single sticky bit.

If the 64-bit FMAC unit 700 does not perform Floating Point Division (FDIV) instructions, the multiplier 710 is 53-bits×53-bits. If the FMAC unit 700 performs Goldschmidt or Newton-Raphson Division algorithms, the multiplier tree 710 will be 57-bits×57-bits in order to have enough accuracy for either of these algorithms to deliver IEEE 754-2008 accuracy of ½ ULP in the rounded result. In addition, the Goldschmidt and Newton-Raphson division algorithms will have the FMAC unit 700 contain a small table of reciprocal approximations (not shown) in order to get the quadratic convergence iterations to converge rapidly.

After the Accumulator 730 has performed its addition on the product 711 and the shifted Augend 721, we have a triple width result 731 that is feed to the round and Normalize 740 section of the FMAC unit 700.

The Round and Normalize 740 section will locate the position of the highest bit of significance, and align this position with the hidden bit of the IEEE 754-2008 numeric format. At the other end of significance, the Round (inside 700) section observes the sign bit of the pre-result, the lowest bit of significance, the bit one place less significant, and the collection of bits (sticky) of lesser significance. From this collection of bits and the rounding mode, a rounding choice is made, the result 751 formatted as an IEEE754-2008 number and delivered as the result of this FMAC function unit 700.

FMAC units 700 can be pipelined to fit just about any cycle time of the Processor from about 3-cycles of delay minimum to 5-cycles of delay maximum. The smaller delay embodiments are associated with processors with longer cycle times (more pico-seconds or more nano-seconds per instruction or more gates of delay per cycle), while those with longer delay are associated with processors with shorter cycle times (fewer pico-seconds or fewer nano-seconds per instruction or fewer gates of delay per cycle.)

Without loss of generality, the typical FMAC unit 700 is fully pipelined and can begin a new and different calculation every cycle (excepting for FDIV and FSQRT instructions). Normally it is wise to pipeline the FMAC unit 700 to its intrinsic delay of some other part of the containing processor. For a large body of implementations, the FMAC units 700 are pipelined to deliver a result after a delay of 4-cycles. The pipeline stages are not shown in the figure because they are intimately involved with how the containing processor is implemented.

As we disclose the various embodiments of the present invention, it will be clear to those skilled in the art, that our embodiments are natural extensions of this already existing technology.

Transcendental Function Unit Overview

Referring to FIG. 8: In the preferred embodiment, Transcendental instructions are performed in the Transcendental Unit 800. The Transcendental Unit 800 consists of a Coefficient Table 830, a Power Series Multiplier ($R^k$) 810 and 820, a Coefficient Multiplier ($C_k R^k$) 840 with Accumulator 841, and a conventional floating point Round and Normalize stage 850, with various flip-flop storage to retain data from cycle to cycle. FIG. 8 illustrates the basic organization of the transcendental unit configured to perform polynomial evaluation.

The Coefficient Table 830 contains the coefficients for all the polynomial which can be evaluated (saving memory access bandwidth, data cache footprint, power, and delay). The Coefficient Table 830 is indexed by the Transcendental OpCode 802, the low order bits of the Operand exponent e, some high order bits of the Operand fraction 1.f 805, and by the iteration term counter m (not shown). The Coefficient Table 830 produces a new coefficient 831 every cycle.

The Coefficient Table 830 is conceptually responsible to maintaining a high precision version of various constants, used in precision salvaging argument reduction and High Precision Multiplication.

The Coefficient Table is also responsible to maintaining medium precision versions of {ε, 1/ln(2), 1/log(2), 1/(ln 2(e), 1/ln 2(10)}, used in argument reduction for EXP, EXP10, Ln, and LOG, when the designer chose to save Coefficient Table area.

The Power Series Multiplier 810 and 820 (used without suppressing carries) calculates successively higher powers 821 of the reduced argument r 805. The power multiplier 810 and 820 delivers a new higher power 821 of the reduced argument every cycle after a 2 cycle delay.

The Coefficient Multiplier 840 multiplies a coefficient $C_k$ 831 times the power multiple $R^k$ 821 and accumulates it into a high precision unrounded result 844. The accumulator 841 operates as part of the coefficient multiplier and on carry-save format data.

Once the final accumulated result 844 is produced, the Round and Normalize stage 850 calculates the final result 861 from a single rounding of all of the terms used to form the result.

The $C_0$ 832 coefficient is stored 830 and accumulated 843 to 64-bits of fraction precision.

The above calculations are organized such that all of the multiplies produce resultant data lined up to the same effective binary point; thus there are no shifters in the iteration process in normal use.

The wires 812 and 822 and multiplexer inputs 842 will be explained in the section on precision salvaging argument reduction to follow. These components reconfigure the Transcendental function unit from a polynomial evaluator (as now) into an argument reducer (later).

High Precision Multiplier

Several of the Transcendental functions require that the arriving operand be arithmetically manipulated prior to being evaluated with the corresponding polynomial. This argument reduction cannot loose significance and must be performed with great care, but rapidly. The base function of this manipulation is multiplication by a constant who's value can be known to unlimited precision. It is appropriate to look into VLSI multipliers before disclosing this part of the embodiment.

VSLI Multiplier

Figure 9B:
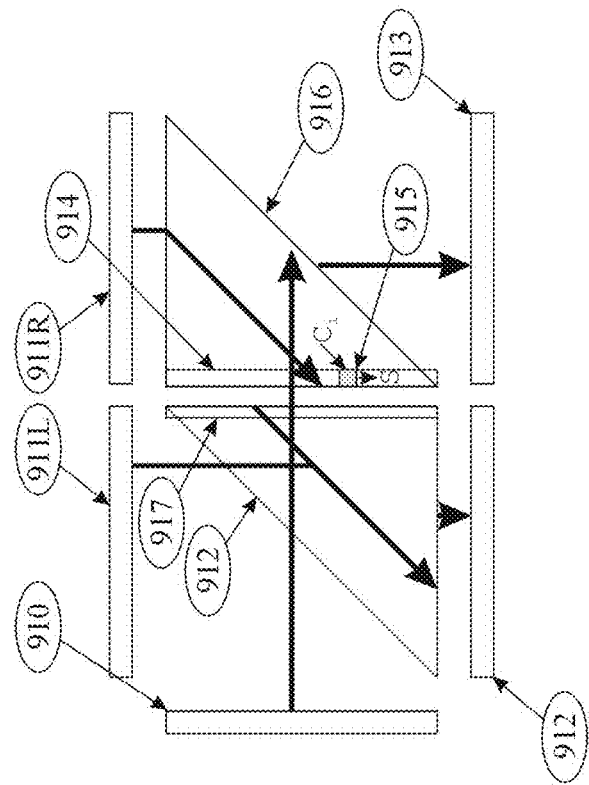
FIG. 9A-FIG. 9B illustrates, in block diagram form, a VLSI Multiplier, and a Sliced Multiplier.
Figure 9A:
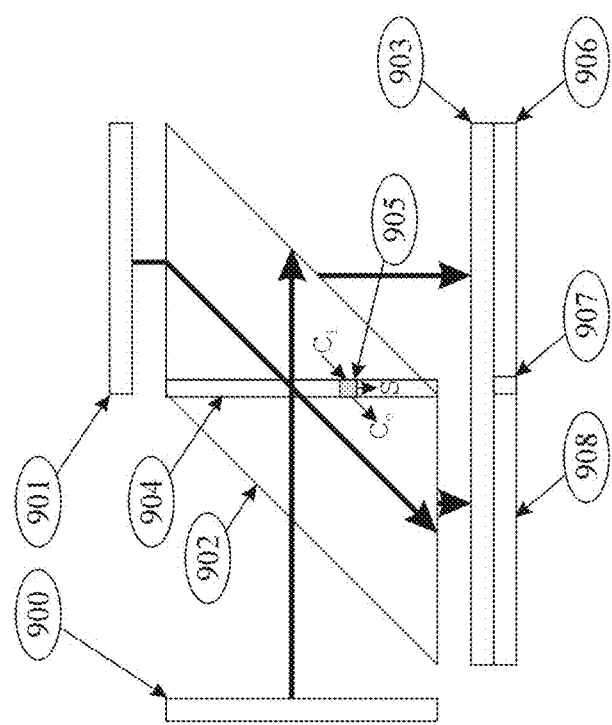

Referring to FIG. 9A: A multiplier 900 and a multiplicand 901 are multiplied in multiplier 902 to create a product 903. The multiplier 900 can have any number of bits (>1) and the multiplicand 901 can have any number of bits (>1), in standard form, the product 903 will have the sum of the number of multiplier 900 bits plus the number of multiplicand 901 bits.

Each vertical column 904 in the multiplier represents bit calculations of a particular significance level ($2^p$). The column to the left will have greater significance ($2^{p+1}$) and will receives the carries from this column, as this column will receive the carries from the column to the right of significance ($2^{p-1}$). A cell 905 in this column receives a carry in $C_i$ from the right, and delivers a Sum Out S vertically lower, and a Carry Out Co to the left.

When a multiplier 902 is used for floating point multiplication, the double width product P 903 is rounded to a single width container R 908. Just below the higher order bits R 908 are two bits r 907 used in rounding and a myriad of sticky bits 906 breaking the tie in round to nearest modes.

We are particularly interested in multiplication where the bits of higher significance play greater roles than the bits of lesser significance—that is we are interested in floating point multiplications, and the lower half of the product will be used (at most) for a bit of normalizing and rounding; then discarded. However, while concerned with floating point arithmetic and bits in the higher significant sections of any result, the algorithms have been organized such that most of the time the binary point remains fixed during the iteration.

Slicing Multipliers

The basic multiplier 902 can be modified for various purposes, such as performing two (2) multiplications each cycle as long as each such product utilizes disjoint cells in the multiplier tree. A common occurrence of such is a CPU or GPU where a single 24×24 multiplier tree from a FMAC unit is configured to perform a single 32-bit IEEE floating point multiply, or can be configured to perform two (2) 16-bit floating point multiplies.

Referring to FIG. 9B: Another such modification is the vertically sliced Multiplier comprising 912 and 916: A vertically sliced multiplier is a multiplier where the carry from one column 914 to the next higher order column 917 can be suppressed. The vertically sliced multiplier is used to perform precision salvaging argument reduction and High Precision Multiplication by isolating the leftmost parts of the multiplication 912 from the rightmost parts of the multiplication 916. In the Vertically sliced multiplier there are two (2) different multiplicands 911L and 911R being multiplied Multipliers, being large structures are often implemented in the style of a 2-dimensional array of cells, each cell performing a small part of the overall multiplication. When these cells are configured as a logarithmic tree, there are the fewest possible number of cells in a clock cycle (L. Dadda and C. S. Wallace).

Figure 10B:
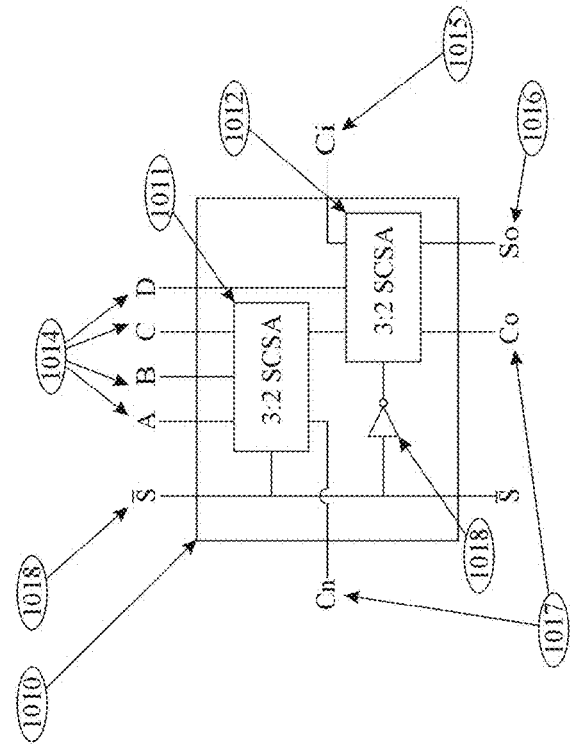
FIG. 10A-FIG. 10D illustrate, in partial block diagram form and partial schematic form, the 4-2 compressor, a 3-2 counter, and the sliced 3-2 counter, and the sliced 4-2 compressor.
Figure 10D:
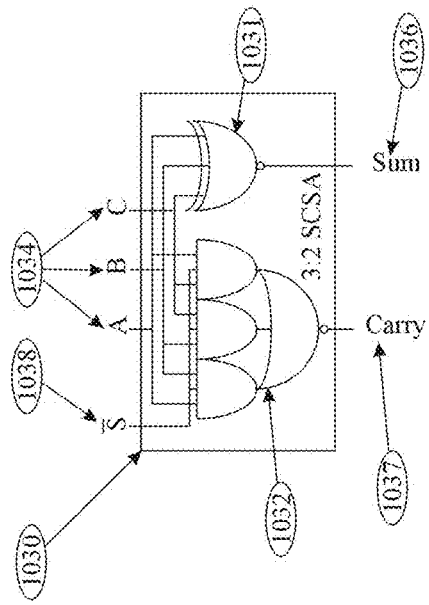
Figure 10A:
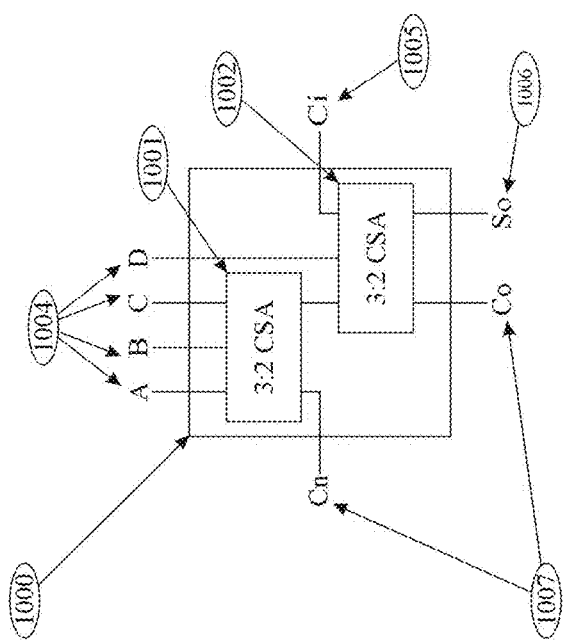

Referring to FIG. 10A: Modern multipliers often utilize what is known as the 4-2 compressor 1000 (Nagamatsu et. al. and Ohkubo et. al.) cell in order to compress the bit summation into a log-base-2 number of steps. The 4-2 compressor cell 1000 is prior art, and is typically a pair of 3-2 counters 1001 and 1002 wired up as illustrated.

The A, B, C, and D inputs 1004 are all bits of equal significance to be added. Ci 1005 is the carry input from the lesser significant column to the right in negative polarity. Cn 1007 is the carry output to the more significant column to the left in negative polarity. Co 1007 is the carry out in positive polarity, and So 1006 is the sum out in positive polarity. A 4-2 compressor is simply a 5-3 counter that is wired into a tree to achieve a factor of 2× compression for each compressor stage in the tree.

Figure 10C:
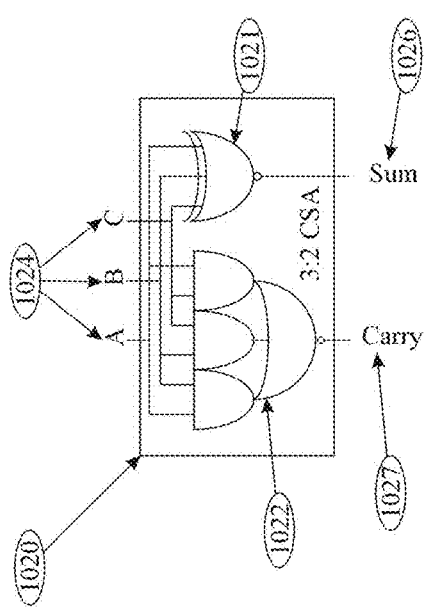

Referring to FIG. 10C: The 3:2 Carry Save Adder (CSA) 1001 or 1002 is a 3-2 counter. The top 3-2 counter 1001 is implemented in positive input logic and asserts negative output logic levels. The bottom 3-2 counter 1002 is implemented in negative input logic and asserts positive output logic levels. Thus, the 4-2 compressor is polarity neutral. Even the horizontal carries 1005 and 1007 are polarity neutral.

The 3-2 counter 1020 which forms the building block 905 of the multiplier 902 column 904 consists of a 3-input XOR gate 1021 creating the sum output 1026 and a 3-input Majority gate 1022 creating the Carry output 1027.

The A, B, and C 1024 inputs to the 3-2 counter are all bits to be summed of the same significance level. Sum 1026 is the output of this significance, Carry 1027 is the output of one level higher significance.

When two (2) or three (3) inputs 1024 of the majority gate inputs are high (logic level 1) then the majority gate asserts its carry output 1027 (low), and otherwise deasserts its carry output 1027 (high).

Referring to FIG. 10B: In the Split multiplier 912 and 916, we suppress the carry out signal 1037 in one column 914 by adding a term S-bar signal 1018 to the Majority (AOI) gate 1032 to suppressed the carry making the two sides of the multiplier 912 and 916 independent, at less than a single gate of logic delay! The S-bar signal 1018 is inverted before driving the negative polarity 3-2 counter 1012 for completeness.

Referring to FIG. 10D: A, B, and C 1034 inputs remain the same as before, the asserted S-bar input 1038 signal (low) causes the Carry output signal 1037 to be asserted (high) preventing carries from propagating to the next more significant column in multiplier 912. The deasserted S-bar input 1038 signal (high) allows normal function of the majority gate. Note: the 3-input XNOR 1036 gate is not modified.

The Power Series Multiplier 810 820 is configured to be a split multiplier, and configured to feed its two (2) outputs to the accumulator after the coefficient multiplier.

Sliced Multipliers Configuration

Argument Reduction

The Transcendental Function Unit is now configured to perform precision salvaging argument reduction by performing three (3) multiplies in two (2) multipliers used simultaneously, using 3 parts of the high precision copy of the high precision constant $2/\pi$. The bits of $2/\pi$ to feed into the multipliers is determined by the exponent of the original operand.

Referring to both FIG. 4 and FIG. 9B: One multiplication 412 takes the middle order bits of $2/\pi_{mid}$ 411 and 911R and multiplies it by the operand 400 in the coefficient multiplier. The second multiply 420 takes the high order bits of $2/\pi_{high}$ 410 and multiplies it in the vertically sliced multiplier 425 and 912 accumulating these bits to the higher significant portion of the middle order multiplier 923, the other side of the vertically sliced multiplier 425 and 916 takes the lower order bits of $2/\pi_{low}$ 412 and 911L and multipliers it in the vertically sliced multiplier accumulating into the lower order section of the accumulator 913. Thus in one (1) multiplier delays using 2 multipliers, the 3 useful multiplications have been performed and accumulated, and the reduced argument 431, 432, 433 is calculated to 111-bits of precision.

The clear triangles 420 to the left of 425 and the clear triangle 422 to the right of 425 on the FIG. 4 are required unless the vertically sliced multiplier concept is utilized (left half of FIG. 9B.) The vertically sliced multiplier makes it possible to perform 2 different multiplies in a single multiplier at the same time.

Referring to FIG. 8: The High Precision Multiplication is configured such that, after all three parts have been summed in the accumulator 844, all bits larger than $2\pi$ in the original operand (or larger than $2\pi \times 2/\pi = 4$ now) have been discarded as unnecessary. This discard represents the trigonometric identity:

$$\sin(x+2k\pi)=\sin(x) \text{ for any integer } k$$

The discard also represents the subtraction found in most argument reduction strategies.

At the end of the argument reduction, we have a 111-bit result which will be naturalized as a 2-bit Quadrant, a 4-bit table index, and a 58-bit reduced argument. This gives the Power Series Multiplier (810 and 820) 58-bits of precise argument in its generation of the Power Series. Which in turn gives the Coefficient Multiplier 840 at about 57.6-bits of precision when performing its multiplications.

Argument Projection

Several of the Transcendental functions need their operand projected from one base into another prior to performing the polynomial calculation.

The EXPM1(x) and the EXP10M1(x) functions calculate EXP2M1(x) to achieve a high precision pre-result in the SUM register 844 from the polynomial evaluation. This pre result 844 is then multiplied by a high precision version of 1/ln(2) or a high precision version of 1/log(2), respectively. This High Precision Multiplication is a close relative of Precision Salvaging Argument Reduction scheme The 53-bit fractions from the Operand Ø 803 are multiplied by 111-bit high precision version of 1/ln(2) or 1/log(2) using both the Power Series multiplier 810 and 820 and the Coefficient Series Multiplier 840 and the resulting 58-bit product 844 is then used to drive the polynomial evaluation to completion by overwriting the original Operand Ø in 803 through multiplexer 804.

The result of the 1/Ln(10) (~0.434) moves the bit of most significance down by 1 or 2 bits. The exponent of the polynomial will be adjusted accordingly.

The result of the 1/Ln(2) (~1.442) moves the bit of most significance up by 0 or 1 bit. The exponent of the polynomial will be adjusted accordingly.

In both cases, since we start with a 116-bit high precision product, we have 58-bits accurate argument to drive the polynomial evaluation, not including the sign bit and the 11 exponent bits.

Result Projection

Several of the Transcendental functions need to have the polynomial result 844 modified before being delivered as the final result 861. The polynomial result 844 has more precision than the IEEE 754-2008 container, so in order to preserve accuracy, one should perform result projection on the result with higher precision, and then perform a single rounding. We call this Result Projection.

The LnP1(x) and the LOG P1(x) functions calculate Ln 2P1(x) to achieve a high precision pre-result 844 from the polynomial evaluation. This pre-result is then multiplied by a high precision version of $1/\ln 2(\varepsilon)$ or a high precision version of 1/ln 2(10), respectively. This High Precision Multiplication is a close relative of our Argument reduction scheme.

The 58-bit final summation from the polynomial evaluation 844 gets multiplied by a 116-bit high precision version of either $1/\ln(\varepsilon)$ or 1/ln 2(10). From the resulting 116-bit number in 844 a single rounding is performed to create a 53-bit IEEE fraction. This fraction gets associated with the exponent previously calculated.

The result of the $1/\ln(\varepsilon)$ (~0.301) multiplication moves the bit of most significance down by 1 or 2 bits. The exponent of the polynomial will be adjusted accordingly in the Round and Normalize section.

The result of the 1/Ln 2(10) (~0.693) moves the bit of most significance down by 0 or 1 bit. The exponent of the polynomial will be adjusted accordingly in the Round and Normalize section.

In both cases, since we start with a 116-bit product, we have 58-bits accurate result which has enough bits to be faithfully rounded into an IEEE 754-2008 container.

High Precision Configuration

There are a multiplicity of uses in transcendental calculations where high speed High Precision Multiplication improves both performance and accuracy of the final result. Thus we enable our Transcendental function unit with the ability to be configured in either a polynomial evaluator or as a high precision multiplier. Thus the same hardware that performs polynomial evaluation can be used in performing cyclic argument reduction, argument projection, and result projection, each preserving enough bits of precision that the final result can be faithfully rounded.

Referring back to FIG. 8: We see the Operand Ø 805 being fed to both the Power Series Multiplier through multiplexer 808 and to the Coefficient Series Multiplier through multiplexer 807. $2/\pi_{high}$ 8K1 and $2/\pi_{low}$ 8K3 are being fed to the Power Series Multiplier through multiplexer 808 while $2/\pi_{middle}$ 8K2 is being fed to the Coefficient Multiplier 840 through multiplexer 831.

The Power Series Multiplier 810 and 820 is used in split form to calculate the upper H 820 and lower L 810 triangles of bits needed to perform our high precision argument reduction. The output from the multiplier 812 and 822, still in carry-save format, is delivered directly to the accumulator 841 through multiplexer 842 in lieu of the accumulating SUM 844. Notice that the right hand portion H 820 is routed to the left hand side of the accumulator H, and that the right hand side L 810 is routed to the left hand side of the accumulator L.

The Coefficient Multiplier 840 itself produces the middle M bits of the calculation.

The Accumulator 843 forms the reduced argument set {Q, T, r} 844, bits more significant than 2-bits more significant than the binary point are discarded to the left 825, bits less significant than 111-bits to the right of the binary point were not calculated 815. What we are left with is all of the bits of a precise multiplication by 164-bits of 2/π 8K1, 8K2, and 8K3 that fit into the 111-bit container SUM 844.

The reduced argument {Q, T, r} 844 is then delivered back through multiplexer 804 to be the operand 1.f for the rest of the calculation. The second most significant 4-bits 805 will index the Coefficient Table, the lower 58-bits 806 will be used to form the Power Series Multiplier 810 and 820 products.

It is important to note that when the operand does NOT go through precision salvaging argument reduction, the Power Series Multiplier 810 and 820 starts working with a 48-bit multiplicand zero extended to 58-bits through multiplexer 808, whereas when one does perform through precision salvaging argument reduction, the Power Series Multiplier 810 and 820 starts working with a 58-bit multiplicand.

After precision salvaging argument reduction, we have an operand 803 with 10 more bits of precision (but not accuracy!) or $1/1024$ ULP of error.

This reduced argument 806 will be continually multiplied by the Power Series Multiplier 810 and 820 and generate a Power Series where each term has 1/512 ULP of error. Seven (7) such multiplications are added to accumulate the polynomial result along with the original Coefficient $C_0$ 832. With these eight (8) additions, we lose a maximum of 3-bits of ULP accuracy, ending up with 1/64 ULP of error from the argument reduction showing up in the final pre-normalized result.

Transcendental Function Unit Detailed Description

The Transcendental Function Unit receives an OpCode 802 and an Operand 803, performs a series of steps transforming the operand into a result 861, and delivers this result 861 to the result delivery system of the computer.

Power Series Multiplier

The reduced argument r 806 has up to 58-bits of significance remaining; 47-bits if derived directly from 1.f, since 4-bits have been removed to index 805 the Coefficient Table 830 and the $C_0$ 832 coefficient represent the missing leading hidden 1-bit.

Once a reduced argument r 806 has been derived it is fed into both sides of the power multiplier 810 and 820 to generate $r^2=r \times r$. The $r^2$ result is latched into both the $r^2$ flip-flop 811 and into the $r^k$ flip-flop 821.

While the $r^2=r \times r$ multiplication is being performed 810 and 820, the Coefficient Multiplier 840 is performing the C1×r multiplication which will be added to the SUM 844 which was initialized to $C_0$ 832.

When the $r^2$ product 811 is available, it is used to start the multiplication of $r \times r^2$ to generate $r^3$, and also used to start the $C_2 \times r^2$ coefficient multiplication.

When the Power Series Multiplier 810 and 820 is configured with a carry-save Booth recoder, the $r^2$ product 811 is available after 1-cycle, otherwise using a standard Booth recoder, the $r^2$ 811 product is available after 2-cycles.

Henceforth, the $r^2$ term remains available in the $r^2$ flip-flop 811 and is used to start the multiplication of $r^2 \times r^k$ from the $r^2$ 811 and $r^k$ 821 flip flops. The $r^k$ 821 value is used to start coefficient multiplies every cycle.

The Power Series multiplier 810 and 820 is configured as a 58-bit×58-bit multiplier. Its input multiplicand 808 and multiplier 807 are properly aligned to the binary point, and thus the result is also properly aligned to the iteration binary point.

The reduced argument r 806 arrives at the top right of the figure through multiplexer 808. In the subsequent cycle, the r×r multiplication begins, and in the third subsequent cycle the $r \times r^2$ multiplication begins, followed by the $r^2 \times r^2$ multiplication, and so on.

Small Case

In the small case, the $r^2$ term into the power multiplier is shifted down by the smallness of the exponent each cycle. This causes the summation process to have correctly aligned bits at the point of summation. In the normal case, the smallness of the exponent is defined to be $2^0$.

Coefficient Series Multiplier

The Coefficient Multiplier 840 is intimately attached to the Coefficient Table 830 and contains the accumulator 841, 842, 843, 844.

The OpCode 802, the smallness indicator (not shown), the most significant 4-bits of the fraction 805 and the iteration cycle are used to access the Coefficient Table 830. The first Coefficient $C_0$ 832 is used to initialize the Accumulator 844.

Subsequent Coefficients $C_k$ 831 are multiplied by the current Power Series output $R^k$ 821. The product 841 of this multiplication is accumulated into the accumulator 841, 842, 843, 844.

Coefficient Multiplication

The coefficient $C_k$ 831 from the table is multiplied by the current $r^k$ 821.

The $r^k$ 821 product has a maximum of 58-bits of significance.

The coefficient $C_k$ 831 is properly aligned so that the product $C_k \times r^k$ 840 needs no shifting to be accumulated Polynomial Summation Polynomial summation is initialized by setting: sum=$C_0$ 832.

Coefficient multiplication 840 takes the current 58-bit Power Series product 821, the current $C_k$ 831 coefficient term, multiplies $C_k \times r^k$ and adds this to the current sum 841, 842, 843, 844. The summation is kept in carry-save format.

At the end of the $7^{th}$ iteration the following sum 844 has been formed:

$$p(r)=C_0+C_1*r+C_2*r^2+C_3*r^3+C_4*r^4+C_5*r^5+C_6*r^6+C_7*r^7$$

The accumulator contains 110-bits of the polynomial evaluation. Remembering that the $C_0$ coefficient has 62 bits of precision, and that the coefficient series multiplications are aligned to the low precision end of this $C_0$ coefficient, The 58-bit multiplications are aligned at the 62nd bit of precision as seen in the accumulator. Since there were 7 products accumulated, the ceiling of the log-base-2(iteration count) is 3:written:: ⌉ ln 2(7)⌈=3. Thus the 3 lower bits at bit position 62 are not trustable to contain the precise bit pattern required for faithful rounding. At this point we have 59-bits of precisely known result.

The Operand 803 arrives at the top left of the figure. No activity occurs in the cycle of arriving. The subsequent cycle reads the $C_0$ 832 coefficient and initializes the Accumulator 841, 842, 843, 844. In subsequent cycle successively higher powers or $r^k$ 821 are multiplied by successive coefficients 831 and accumulated 841, 842, 843 into the final pre-normalized result 844.

Taking both section at the same time, leads to the following pipeline:

| Power Series; | Coefficient Series |
|---|---|
| $r^2 = r \times r$ ; | $S_0 = C_0 + C_1 \times r$ |
| $r^3 = r \times r^2$ ; | $S_1 = S_0 + C_2 \times r^2$ |
| $r^4 = r^2 \times r^2$ ; | $S_2 = S_1 + C_3 \times r^3$ |
| $r^5 = r^3 \times r^2$ ; | $S_3 = S_2 + C_4 \times r^4$ |
| $r^6 = r^4 \times r^2$ ; | $S_4 = S_3 + C_5 \times r^5$ |
| $r^7 = r^5 \times r^2$ ; | $S_5 = S_4 + C_6 \times r^6$ |
| ; | $p(x) = S_5 + C_7 \times r^7$ |

With a one instruction at a time sequencer, this Transcendental function unit can begin a new Transcendental calculation every 11 cycles.

With a sequencer that can deal with two (2) instructions at a time, this function unit can begin a new transcendental calculation every 7 cycles with a fall through delay of 11 cycles. The Power Series Multiplier 810 and 820 operates two (2) cycles in front of the Coefficient Series Multiplier 840.

Normalization and Rounding

The 110-bit summation is then normalized and rounded 850. There are two cases to consider: the small case, and the normal case.

Small Case

The small case was initialized with all bits from the operand, the $C_0=0.0$, the $C_1=1.0$. So the sum will have its most significant bit set at cycle 4. Thus normalizing can choose between a number very close to 1.0. Thus normalization can take the sum or shift the sum up by 1.

In the case of denormalized floating point numbers, the result is the operand itself. This occurs naturally as the exponent is used to shift the $R^k$ into the Power Series Multiplier towards lesser significance each iteration. A denormalized number has a very large negative exponent, and so the $r^2$ 811 product has already become 0.0, from which no bits in the Accumulator 844 will be changed. thus, the $C_0$ 832 term is known to be 0.0, and the $C_1$ 831 term is known to be 1.0, all of the $R^k$ 821 products are zero, so the only contributing term is the $C_1 * r$ product! This case needs no normalization, nor rounding, and is actually known to be exact in an IEEE 754-2008 sense!

Normal Case

The higher order bits (about 5) of the 110-bit sum 844 are scanned for the leading 1-bit. This bit is positioned at the hidden bit position by shifting the sum towards higher significance. Based on $C_0$ 832, it is known that that one of the higher order 5-bits will be set, so that normalization 850 is degenerate (5-bits maximum) and thus easier than typical normalization stages in floating point units. Thus a very tiny find leading one scanner can be utilized to drive the normalization multiplexer inside 850.

The accumulated 844 result has 64-bits of significance from 110-bits, so that even if it is shifted up by up to 6-bits, there remains a guard-bit and a several sticky bits for faithful rounding in any of the IEEE 754-2008 rounding modes.

Rounding

After normalization, the lowest order bits are observed with respect to the current rounding mode so the result can be properly and faithfully rounded.

It is important to note that this is the first and only rounding of the entire polynomial evaluation. The reduced argument r 806 from operand processing was not rounded to 53-bits of precision, but retained at least 58-bits of significance. The power $r^k$ generation used all 58-bits of r and 58-bits of $r^2$ in generating the Power Series. The 58-bits of the Power Series and the 58+bits from the Coefficient Table are multiplied before being added to the 110-bit sum each iteration.

Minimal Embodiment

Referring to FIGS. 12A and 12B: A minimal embodiment of the present invention is a unit positioned in the data path as if it were a calculating function unit. However, this unit 1200 or 1210 performs some examinations of the operand 1203 and 1213 and then based on this observation, drives another already existing function unit in the processor with a series of instructions 1262 or 1272 and operands 1263, 1264, 1265 or 1273, 1274, 1275 that will cause the nearby function unit to evaluate the transcendental function. There are two (2) such variants of this embodiment: A function unit 1210 that performs a Horner evaluation of the polynomial, and a function unit 1200 that performs an Estrin evaluation of the polynomial. They differ only in the amount of internal storage and in the complexity of the multiplexers.

Horner's Method

The Horner based embodiment is illustrated in FIG. 12A.

Here we see a function unit 1210 that consist of a Coefficient Table 740, an Operand flip-flop 1213, a SUM flip-flop 1254, some multiplexers 1270, 1276, 1277, a result bus in 1254, and 3operand output ports 1273, 1274, 1275 to a nearby FMAC unit. This function unit 710 merely feeds coefficients 1275, and instructions 1272 to the nearby FMAC unit, then captures the intermediate results back in the SUM register 1254. The final result is delivered by the FMAC unit itself from the tag 1211 that arrived with the Transcendental instruction through multiplexer 1270.

During the Horner evaluation, the running sum is recirculated according to the above recurrence relation through the SUM flip-flop 1254.

The Coefficient Table 1240 supplies coefficients, but also controls the Tag 1211 delivered to the nearby FMAC unit. For all iterations excepting the last, the Tag 1271 handed to the FMAC unit tells the FMAC unit to send the result back to this function unit 1210. For the last iteration, the tag 1211 originally sent with the transcendental instruction is delivered to the FMAC unit so that the final result can be delivered to wherever the processor has been configured. This 1210 is believed to be the truly minimal embodiment.

The 7th degree polynomial takes only 7 instructions to execute but 28 total cycles, and pipelined thusly with increasing clock cycles running down the page:

$$S_6 = C_6 + r \times C_7$$

// waiting for $S_6$

// waiting for $S_6$

// waiting for $S_6$ $$S_5 = C_5 + r \times S_6$$

// waiting for $S_5$

// waiting for $S_5$

// waiting for $S_5$ $$S_4 = C_4 + r \times S_5$$

// waiting for $S_4$

// waiting for $S_4$

// waiting for $S_4$ $$S_3 = C_3 + r \times S_4$$

// waiting for $S_3$

// waiting for $S_3$

// waiting for $S_3$

-continued $$S_2 = C_2 + r \times S_3$$

// waiting for $S_2$

// waiting for $S_2$

// waiting for $S_2$ $$S_1 = C_1 + r \times S_2$$

// waiting for $S_1$

// waiting for $S_1$

// waiting for $S_1$ $$p(r) = C_0 + r \times S_1$$

The first evaluation instruction sent to the FMAC unit contains two (2) coefficients from the table. The present embodiment can be configured to produce both coefficients over two (2) cycles or in one (1) cycle. The former adds a cycle of delay to the evaluation, the later does not.

The reader can easily see the result of one FMAC calculation feeding forward into the SUM operand of the subsequent FMAC calculation. Since the result passes out of the FMAC unit, and is captured in the Transcendental Unit, there is a delay between the delivery of the SUM and the next FMAC instruction.

The reduced argument r 1216 is an operand to every evaluation FMAC instruction. The Coefficient Table 1240 supplies the Augend 1275 to each FMAC instruction. The Coefficient Table supplies the $C_0$ Multiplicand 1274 through multiplexer 1277 to the FMAC unit for the first FMAC instruction, subsequently, the previous SUM 1254 is delivered back as the multiplicand 1274.

Horner's method leads to low utilization of the FMAC unit and to long evaluation times.

Estrin's Method

The Estrin based embodiment is illustrated in FIG. 12B.

Here we see a function unit 1200 that consist of a Coefficient Table 1230, an Operand flip-flop 1203, a Power $R^k$ flip-flop 1251, two SUM flip-flops ($K_n$) 1252 and 1253 some multiplexers 1266, 1267, 1268, and 3operand output ports 1263. 1264, 1265 to a nearby FMAC unit.

The power $R^k$ flip-flop 1251 captures the power multiplies from the FMAC unit. These are then used in the intermediate stages of evaluation.

The two (2) SUM flip flops 1252, 1253 capture the evaluation FMAC results until all needed terms have arrived. The issuance of instructions 1272 to the FMAC unit is organized as to not overflow this minimal amount of storage. For our 7th degree polynomial, these flip-flops are used three (3) times each.

And pipelined thusly with increasing clock cycles running down the page:

$$r^2 = r \times r$$

$$K_6 = C_6 + C7 \times r$$

$$K_4 = C_4 + C5 \times r$$

$$K_2 = C_2 + C3 \times r$$

$$K_0 = C_0 + C1 \times r$$

-continued $$r^4 = r^2 \times r^2$$

$$K'_4 = K_4 + K_6 \times r^2$$

$$K'_0 = K_0 + K_2 \times r^2$$

// waiting for $K_0$ $$K'_0 = K_0 + K_2 \times r^2$$

// waiting for $K'_0$ and $K'_4$

// waiting for $K'_0$

// waiting for $K'_0$ $$p(r) = K'_0 + K'_4 \times r^4$$

This embodiment enables using a near by FMAC unit to evaluate Transcendental polynomials in as few as 15-cycles.

Precision Salvaging Argument Reduction

In the minimal environment, Precision Salvaging Argument Reduction degenerates to High Precision Multiplication with an instance of exact floating point extraction. The Coefficient Table section producing the three (3) successive fields of $2/\pi$ are extracted and formatted as standard IEEE 754-2008 64-bit numbers.

$$\{2/\pi_{high}, 2/\pi_{mid}, 2/\pi_{low}\} = 2/\pi_{string} <e:e-159>$$

Once the 3 successive fields of $2/\pi$ are extracted and formed into IEEE 754-2008 numbers, the following calculation is performed by the nearby FMAC unit:

$$L = 2/\pi_{low} \times \emptyset$$

$$M = 2/\pi_{mid} \times \emptyset + L$$

$$H = 2/\pi_{high} \times \emptyset \quad \text{// round away from zero}$$

$$P = 2/\pi_{high} \times \emptyset - H \quad \text{// obtain the lower order bits of } 2/\pi_{high} \times \emptyset$$

$$r = P + M$$

Where: L is effectively the lower triangle 815 from the preferred embodiment, M is the parallelogram 840 of the preferred embodiment plus L, H is the parallelogram 420 with bits to the right and left of line 425, P is the triangle 825 of the preferred embodiment.

P is effectively the triangle 825 of the preferred embodiment. P contains all the bits of the multiply of $2/\pi_{high}$ and Ø that did not make it into H. This is the Instruction set version of throwing those bits away. We then proceed to add these P bits to the M bits in order to get the reduced argument r.

Due to the selection of the bits in $2/\pi$, the 2 least significant bits of H are the Quadrant of evaluation, r has become the reduced argument, and the polynomial evaluation can proceed apace. While r is precise in the sense of argument reduction it does not carry as much significance as in the preferred or reduced embodiments.

Operationally, in order to minimize delay, the algorithm is performed in the following order:

$$H = 2/\pi_{high} \times \emptyset$$

$$L = 2/\pi_{low} \times \emptyset$$

$$P = 2/\pi_{high} \times \emptyset - H$$

$$M = 2/\pi_{mid} \times \emptyset + L$$

$$r = P + M$$

One can argue that the multiplication of $L = 2/\pi_{low} \times \emptyset$ is unnecessary. On the other hand, it is adding no delay to the argument reduction calculation. Since we are obtaining the Quadrant bits from H, the highest 2-bits of L may influence the sticky part of rounding of P+M.

With a 4-cycle nearby FMAC, Precision Salvaging Argument Reduction takes 14-cycles.

High Precision Multiplication

In the minimal environment, High Precision Multiplication degenerates to performing two (2) successive multiplies, and relies of the FMAC capability to perform exact arithmetic when fed the same operand twice, once in multiplying the lower section, then multiplying the upper and adding the lower section without a rounding in the middle.

$$L = K_{low} \times \emptyset$$

$$M = K_{mid} \times \emptyset + L$$

The only downside to this sequence is the 4-cycle latency of each FMAC operation giving an 8-cycle delay when this functionality is needed.

Reduced Embodiment

Referring to FIG. 13: A Transcendental function unit somewhat more expensive than an typical FMAC unit but less expensive the preferred embodiment can be constructed that takes more cycles in evaluation, but has considerably less hardware.

A single 58×58 multiplier array 1310 and 1320 performs the Power Series calculations and also performs the coefficient multiplication, saving of an entire multiplier tree at the cost of time. The multiplier tree can be configured as a vertically split multiplier 1310 and 1320 to assist Precision Salvaging Argument Reduction and High Precision Multiplication calculations.

Other than some multiplexing differences the accumulator is identical. The labels in FIG. 8 and FIG. 13 have been coordinated where identical: label 811 corresponds to 1311. Since they are labeled identically, and perform identical calculations or hold identical data, the reader is referred back to the preferred embodiment for detailed explanations.

Multiplexer 1307 has another term in order to route coefficients 1331 into the multiplier and multiplexer 1308 is used to route the $R^k$ register into multiplication with the Coefficient rather than multiplexer 809.

The accumulator is initialized through coefficient register 1331 rather than the direct path 832.

During Precision Salvaging Argument Reduction and High Precision Multiplication the $R^2$ 1311 and $R^k$ 3121 registers are used to hold the lower L and the higher H portions of the calculation for a cycle while the multiplier performs the middle M multiplication. Multiplexer 1322 routes the lower bits from multiplier 1320 to the $R^k$ 1321 register, normally this multiplexer routes the higher order bits from the power series multiplication. While the lower bits 1320 are being captured in $R^k$ 1321, the upper bits 1310 are being captured in $R^2$ 1311.

When the Middle multiplication M 1310 and 1320 is ready, it is routed directly to the accumulator 1341, at the same time, the $R^k$ register 1321 and the $R^2$ register 1311 are routed to the other side of the accumulator 1341. Thus, in two (2) multiplication cycles, the three (3) products are formed into a single result.

With these few data routing multiplexers explained, the algorithms are identical with the preferred embodiment, and the reduced embodiment function unit achieves bit-for-bit accurate results.

Each step in the iteration now takes 2 cycles, in addition, Precision Salvaging Argument Reduction and High Precision Multiplication now take 3-cycles.

This embodiment can be configured in three (3) variants: the Horner evaluation method, the Estrin evaluation method, and the Power Series evaluation method.

Horner's Method

The Horner configuration operates the Reduced Embodiment as follows:

$$S_6 = C_6 + r \times C_7$$

// waiting for $S_6$

// waiting for $S_6$ $$S_5 = C_5 + r \times S_6$$

// waiting for $S_5$

// waiting for $S_5$ $$S_4 = C_4 + r \times S_5$$

// waiting for $S_4$

// waiting for $S_4$ $$S_3 = C_3 + r \times S_4$$

// waiting for $S_3$

// waiting for $S_3$ $$S_2 = C_2 + r \times S_3$$

// waiting for $S_2$

// waiting for $S_2$ $$S_1 = C_1 + r \times S_2$$

// waiting for $S_1$

// waiting for $S_1$ $$p(r) = C_0 + r \times S_1$$

The reader will immediately notice that significant performance gains have accrued because the Transcendental Function unit can feed back internal un-normalized results much earlier than the minimal embodiment. The 28-cycle Horner evaluation with the nearby FMAC unit is now compressed into 22-cycles. This is entirely due to having build the sequencer directly into the floating point unit, and due to the fact that we can then use a fixed point calculation algorithm, basically avoiding 2 of the normal 4 FMAC cycles.

This version needs to read the $C_7$ and $C_6$ coefficients from the Coefficient Table 1330 in a single cycle to achieve this cycle count.

Estrin's Method

The Estrin configuration operates the Reduced Embodiment as illustrated as follows:

$r^2 = r \times r$ $K_6 = C_6 + C7 \times r$ $K_4 = C_4 + C5 \times r$ $K_2 = C_2 + C3 \times r$ $K_0 = C_0 + C1 \times r$ $r^4 = r^2 \times r^2$ $K'_4 = K_4 + K_6 \times r^2$ $K'_0 = K_0 + K_2 \times r^2$ // waiting for $K'_0$ and $K'_4$ // waiting for $K'_0$ $p(r) = K'_0 + K'_4 \times r^4$ The reader will immediately see that the Estrin evaluation has also compressed slightly from 17-cycles to 15-cycles. This is entirely due to having build the sequencer directly into the floating point unit, and due to the fact that we can then use a fixed point calculation algorithm.

The Estrin version needs to read pairs of coefficients for four (4) cycles in a row to achieve its low latency. Subsequently, the Coefficient Table sits idle as the calculation proceeds.

Power Series Method

The Power Series configuration operates the Reduced Embodiment as follows:

$r^2 = r \times r$ $SUM = C_1$ $r^3 = r \times r^2$ $SUM = C_2 \times r^2 + SUM$ $r^4 = r^2 \times r^2$ $SUM = C_3 \times r^3 + SUM$ $r^5 = r^3 \times r^2$ $SUM = C_4 \times r^4 + SUM$ $r^6 = r^4 \times r^2$ $SUM = C_5 \times r^5 + SUM$ $r^7 = r^5 \times r^2$ $SUM = C_6 \times r^6 + SUM$ // waiting for $SUM$ $SUM = C_6 \times r^6 + SUM$ The Reduced embodiment can be configured to utilize the same polynomial evaluation strategy as the Preferred embodiment achieving its result in 17-cycles.

Here, the Coefficient Table is read for one (1) coefficient for each cycle of the iteration.

Rounding

Referring to FIG. 15: Rounding is the process by which an infinitely precise real number $\mathbb{R}$ 1401 is converted into a representable floating point number $\mathbb{F}$ 1402.

A Real Number $\mathbb{R}$ 1401 has an infinite amount of precision and is a single point on the real number line 1400. The real number line is drawn from lesser significance (left) towards greater significance (right)

A Floating Point Number $\mathbb{F}$ 1402 has a finite amount of precision. In IEEE 754-2008 this precision is 53-bits, including the hidden bit. Floating Point Numbers are classified as Even and Odd. Even floating point numbers have their lowest order bit in the fraction set to zero (0). Odd floating point numbers have their lowest order bit in the fraction set to one (1).

When the next larger floating point number needs the next larger exponent in order to be expressed in normalized form, the exponent is incremented and the span between consecutive floating point numbers doubles. All of the fractions with a common exponent are known as a binade. The point where one binade changes to the next is located at 1403 and labeled $2^k$.

Halfway between two floating point numbers is the breakpoint 1204. In Round to Nearest modes all real numbers 1401 exclusively between breakpoints are rounded to the nearest floating point number 1402.

When a transcendental function is approximated with a polynomial, and the arithmetic is performed with finite precision, there can be uncertainty in the actual value of the real number 1405 denoted with the small range bracket. This interval around the real number can cause rounding to become uncertain.

Round to Nearest

There are two Round to nearest modes in IEEE 754-2008; Round to Nearest Even, and Round to Nearest Magnitude.

When a real number 1411 or 1412 is greater than the previous break point and less than the subsequent break point, the floating point number chosen is the one containing that interval 1413. The reader is directed to notice that the bracketed interval does not include the break point.

When a real number is exactly equal to the break point, and the mode is Round to Nearest Even, the floating point number which is closest and Even is chosen 1416 and 1417.

When a real number is exactly equal to the break point, and the mode is Round to Nearest Magnitude, the floating point number which has greater magnitude is chosen 1414 and 1415. This mode can also be called Round Away From Zero.

Directed Rounding

There are three Directed Rounding modes in IEEE 754-2008; Round towards positive Infinity, Round toward negative Infinity, and Round towards Zero.

Round towards positive infinity never chooses a floating point number that is smaller than the real number being rounded.

Round towards negative infinity never chooses a floating point number that is greater than the real number being rounded.

Round towards zero never chooses a floating point number which has greater magnitude than the real number being rounded.

Round to Nearest Magnitude never chooses a floating point number which has lesser magnitude than the real number being rounded. Which is why it can be called Round Away from Zero.

When a result is delivered and these 5 sets of IEEE 754-2008 rules are completely obeyed, the result is said to have been correctly rounded.

The Rounding Problem

We are now ready to specify the problem with rounding and why it is so difficult.

A Real Number $\mathbb{R}$ 1430 has an uncertainty interval 1431 which spans a break point. While there is a good probability that the Real Number $\mathbb{R}$ 1430 (as drawn) is greater than the break point, one cannot be absolutely certain.

There are known cases for these elementary transcendental functions where a known input argument produces an output argument with 53-bits of result followed by more than 53-bits of either 1s or 0s before finally running to a 0 or a 1 that would eliminate the uncertainty. The reader is referred to Jean Michael Muller for examples and background information on this problem.

A result is said to be faithfully rounded if when confronted with one of these uncertainties, the delivered result is always one of the two surrounding representable floating point numbers $F$, $PRED(F)$ or $SUCC(F)$.

A similar situation happens with the directed rounding cases where the real number $\mathbb{R}$ has an uncertainty interval which spans a floating point number $F$. The properly rounded floating point number $F$ is either $PRED(F)$, or $F$, or $SUCC(F)$, depending on the exact value of $\mathbb{R}$ and the current rounding mode.

A result is said to have 1 ULP of accuracy if the delivered result is always one of the three values $PRED(F)$, or $F$, or $SUCC(F)$. That is the delivered result is never more than 1 floating point number away from the correctly rounded floating point number.

Error Analysis

Peter Markstein in a paper describing the transcendental library for the Itanium processor that shows if one has 2n+3 bits of precision after a transcendental calculation, one can perform a normal rounding (via guard-bit, and sticky-collection of bits) to an n-bit result with 0.5 ULP accuracy, in IEEE 754-2008 Round To Nearest mode or 1 ULP in any other mode.

Some worst case data has been documented by J. M. Muller showing that (2n+14 bits) 120-bits are needed to correctly round some elementary transcendental function to IEEE 754-2008 double precision accuracy.

D. Matula U.S. Pat. No. 6,978,289 has demonstrated in a patent filing on the Evaluation of Transcendental function in 32-bit floating point, that one needs 23+3=26-bits of accuracy in the evaluated function in order to achieve 1 ULP of accuracy in the 32-bit IEEE 754-2008 delivered result.

So in order to achieve faithful rounding, one needs somewhat more than n+3-bits of result and somewhat less than 2n+14 bits of result.

Assuming a n-term polynomial, one needs at least ln 2(n+1) bits more precision in the accumulator (at lesser significance) so that no missing bits fail to carry into the round bit of the pre-rounded result. This requires the present embodiment accumulation process have at least 52+3+3=58-bits of precision, whereas the preferred embodiment has a 110-bit accumulator.

Each coefficient is allowed to have several bits more precision than an IEEE 754-2008 fraction. In particular, as shown in the Matula patent, the $C_0$ term requires 3 more bits of precision. Matula used this precision to blend the $C_0$ term and the $C_2$ term to blend the error of evaluation and achieve better rounded results than Pierno and Oberman at nVidia using the REMEZ algorithm alone to adjust coefficients in the presence of truncated arithmetic processes.

The transcendental calculations are performed with a precision greater than that of the IEEE 754-2008 format in order that we arrive at the rounding stage of the calculation with enough precision to properly choose the best rounded result.

In particular, the Power Series Multiplier has performed its power series calculations using 58-bits of fraction and 5-bits of leading zeros, the Coefficient Multiplier has performed its calculations with 58-bits of fraction also with 5-bits of leading zeros.

The $C_0$ coefficient has 5-bits more leading precision than the $C_k \times r^k$ products. The Accumulator has performed its calculations with 111-bits of fraction, aligning the $C_k \times r^k$ products 5-bits down from the leading bits of the $C_0$ coefficient.

Any error in the Coefficient Product begins at bit[59], the first bit not computed in the multiplication of $C_k \times r_k$. But since this product is aligned to bit[5] of the accumulator, the point of first error is bit[64] in any coefficient multiplier product.

A number of such terms are accumulated. The worst case error grows as the Ln 2(terms) in an addition. With 8 term from a degree 7 polynomial, the position of maximal error has grown by Ln 2(8)=3 bits. And our accumulator now has 61-bits of worst case precision. However the typical error grows at SQRT(terms)−1 so the typical error has lost SQRT (8)−1=1.83-bits. And our accumulator now has 62.17 bits of typical precision.

If our Transcendental function performed a polynomial evaluation, and then performed a reciprocation (or vice versa) the worst case accuracy after the second polynomial evaluation is 60-bits, while the typical accuracy is 61.67 bits of typical precision.

Given 60-bits in the worst case accumulator and the potential for 1 or 2 bits to be normalized off the top, the accumulator is better understood to have 58-bits of precision prior to the round and normalize stage. Given 61.67-bits in the typical accumulator and the potential for 1 or 2 bits to be normalized off the top, the accumulator is better understood to have 59.67-bits of typical precision prior to the round and normalize stage.

With a worst case over all of the transcendental functions over all possible operands we achieve 58-bits of precision, the range of uncertainty in rounding is ⅓₂ ULP. Should this uncertain range span a break point, the rounded result may not conform to IEEE 754-2008 rounding requirements.

In the Round to Nearest rounding modes, the post rounded result will be between one of the two surrounding representable floating point numbers $F$, and thus qualify as faithfully rounded.

In the directed rounding modes, the post rounded result will be between $PRED(F)$, and $SUCC(F)$, where $F$ is the correctly rounded result. Thus in these rounding modes, the result qualifies as 1 ULP.

After rounding has taken place we have 53-bits of fraction including the bit which will be hidden.

Worst case analysis has demonstrated that the Transcendental Unit is capable of delivering faithfully rounded results for elementary Transcendental functions. Typical case analysis is then used to determine how often an Uncertain result will be encountered.

RCP, RSQRT, SQRT, LN 2PI, EXP2MI, A SIN, and A COS are expected to have uncertain rounding 1 out of 576.7 times.

LnP1, LOG P1, EXP, EXP10, SIN, and COS are performed in the extended length 13-cycle calculation are expected to have uncertain rounding 1 out of 512 times.

TAN can be calculated in either the extended length 13-cycle calculation or the super extended length 22-cycles depending on whether a reciprocation is required. The 13-cycle calculation is expected to have uncertain rounding 1 out of 512 times while the 22-cycle calculation is expected to have uncertain rounding 1 out of 279 times; for an average of 1 out of 395.7 times.

A TAN can be calculated in either standard length 11-cycles or an extended length 20-cycles depending on whether a reciprocation is required. The 11-cycle calculation is expected to have uncertain rounding 1 out of 576.7 times, while the 20-cycle calculation is expected to have uncertain rounding 1 out of 235.1 times; for an average of 1 out of 405.9 times.

Uncertain Rounding

Much software will be perfectly happy with faithful rounding of Transcendental functions given the performance of the transcendental units disclosed. The present embodiment is capable of observing the rounding calculation and determining if the rounding is actually correct (or not).

A processor with the present invention embodied can make use of the Uncertain Rounding signal as part of the result delivery process. Should the containing processor observe this signal and should the processor have means to take an Uncertain Exception control transfer, the software at the exception handler will be in a position to emulate the transcendental calculation and achieve correct IEEE 754-2008 rounding. Said software would then deliver the correctly rounded result to the target destination register, increment the Instruction Pointer, and return from exception having fixed the problem.

The present embodiment was designed so that high precision software can back up the high speed hardware and deliver correctly rounded results. Software performance analysis will perceive some blending of the hardware execution time plus the effects of exception overhead, software calculations times the probability that an uncertain rounding was detected.

$$T_{perceived} = T_{HW} + (E + T_{SW}) \times \text{Probability}$$

Since Uncertain Roundings are rather rare events, software measurements will see the vast majority of transcendental calculations take the hardware pipelined execution time, and a small percentage of the long software correctly rounded execution time.

The hardware is performing these Transcendental calculations in 13-odd cycles, while the software performing slightly more accurate calculations may take 300-odd cycles plus interrupt overhead. Ignoring the exception overhead, the Transcendental function unit needs:

$$T_{HW} = (E + T_{SW}) \times \text{Probability}$$

$$\text{Probability} < T_{HW}/(E + T_{SW})$$

This will result in software measuring that the Transcendental instructions take only a few cycles more, on average, than the hardware timings of the transcendental instructions themselves.

Many processors have Exception overhead E lower than 100 cycles, x86 processors typically have Exception Overhead E in the 300 cycles range. Processors with higher Exception Overhead E may want to utilize bigger multiplier trees if they want IEEE 754-2008 correctly rounded results.

And this is why the preferred embodiment has so many bits in the multiplier trees, to keep the probability of raising the Uncertain interrupt down. Anyone skilled in the art can see that as the number of bits in the multiplier trees are reduced, the probability of an Uncertain rounding increases.

Should an embodiment of the present invention accept faithfully rounded results, the size of the multiplier tree can be reduced as small as 54-bits×54-bits.

Should an embodiment of the present invention categorically deny use of the Uncertain exception, bits in the multiplier trees can be reduced as small as 54-bits×54-bits.

Although described in the context of particular embodiments, one of ordinary skill in this art will readily realize that many modifications may be made in such embodiments to adapt either to specific implementations.

What is claims is:

1. A processor comprising a floating point transcendental calculation unit, said floating point transcendental calculation unit comprising:
   a coefficient table configured:
      to store a plurality of predetermined constants, C, each at a unique opcode x m-bit index; and
      in response to receiving a coefficient selection Index, k, to provide $C_k$;
   a power series multiplier configured:
      to receive a n-bit floating point reduced argument, r; and
      iteratively to develop a power series, $r^k$;
   a coefficient series multiplier and accumulator configured:
      to develop a series of products, $C_k \times r^k$; and
      to accumulate said series of products into a sum;
   a round and normalize stage configured:
      to round said accumulated sum; and
      to normalize said rounded accumulated sum;
   a control circuit configured, selectively:
      to apply to said coefficient table an index comprising said opcode, a selected m-bit portion of a floating point number, F, and said coefficient selection index, k;
      to apply to said power series multiplier said reduced argument, r;
      to apply to said coefficient series multiplier and accumulator a sequence of $C_k$ and $r^k$; and
      to apply to said round and normalize stage the accumulated sum.

2. Said processor comprising said floating point calculation unit according to claim 1 wherein said power series multiplier is further characterized as adapted to operate as a vertically split multiplier.

3. Said processor comprising said floating point calculation unit according to claim 1 wherein said coefficient series multiplier and accumulator are further characterized as adapted to operate as a vertically split multiplier.

4. A processor comprising a floating point transcendental calculation unit, said floating point transcendental calculation unit comprising:
   a coefficient table configured:
      to store a plurality of predetermined constants, C, each at a unique opcode x m-bit index, and
      in response to receiving a coefficient selection index, k, to provide $C_k$;

a multiplier configured to operate as a selective one of:
- a power series multiplier configured:
  - to receive an n-bit floating point reduced argument, r; and
  - iteratively to develop a power series, $r^k$; and
- a coefficient series multiplier and accumulator configured:
  - to develop a series of products, $C_k \times r^k$; and
  - to accumulate said series of products into a sum;

a round and normalize stage configured:
- to round said accumulated sum; and
- to normalize said rounded accumulated sum; and a control circuit configured, selectively:
- to apply to said coefficient table a coefficient selection index comprising said opcode, a selected m-bit portion of a floating point number, F;
- to apply to said power series multiplier a reduced arguments, r;
- to apply to said coefficient series multiplier and accumulator a sequence of $C_k$ and $r^k$; and
- to apply to the round and normalize stage the accumulated sum.

5. Said processor comprising said floating point calculation unit according to claim 4 wherein said multiplier is further characterized as adapted to operate as a vertically split multiplier.

6. A processor comprising a floating point calculation unit, said floating point calculation unit comprising:

a coefficient table configured:
- to store a plurality of predetermined constants, C, each at a unique m-bit index; and
- in response to receiving a coefficient selection index, k, to provide $C_k$;

a multiplier configured to operate as a vertically split multiplier:
- to receive a triple precision constant;
- to receive an intermediate result;
- to produce a high precision product of the triple precision constant and the intermediate result; and
- to produce a right multiplier product, a left multiplier product, and a middle multiplier product and shift the left multiplier product and the right multiplier product to align with the middle multiplier product and deliver a sum as the precision salvaged reduced argument; and a control circuit configured, selectively:
- to apply to said coefficient table a coefficient selection index, k, comprising a selected m-bit portion of a floating point number, F; and
- to apply a precision salvaging argument reduction sequence to said operand.

7. The processor comprising said floating point calculation unit of claim 6 wherein said coefficient selection index, k, is further characterized as an opcode index.

8. The processor comprising said floating point calculation unit of claim 6 wherein said coefficient selection index, k, is further characterized as a constant selection index.

9. In a processor, a floating point calculation unit comprising:

a coefficient table configured:
- to store a plurality of predetermined constants, C, each at a unique m-bit index; and
- in response to receiving a coefficient selection index, k, to provide $C_k$;

a multiplier configured:
- to receive a double width constant;
- to receive an intermediate result; and
- to produce a higher precision multiplier product and a lower precision multiplier product and to shift the lower precision multiplier product to align with the higher precision multiplier product and deliver a sum as the higher precision multiplier product; and a control circuit configured, selectively:
- to apply to said coefficient table a coefficient selection index, k, comprising a selected m-bit portion of a floating point number, F; and
- to apply a high precision multiplication sequence to said operand.

10. The processor comprising said floating point calculation unit of claim 9 wherein said coefficient selection index, k, is further characterized as an opcode index.

11. The processor comprising said floating point calculation unit of claim 9 wherein said coefficient selection index, k, is further characterized as a constant selection index.

\* \* \* \* \*